(12) United States Patent
Kim et al.

(10) Patent No.: US 10,408,533 B2
(45) Date of Patent: Sep. 10, 2019

(54) WATER PURIFIER AND CONTROL METHOD THEREOF

(71) Applicant: LG ELECTRONICS INC., Seoul (KR)

(72) Inventors: Kyeongbo Kim, Seoul (KR); Sehwan Bae, Seoul (KR); Hyoungwon Roh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 168 days.

(21) Appl. No.: 15/362,971

(22) Filed: Nov. 29, 2016

(65) Prior Publication Data

US 2017/0153056 A1 Jun. 1, 2017

(30) Foreign Application Priority Data

Nov. 30, 2015 (KR) ........................ 10-2015-0169406

(51) Int. Cl.
*B01D 1/28* (2006.01)
*B01D 5/00* (2006.01)
(Continued)

(52) U.S. Cl.
CPC .............. *F25D 31/002* (2013.01); *B01D 1/28* (2013.01); *B01D 5/006* (2013.01); *B01D 5/0072* (2013.01);
(Continued)

(58) Field of Classification Search
CPC .... F25D 31/002; F25D 23/006; F25D 31/005; F25D 29/005; F25D 31/003; F25D 2323/121; F25D 2400/02; F25D 23/003; F25D 2323/122; F25D 11/00; F25D 17/04; F25D 17/045; F25D 17/047; B01D 35/1435; B01D 5/006; B01D 5/0072; B01D 1/28; B01D 1/289; B01D 2201/04; B01D 2201/0415; B01D 2201/0423; B01D 2201/31; B01D 35/18; B01D 35/185; C02F 1/003; C02F 2307/10; C02F 1/008; C02F 2209/445; C02F 2209/02; F25B 31/00;
(Continued)

(56) References Cited

U.S. PATENT DOCUMENTS 1,930,225 A * 10/1933 Denslow .................. F25B 1/04
418/62
2,504,372 A * 4/1950 Anderson ............... F25D 16/00
312/290
(Continued)

FOREIGN PATENT DOCUMENTS

CN 2579302 10/2003
CN 2675002 2/2005
(Continued)

OTHER PUBLICATIONS

Korean Office Action dated Jan. 17, 2018 issued in Application No. 10-2017-0021609.
(Continued)

*Primary Examiner* — Joseph W Drodge
(74) *Attorney, Agent, or Firm* — KED & Associates, LLP

(57) ABSTRACT

A water purifier having a small size and compact internal structure and enabling a water discharge part through which water is extracted to be rotation-operated, and a control method thereof.

12 Claims, 45 Drawing Sheets

(51) Int. Cl.
  *B01D 35/14* (2006.01)
  *B01D 35/18* (2006.01)
  *C02F 1/00* (2006.01)
  *F25D 23/00* (2006.01)
  *F25D 29/00* (2006.01)
  *F25D 31/00* (2006.01)
  *B01D 35/143* (2006.01)

(52) U.S. Cl.
  CPC ....... *B01D 35/1435* (2013.01); *B01D 35/185* (2013.01); *C02F 1/003* (2013.01); *C02F 1/008* (2013.01); *F25D 23/006* (2013.01); *F25D 29/005* (2013.01); *F25D 31/005* (2013.01); *C02F 2209/02* (2013.01); *C02F 2209/445* (2013.01); *C02F 2307/10* (2013.01); *F25D 31/003* (2013.01); *F25D 2323/121* (2013.01); *F25D 2400/02* (2013.01)

(58) Field of Classification Search
  CPC ........ F25B 31/006; F25B 39/00; F25B 39/02; F25B 39/04; F25B 41/00; F25B 43/00; F25B 43/003; F25B 2339/01
  USPC ............... 210/149, 175, 184, 186, 232, 483; 62/259.1, 259.4, 311, 389
  See application file for complete search history.

(56) References Cited

U.S. PATENT DOCUMENTS

| | | | | |
|---|---|---|---|---|
| 5,638,695 A * | 6/1997 | Kamio | ..................... | F25B 39/00 62/279 |
| 5,766,453 A * | 6/1998 | Morellato | .............. | B01D 61/08 141/360 |
| 5,823,007 A * | 10/1998 | Chang | .................. | B67D 3/0009 62/397 |
| 6,044,903 A * | 4/2000 | Heilman | ............... | A01K 63/042 165/263 |
| 6,207,046 B1 * | 3/2001 | Yamashita | ................ | B67D 1/07 210/138 |
| 7,861,550 B2 * | 1/2011 | Knoll | .................... | B67D 1/0057 222/146.1 |
| 9,163,855 B2 | 10/2015 | Akel | | |
| 2008/0256972 A1 * | 10/2008 | Knoll | .................... | B67D 1/0057 62/376 |
| 2012/0060531 A1 | 3/2012 | Ferreira et al. | | |
| 2013/0199221 A1 * | 8/2013 | Tudor | .................. | F24F 3/1405 62/93 |
| 2013/0213865 A1 * | 8/2013 | Hsu | ...................... | B01D 5/0072 210/85 |

FOREIGN PATENT DOCUMENTS

| | | |
|---|---|---|
| CN | 201119766 | 9/2008 |
| CN | 201617671 | 11/2010 |
| CN | 101972112 | 2/2011 |
| CN | 201840318 | 5/2011 |
| CN | 105615657 | 6/2016 |
| JP | H 06-331255 | 11/1994 |
| JP | H 07-41369 | 7/1995 |
| JP | H 10-079294 | 3/1998 |
| JP | 2003-192097 | 7/2003 |
| KR | 10-2005-0074212 | 7/2005 |
| KR | 10-2007-0071620 | 7/2007 |
| KR | 10-2008-0095780 | 10/2008 |
| KR | 10-2009-0041526 | 4/2009 |
| KR | 10-2009-0085825 | 8/2009 |
| KR | 10-2009-0094558 | 9/2009 |
| KR | 10-0956582 | 5/2010 |
| KR | 10-2010-0062205 | 6/2010 |
| KR | 10-2010-0105061 | 9/2010 |
| KR | 20-2010-0009381 | 9/2010 |
| KR | 10-2011-0026133 | 3/2011 |
| KR | 10-2011-0096868 | 8/2011 |
| KR | 10-2012-0051450 | 5/2012 |
| KR | 10-1146626 | 5/2012 |
| KR | 10-2012-0140417 | 12/2012 |
| KR | 10-2013-0006210 | 1/2013 |
| KR | 10-2013-0116717 | 10/2013 |
| KR | 10-1381803 | 4/2014 |
| KR | 10-2014-0112765 | 9/2014 |
| KR | 10-2014-0122092 | 10/2014 |
| KR | 10-2014-0131616 | 11/2014 |
| KR | 10-2015-0004669 | 1/2015 |
| KR | 10-2015-0068172 | 6/2015 |
| KR | 10-2015-0068173 | 6/2015 |

OTHER PUBLICATIONS

Korean Office Action dated Apr. 14, 2017 issued in Application No. 10-2017-0021606.
Korean Office Action dated Apr. 14, 2017 issued in Application No. 10-2017-0021607.
Korean Office Action dated Apr. 14, 2017 issued in Application No. 10-2017-0021609.
Korean Office Action dated Apr. 14, 2017 issued in Application No. 10-2017-0021610.
Korean Office Action dated Apr. 14, 2017 issued in Application No. 10-2017-0021611.
Korean Office Action dated Apr. 21, 2017 issued in Application No. 10-2017-0021608.
Korean Office Action dated May 12, 2017 issued in Application No. 10-2017-0021612.
Korean Office Action dated Nov. 28, 2016 issued in Application No. 10-2015-0169406.
Chinese Office Action dated Dec. 21, 2018 issued in CN Application No. 201611071449.2.

* cited by examiner

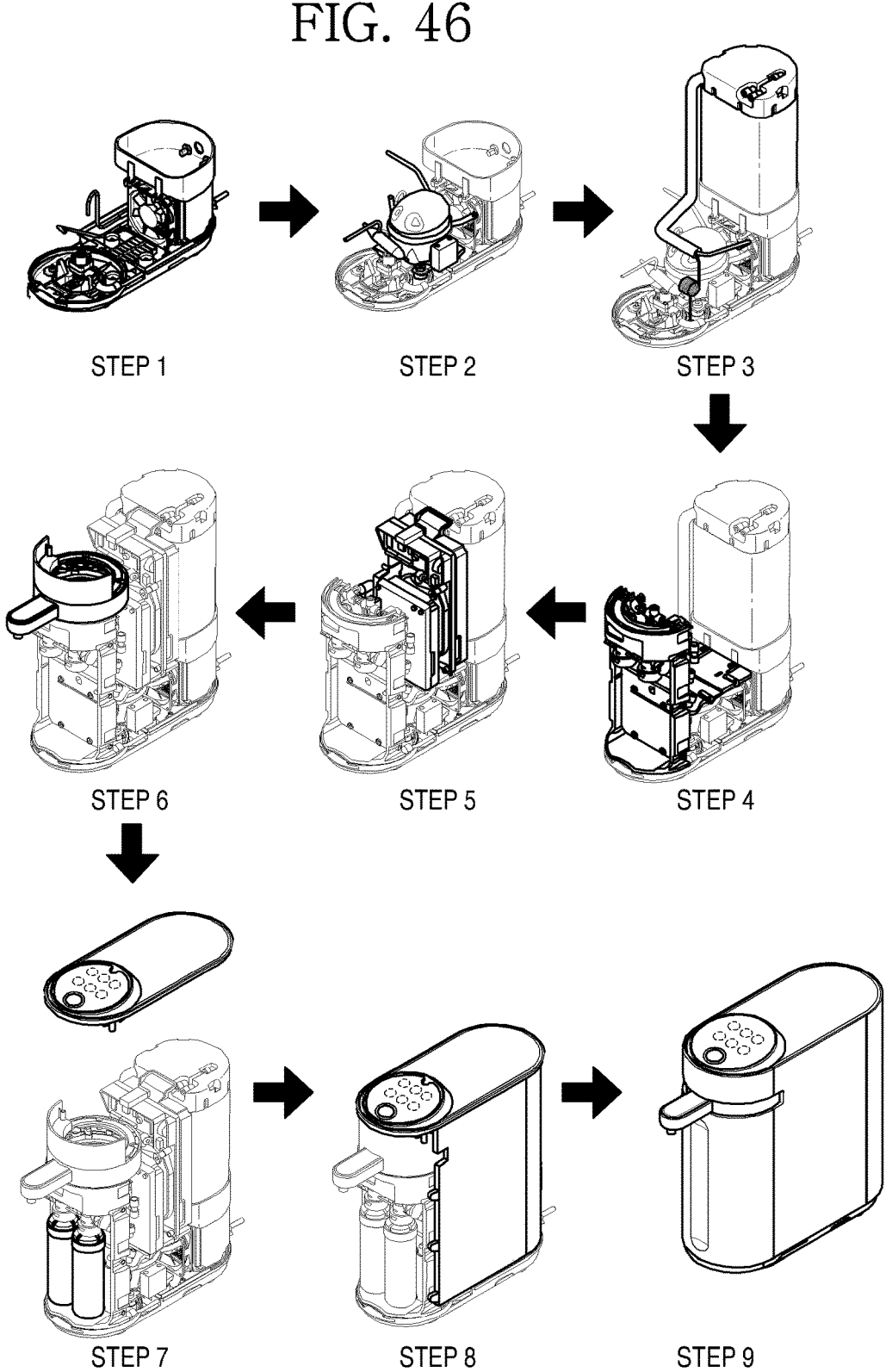

ical methods to filter water and remove impurities. In the case
WATER PURIFIER AND CONTROL METHOD THEREOF

CROSS-REFERENCE TO RELATED APPLICATION(S)

The application claims priority under 35 U.S.C. § 119 and 35 U.S.C. § 365 to Korean Patent Application No. 10-2015-0169406, filed in Korea on Nov. 30, 2015, whose entire disclosure is hereby incorporated by reference.

BACKGROUND

1. Field

A water purifier and a control method thereof are disclosed herein.

2. Background

Generally, a water purifier may be used in home as a mechanism to filter water and remove impurities. In the case of a home water purifier, it may be connected to a water pipe and remove floaters or harmful components contained in water by using a filter, and configured to filter and take out the water as much as a user wants according to the user's operation.

The above-described the home water purifier may also dispense hot and cold water as well as purified water. Water purifiers which may be installed in different installation environments in a small size have been developed.

In Korean Patent No. 1381803, a water purifier in which a water discharge part through which water is taken out is provided on an upper end part of a main body unit, and after being separated from the main body unit, the water discharge part can be coupled again to the main body unit after being rotated by a set angle. The water purifier in such a structure may allow the user to change a position of the water discharge part to a set position by separating and coupling again the water discharge part while a position of a main body is maintained. Therefore, there is an advantage that the water purifier may be installed without a constraint of an installation space.

However, the water purifier according to the prior art has the following problems. First, in order to change the position of the water discharge part, the water discharge part should be coupled again after changing the position by separating the water discharge part from the main body unit. A coupling part may be damaged during the repeated separation and coupling processes of the water discharge part.

Second, since a water discharge pipe is connected to the water discharge part, there is a problem that a leak may be caused in a case in which the water discharge pipe is damaged in the separation and coupling processes of the water discharge part. Also, when a repeated rotational operation of the water discharge part is performed, a fitting part in which the water discharge part or the water discharge pipe is connected may be damaged and a leak may occur.

Third, the position of the water discharge part is determined by a groove of a coupling hole formed in the main body unit. Therefore, the water discharge part may be positioned only at the set position in which the groove is formed, and may not be positioned at a random point.

BRIEF DESCRIPTION OF THE DRAWINGS

Embodiments will be described in detail with reference to the following drawings in which like reference numerals refer to like elements, and wherein:

FIG. 46 is a view sequentially illustrating an assembly process of the water purifier.

DETAILED DESCRIPTION

Reference will now be made in detail to the embodiments of the present disclosure, examples of which are illustrated in the accompanying drawings. In the following detailed description of the preferred embodiments, reference is made to the accompanying drawings that form a part hereof, and in which is shown by way of illustration specific preferred embodiments in which the invention may be practiced. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense.

Also, in the description of embodiments, terms such as first, second, A, B, (a), (b) or the like may be used herein when describing components of the present disclosure. Each of these terminologies is not used to define an essence, order or sequence of a corresponding component but used merely to distinguish the corresponding component from other component(s). It should be noted that if it is described in the specification that one component is "connected," "coupled" or "joined" to another component, the former may be directly "connected," "coupled," and "joined" to the latter or "connected", "coupled", and "joined" to the latter via another component.

Figure 1:
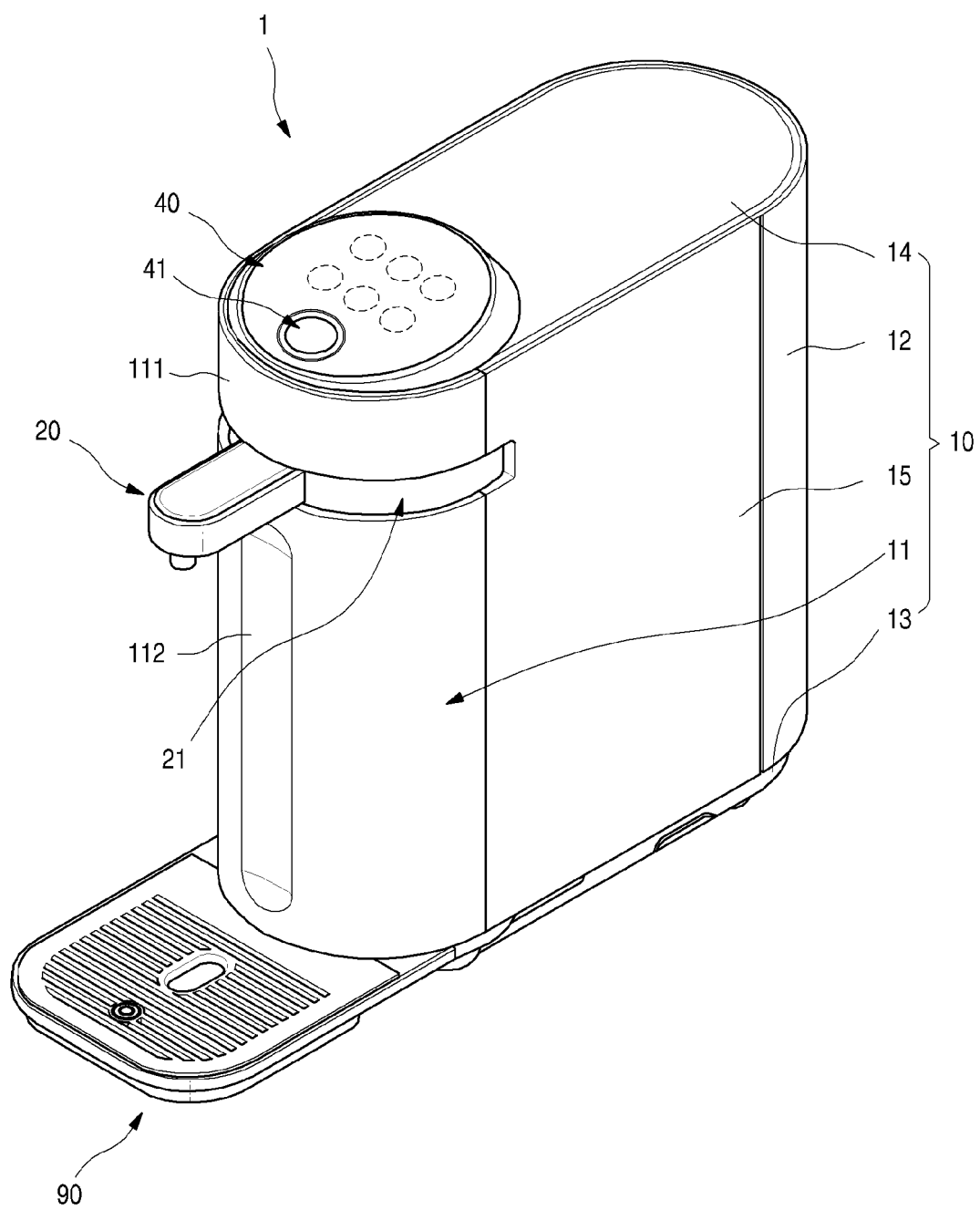
FIG. 1 is a perspective view of a water purifier according to an embodiment of the present disclosure.
Figure 2:
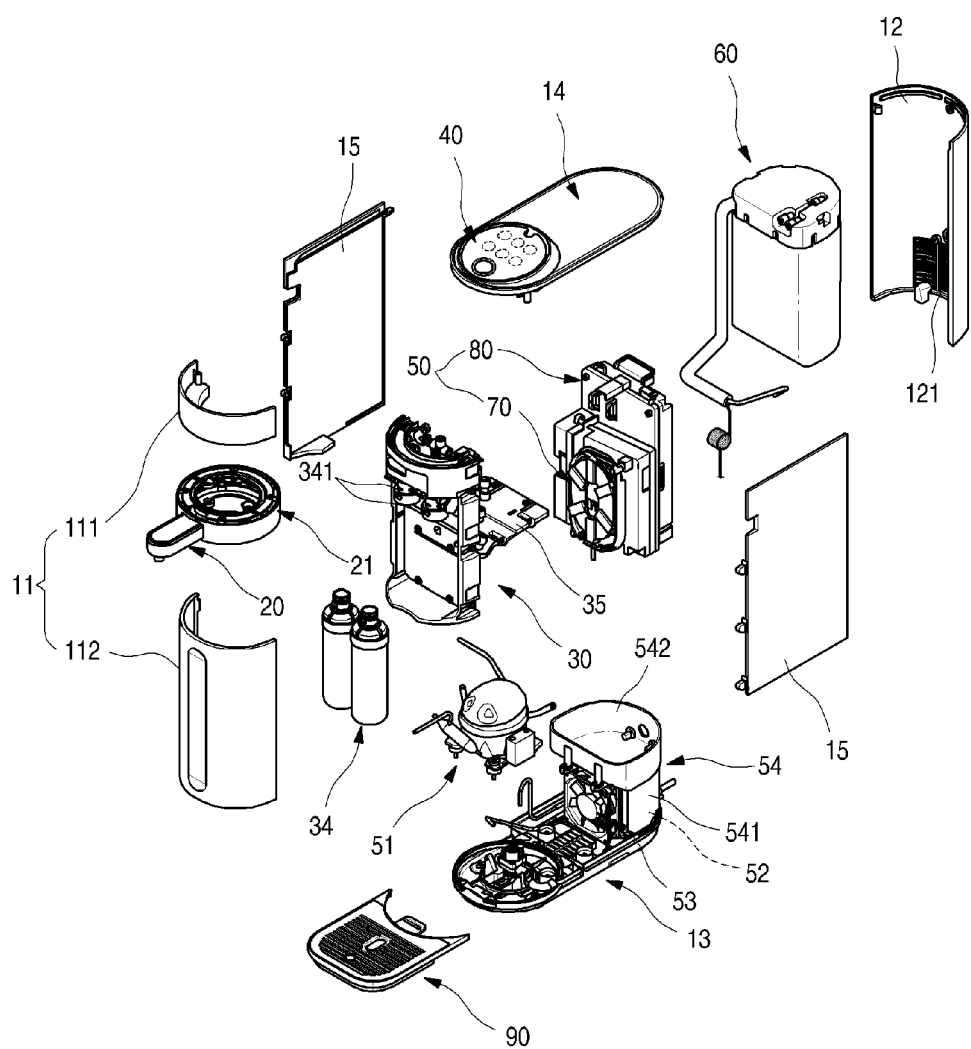
FIG. 2 is an exploded perspective view of the water purifier.

As shown in FIGS. 1 and 2, in a water purifier 1 according to an embodiment of the present disclosure, a long length may indicate a front-rear direction and a width may be formed narrower in a left-right direction. Therefore, the water purifier 1 may have a generally slim and compact exterior shape.

An external appearance of the water purifier may be formed by a case 10. The case 10 may be configured with a front cover 11 forming the external appearance of a front surface, a rear cover 12 forming the external appearance of a rear surface, a base 13 forming a lower surface, a top cover 14 forming an upper surface, and side panels 15 forming both left and right side surfaces. The front cover 11, the rear cover 12, the base 13, the top cover 14 and one pair of side panels 15 may be assembled to each other and may form an exterior of the water purifier 1.

A water discharge part 20 may be provided on a front surface of the water purifier 1. The water discharge part 20 may protrude forward from the front cover 11 and purified water may be taken out through a water discharge nozzle 25 protruding downward.

The front cover 11 may include an upper cover 111 and a lower cover 112. A rotator 21 may be rotatably provided between the upper cover 111 and the lower cover 112.

The water discharge part 20 may be rotated with the rotator 21. Therefore, a user may rotate the water discharge part 20 to a desired angle depending on an installation state or an installation environment of the water purifier 1. An operation part 40 provided in the top cover 14 may also be rotated together with the water discharge part 20.

A tray 90 installed on the base 13 may protrude forward from the front cover 11, and may be positioned vertically below the water discharge part 20. The tray 90 may be rotated by the operation of the user, and it may be separated from the base 13. An upper surface of the tray 90 may have a grille shape so that water falling from the water discharge part 20 may be stored.

A filter 34 for water purification and a filter bracket 30 in which a plurality of valves 366, 367 and 369 (referring to FIG. 17) are mounted may be provided in the case 10, and the rotator 21 may be rotatably mounted on an upper end of the filter bracket 30. The operation part 40 may be provided above the rotator 21, and the operation part 40 may be connected to the rotator 21 and may be rotated together with the rotator 21 when the rotator 21 is rotated.

A rotation ring 91 may be rotatably mounted on one side of the front surface of the base 13 (referring to FIG. 3), and the tray 90 may be detachably provided in the rotation ring 91. Therefore, the tray 90 may be rotated integrally with the rotation ring 91 while being mounted on the rotation ring 91, and it may be positioned lower than the water discharge part 20. As necessary, the tray 90 may be coupled to or separated from the rotation ring 91.

Figure 40:
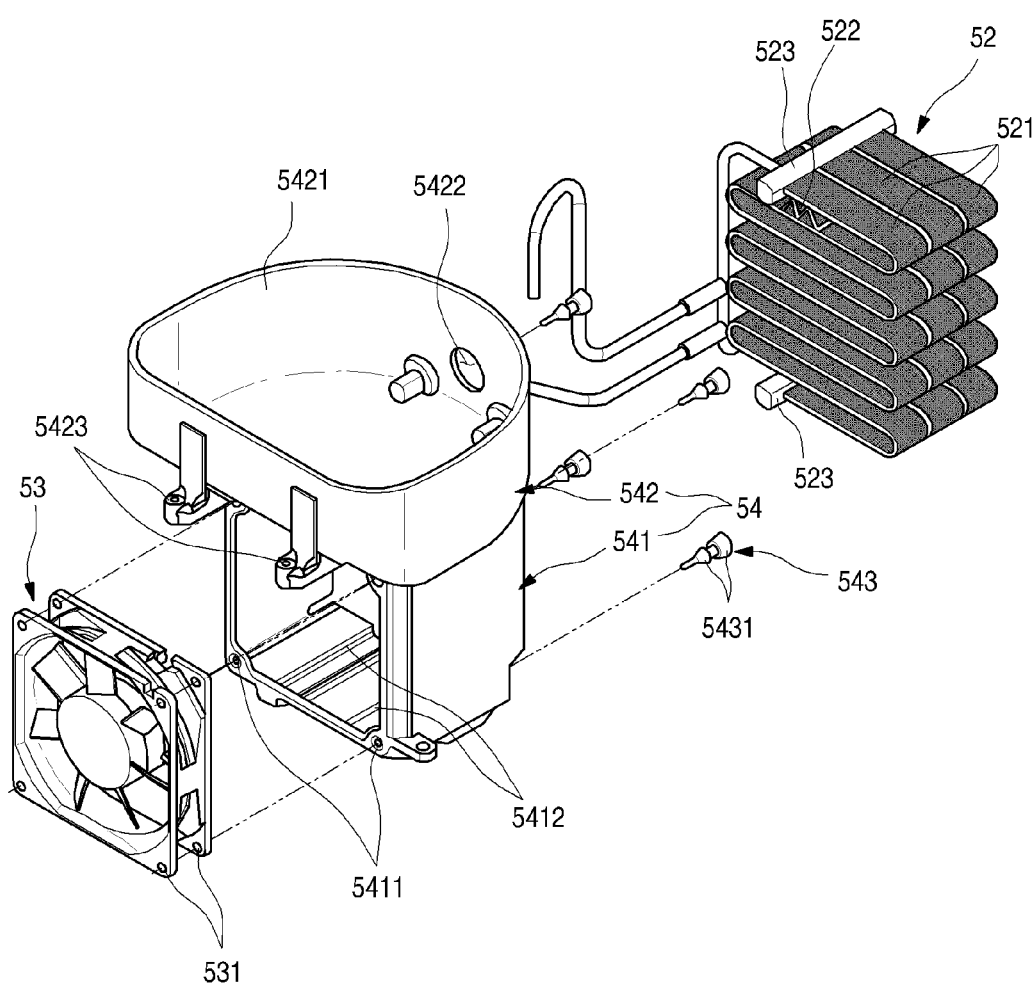
FIG. 40 is an exploded perspective view illustrating a coupling structure of a condenser bracket, a blowing fan and a condenser of the water purifier.
Figure 41:
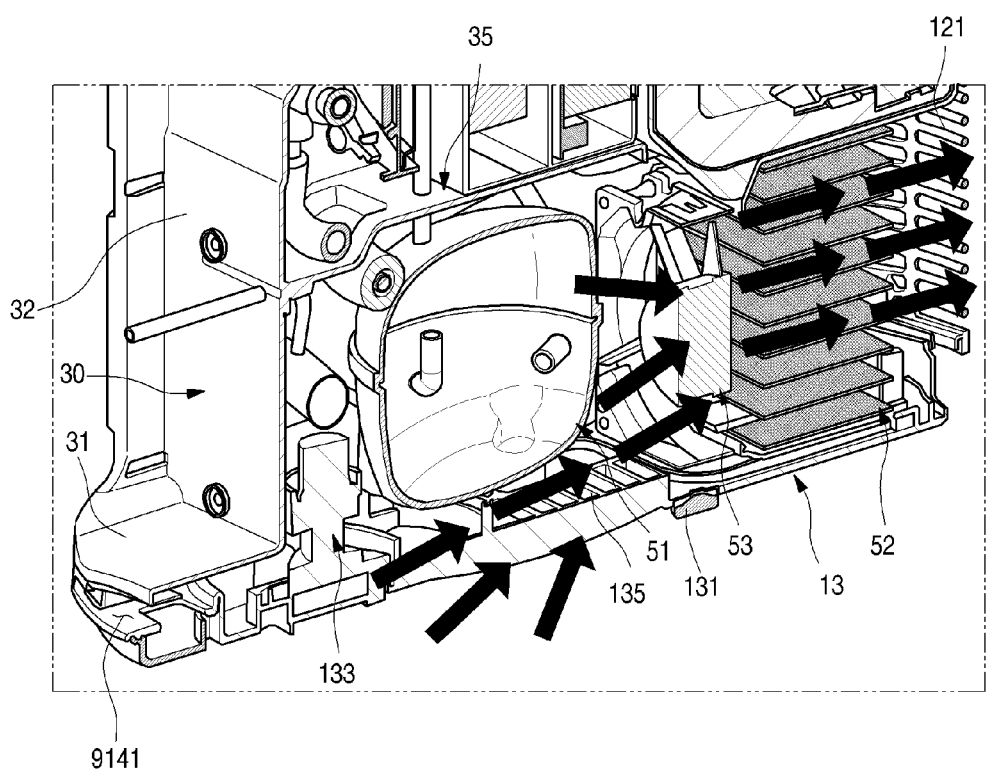
FIG. 41 is a cut-away perspective view illustrating a cooling air flow of the water purifier.

Referring to FIGS. 2, 40 and 41, a compressor 51 and a condenser 52 may be provided in the base 13. A cooling fan 53 may be provided between the compressor 51 and the condenser 52 and allows the compressor 51 and condenser 52 to be cooled. An inverter type compressor which varies a drive frequency of a compressor unit and is able to adjust the cooling capacity may be used as the compressor 51. Therefore, cooling of purified water may be performed efficiently, and thus power consumption may be reduced.

The condenser 52 may be positioned at a rear of the base 13, and may be positioned on a location corresponding to a discharge port 121 formed on the rear cover 12. The discharge port 121 may penetrate the rear cover 12 so that air inside the water purifier 1 may be discharged to the outside. In order to efficiently use a space and improve heat efficiency at the same time, a flat tube type refrigerant pipe may be bent many times, and the condenser 52 may be accommodated in a condenser bracket 54.

A condenser mounting part (or condenser mount) 541 in which the condenser 52 is fixed and a tank mounting part (or tank mount) 542 in which a cooling tank 60 for making cold water is mounted may be formed in the condenser bracket

54. The condenser mounting part 541 may form a hexahedron space corresponding to the overall shape of the condenser 52 so as to accommodate the condenser 52. The condenser mounting part 541 may be formed so that each part facing the cooling fan 53 and the discharge port 121 is opened, and thus effective cooling of the condenser 52 is possible.

The tank mounting part 542 may be formed on an upper portion of the condenser bracket 54 above the condenser mounting part 541. A lower end part of the cooling tank 60 may be inserted into the tank mounting part 542 and the tank mounting part 542 may be fixed the cooling tank 60.

Figure 28:
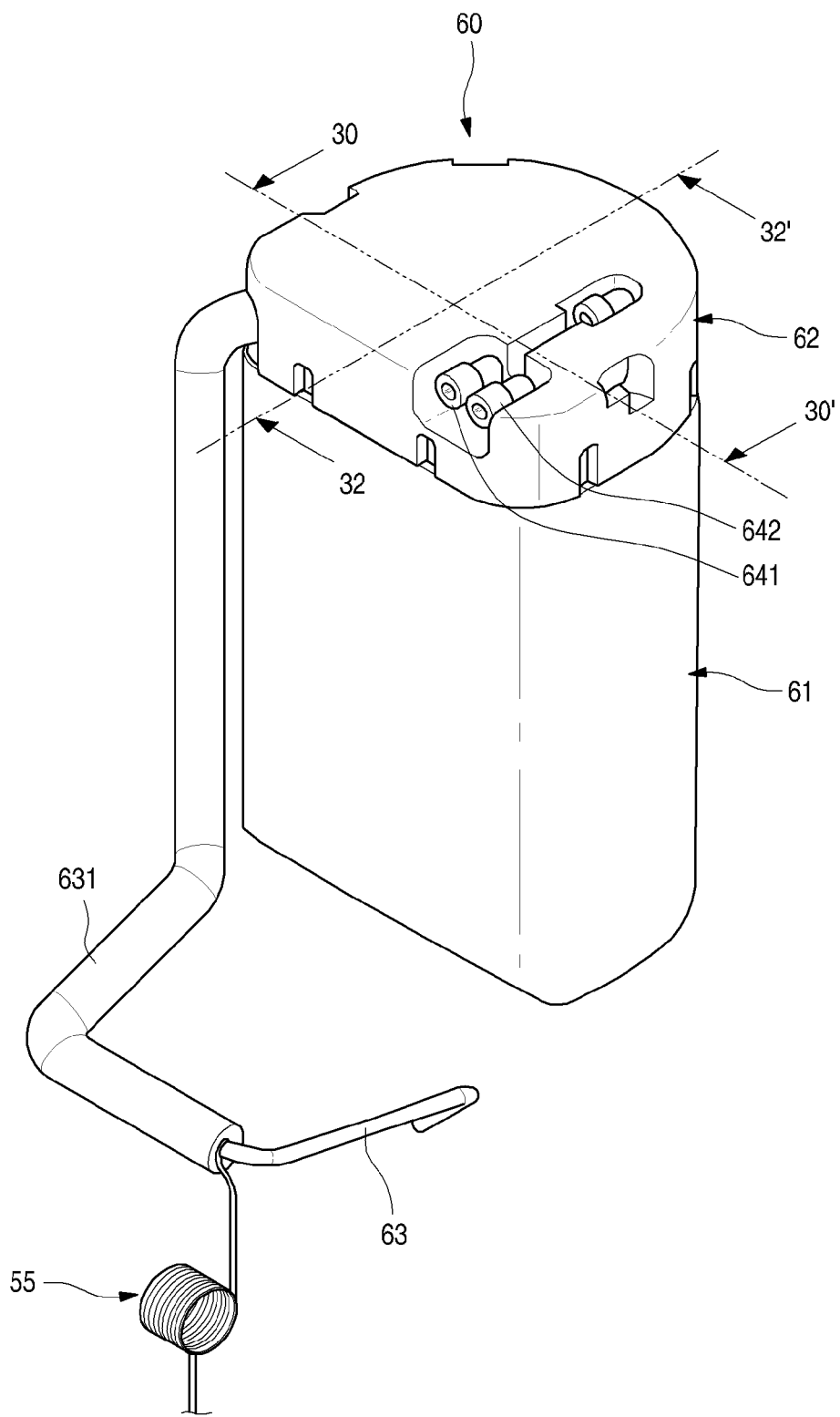
FIG. 28 is a perspective of a cooling tank of the water purifier.
Figure 29:
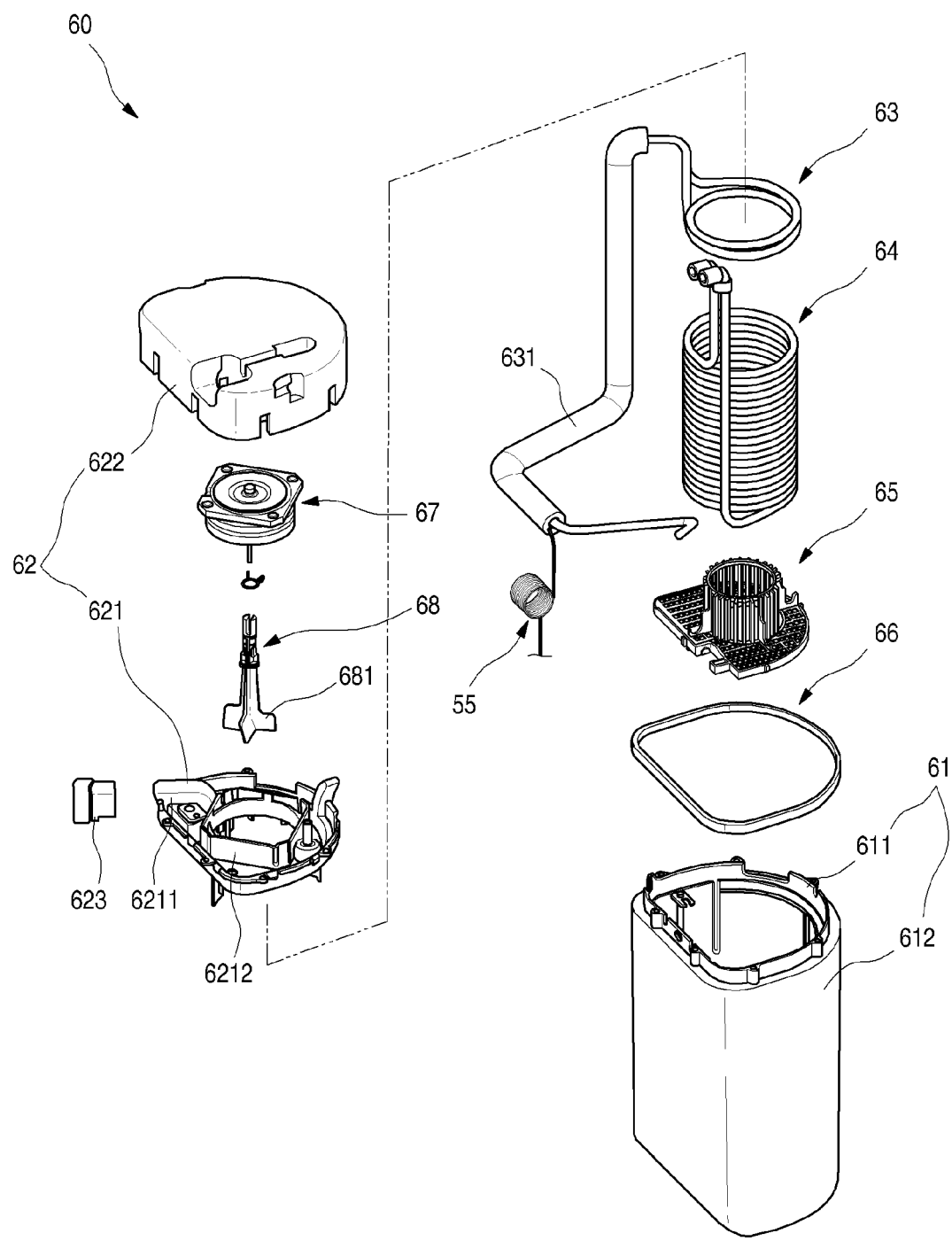
FIG. 29 is an exploded perspective view of the cooling tank.
Figure 30:
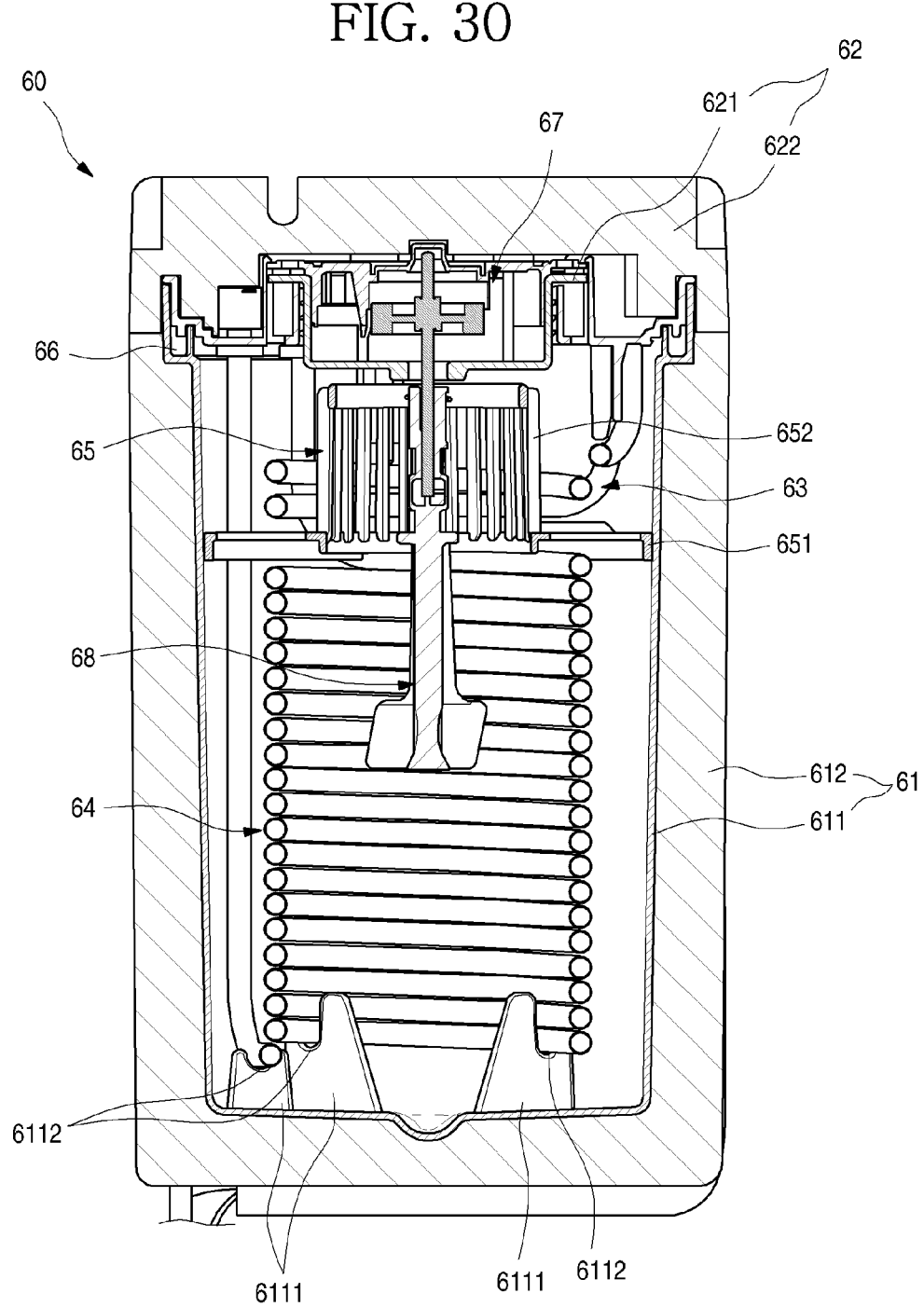
FIG. 30 is a cross-sectional view taken along line 30-30' of FIG. 29.

Referring to FIGS. 28 to 30, the cooling tank 60 may be used to make cold water by cooling purified water passing through the filter 34, and may be filled with cooling water heat-exchanged with introduced purified water. An evaporator 63 for cooling the cooling water may be accommodated in the cooling tank 60. The evaporator 63 may allow the purified water to be cooled by passing the purified water through the inside of the cooling tank 60.

Referring to FIG. 2, a support plate 35 extended to the cooling tank 60 side may be further provided at one side of the filter bracket 30. The support plate 35 may be provided at an upper position of the compressor 51, and may extend from the filter bracket 30 to the condenser bracket 54, and provide a space in which a heating and control module (or controller) 50 is mounted.

Figure 20:
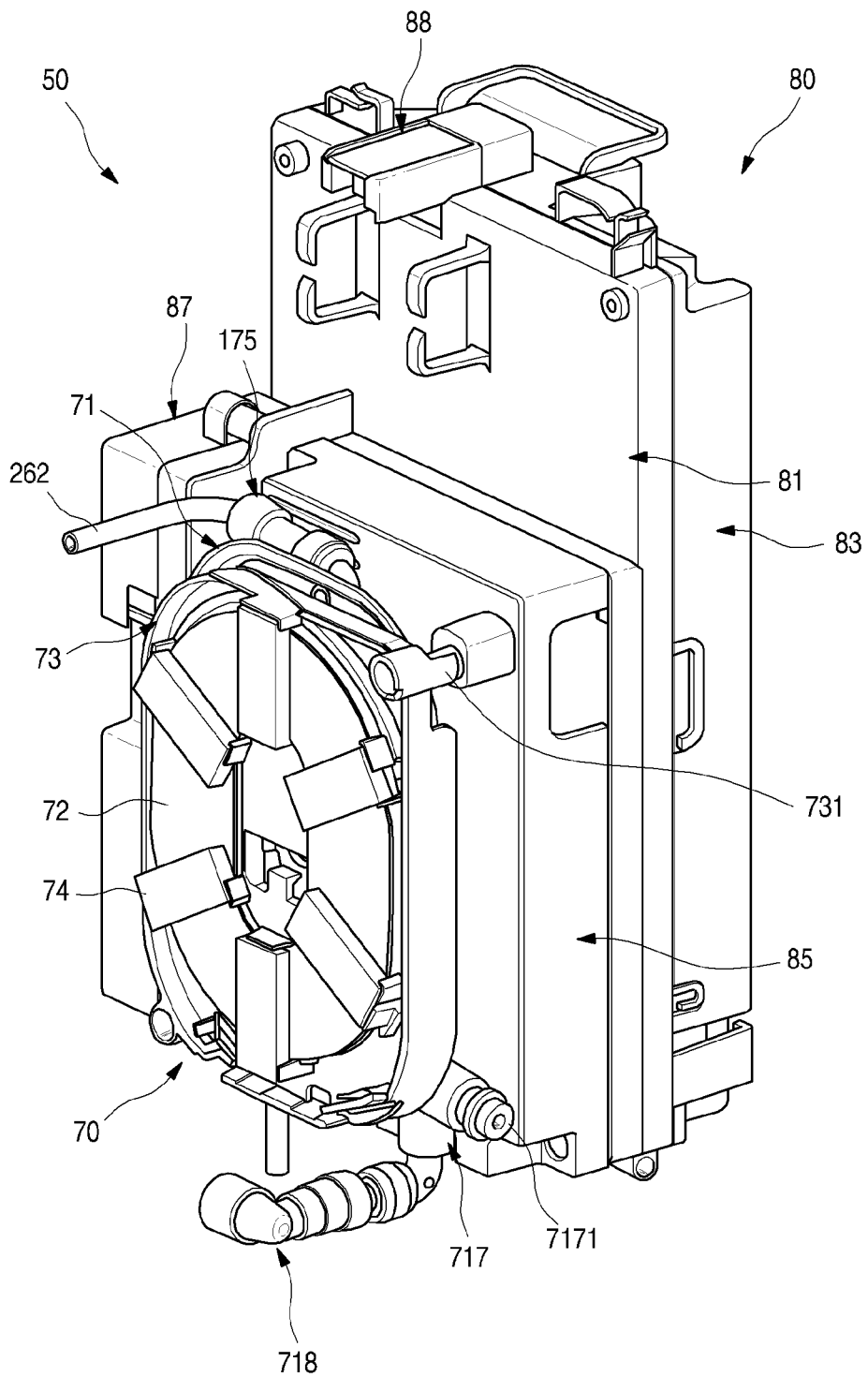
FIG. 20 is a perspective view of a heating and control module of the water purifier.
Figure 21:
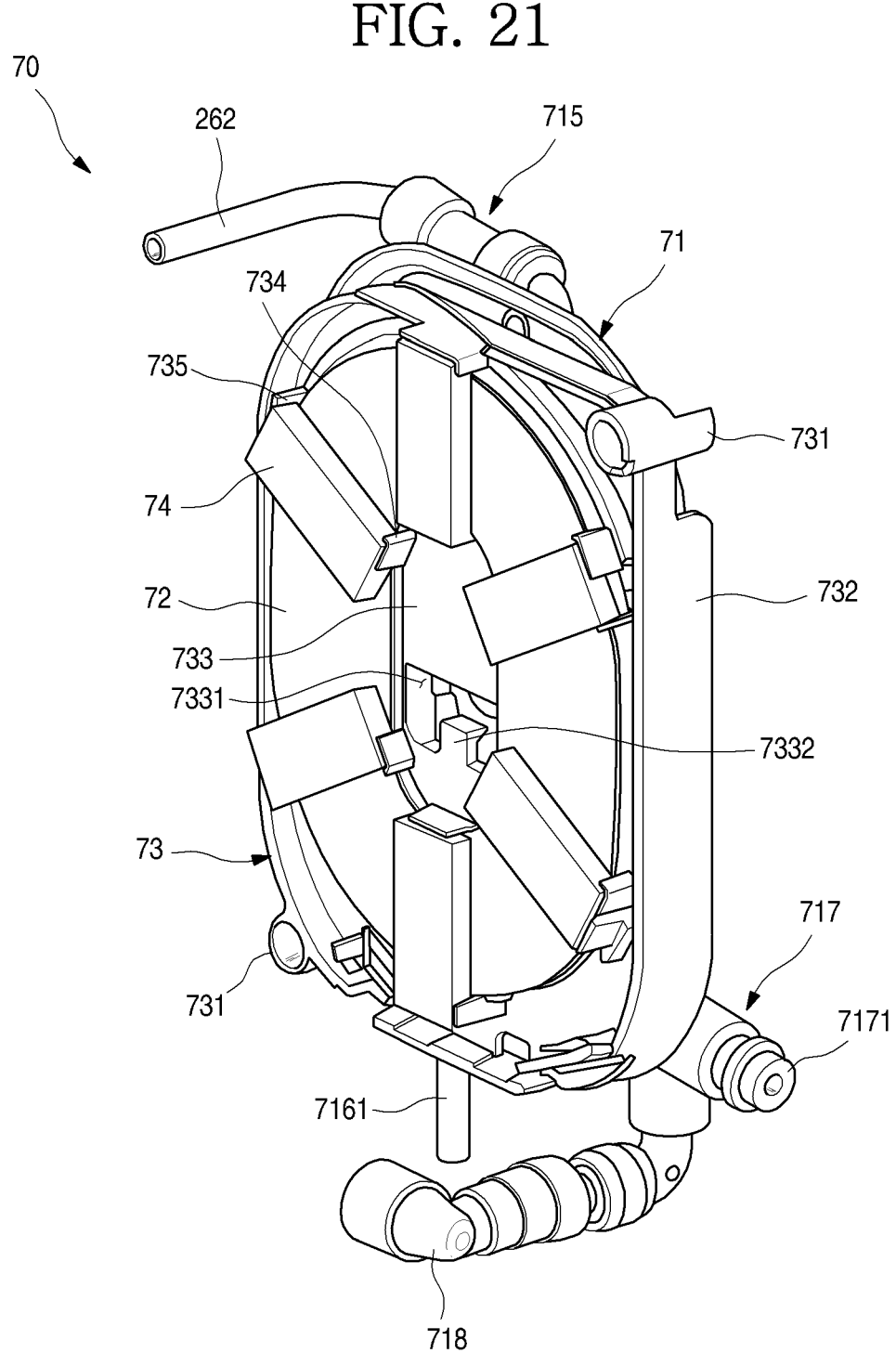
FIG. 21 is a perspective view of an induction heating assembly of the water purifier seen from the front.
Figure 22:
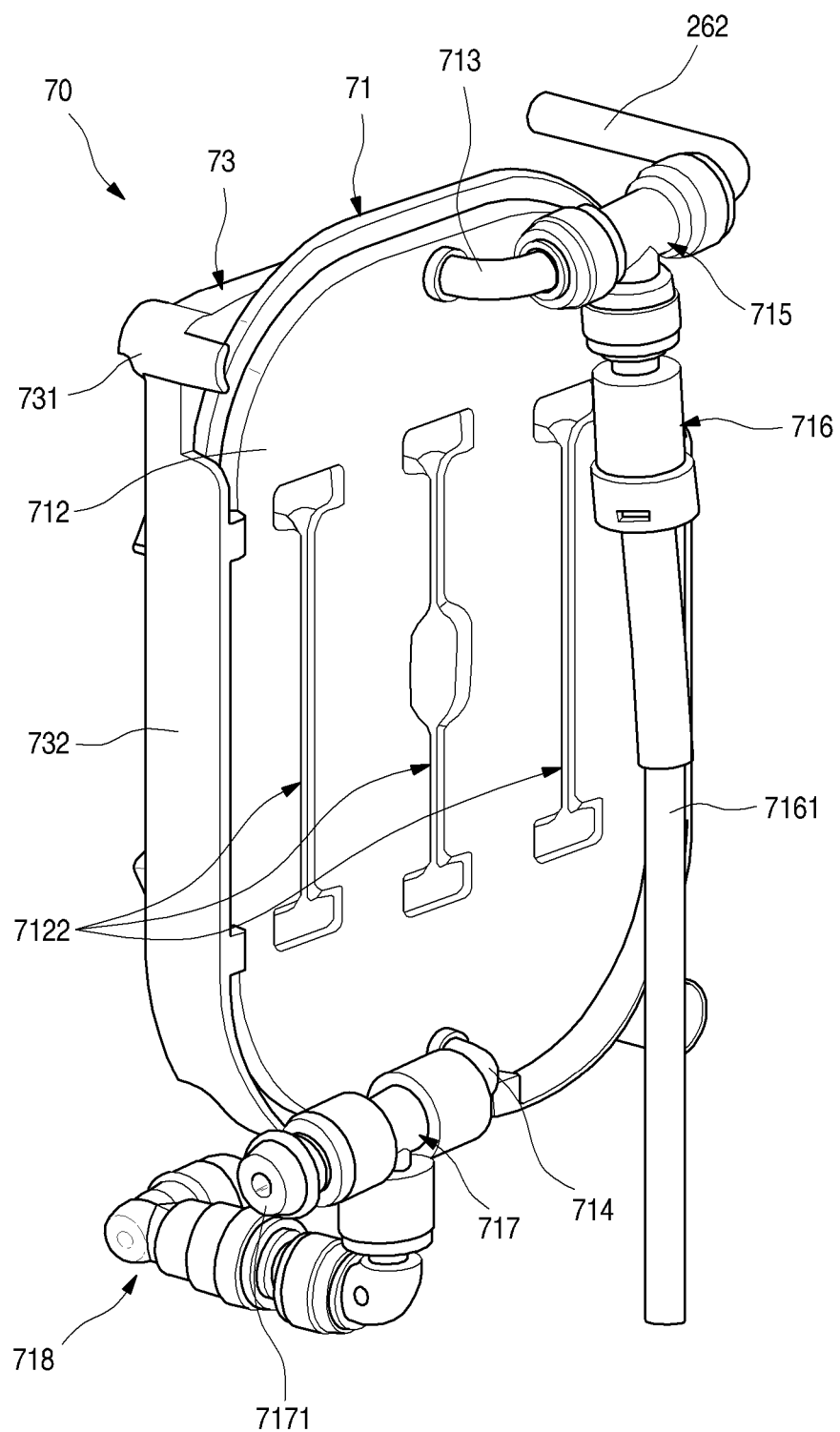
FIG. 22 is a perspective view of the induction heating assembly seen from the rear.

Referring to FIGS. 20 to 22, the heating and control module 50 may include an induction heating assembly (or induction water) 70 to make hot water and a control assembly 80 to drive the water purifier 1. The induction heating assembly 70 and the control assembly 80 may be coupled each other and may be coupled in one module state, and may be mounted on the support plate 35 in the coupled state.

The induction heating assembly 70 may heat purified water, and may heat in an induction heating (IH) method. The induction heating assembly 70 may heat water promptly at a high speed upon a hot water take-out operation, and it may heat the purified water to a desired temperature and provide to the user by controlling an output of a magnetic field. Therefore, it is possible to take out the hot water of a desired temperature according to the user's operation.

The control assembly 80 may drive the water purifier 1, and may control the compressor 51, the cooling fan 53, various valves and sensors, the induction heating assembly 70, and the like. The control assembly 80 may be modularized and configured by a combination of PCBs divided in a plurality of parts by function. That is, in a structure in which the water purifier 1 only takes out cold water and purified water, the PCB for controlling the induction heating assembly 70 may be emitted, and in this method, at least one or more PCBs may be emitted.

Figure 3:
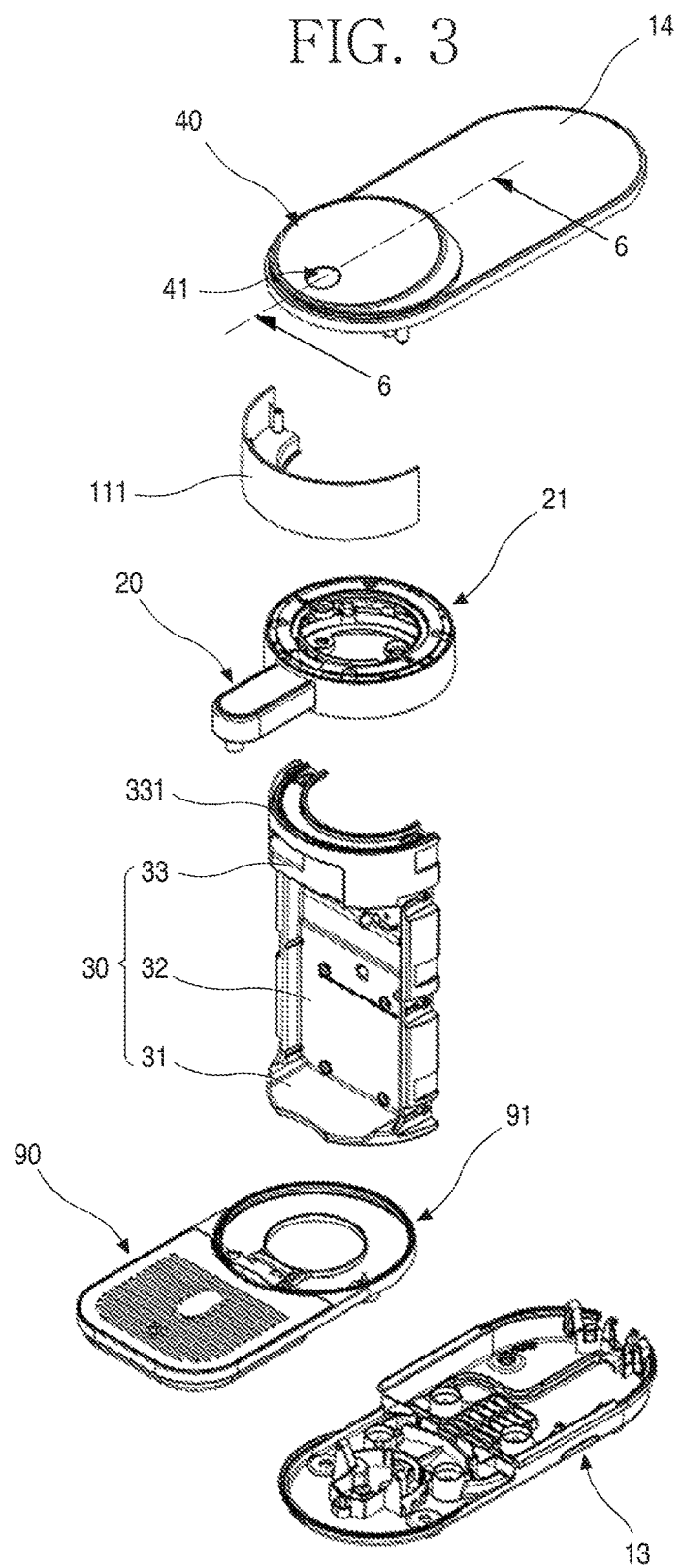
FIG. 3 is an exploded perspective view illustrating an assembly structure of a top cover, a filter bracket and a base of the water purifier.

Hereinafter, each configuration of the water purifier will be described in detail with reference to the drawings. As shown in FIG. 3, the rotation ring 91 may be mounted on one side of the front surface of the base 13, and the tray 90 may be detachably coupled to the rotation ring 91. The tray 90 may protrude forward from the base 13 while being coupled to the rotation ring 91.

The filter bracket 30 may include a bottom surface part (or bottom surface) 31 coupled with the base 13, a filter accommodating part or space 32 in which the filter 34 is accommodated, and a rotator mounting part (or rotator mount) 33 in which the rotator 21 is mounted. The bottom surface part 31 may correspond to a shape of a front end of the base 13, and may be coupled to the base 13. By the coupling of the bottom surface part 31, a mounting position of the filter bracket 30 may be fixed, and a bottom surface shape of the filter accommodating part 32 may be formed.

The filter bracket 30 may be coupled to the base 13 by a hook method, and it may be fixed by a screw fastened to a lower surface of the base 13. The bottom surface part 31 may be coupled with the base 13 at the inner area of the rotation ring 91, and configured so as not to interfere with the rotation ring 91, and thus the rotation ring 91 and the tray 90 may rotate smoothly.

The filter accommodating part 32 may be formed in a vertical direction, and may form a recessed space so that the filter 34 may be accommodated when viewed from a front portion (left side in FIG. 3). A plurality of filters 34 may be mounted on the filter accommodating part 32. The filters 34 may purify supplied raw water, and may be configured so that filters having various functions are combined.

A filter socket 341 in which the filters 34 are mounted may be further provided in the filter accommodating part 32, and a pipe to distribute purified water may be provided in the filter socket 341, and the pipe may be connected to the plurality of valves 366, 367, and 369. Therefore, the raw water may flow to the plurality of valves 366, 367, and 369 to supply water after passing through the filters 34 in turn. The plurality of valves 366, 367, and 369 may be provided on a rear surface (opposite surface of a surface in which the filters are mounted) of the filter accommodating part 32, and the valves 366, 367, and 369 may selectively supply purified water, cold water, and hot water to not only the filter 34 but also the cooling tank 60, the induction heating assembly 70, and the water discharge part 20.

The rotator mounting part 33 may be formed on an upper end of the filter accommodating part 32. The rotator mounting part 33 may have a semicircle shape protruding forward so as to have a predetermined curvature, and may have a structure in which the rotator 21 may be seated. The rotator mounting part 33 may have a curvature corresponding to an outer side surface of the rotator 21. Therefore, the rotator 21 may be rotated while being seated on the rotator mounting part 33.

An internal gear 331 may be formed on an upper end of the rotator mounting part 33. The internal gear 331 may have a curvature corresponding to the rotator mounting part 33, and may be coupled with a pinion gear 271 described below and allow the rotator 21 to be rotated smoothly. The rotator 21 may be formed in a circular shape, and the water discharge part 20 protruding forward may be further formed on the rotator 21. The water discharge part 20 may be formed integrally with the rotator 21, and may be rotated together when the rotator 21 is rotated.

The upper cover 111 may be formed above the rotator 21. The upper cover 111 may form a front surface exterior of the water purifier 1 with the lower cover 112 shielding the filter bracket 30 in front. Therefore, the upper cover 111 may form a part of the front surface exterior of the water purifier 1 between the rotator 21 and the top cover 14, and may be round.

The top cover 14 may be provided on an upper end of the upper cover 111. The top cover 14 may form the upper surface of the water purifier 1. The operation part 40 may be mounted on the top cover 14. The operation part 40 may have a circular shape and coupled with the rotator 21 and configured to be rotated together with the rotator 21. A take-out button 41 may be provided in the operation part 40. The take-out button 41 may be formed so that the center of the take-out button 41 is positioned on or near an imaginary line connecting the center of the rotation central axis of the rotator 21 and the center of the water discharge nozzle 25.

Figure 4:
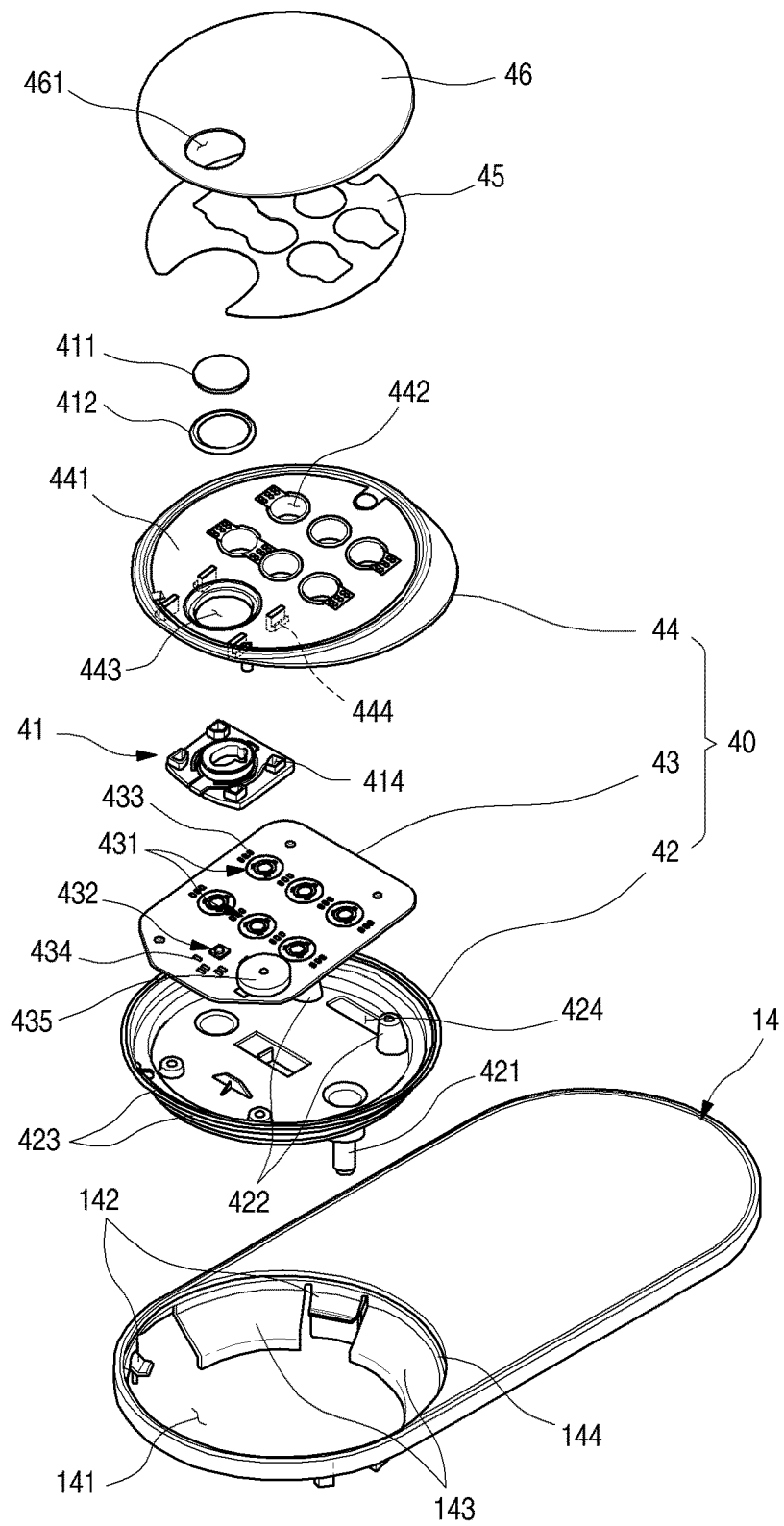
FIG. 4 is an exploded perspective view of the top cover and an operation part of the water purifier according to an embodiment of the present disclosure.
Figure 5:
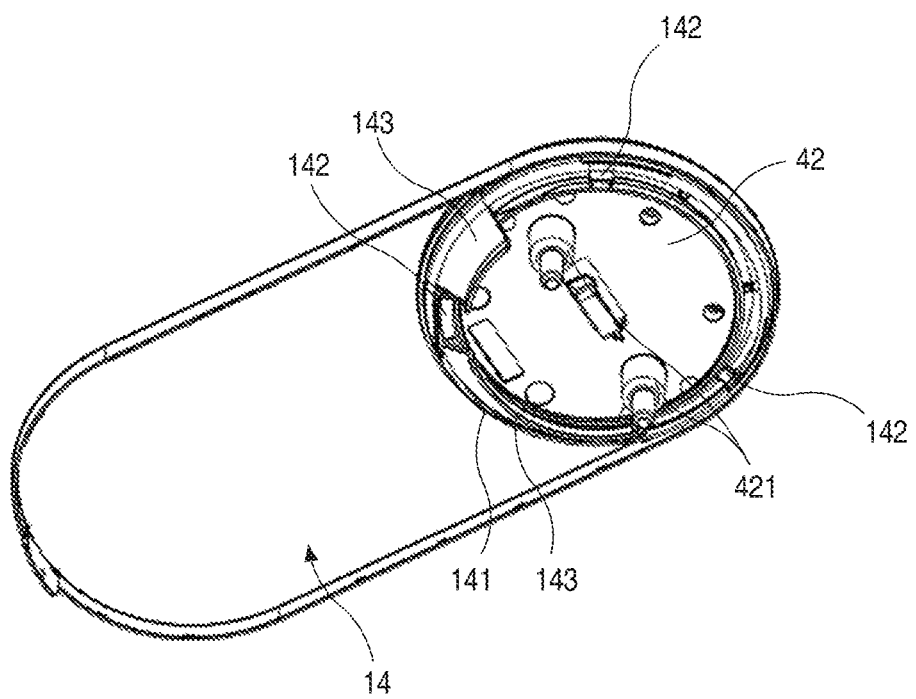
FIG. 5 is a perspective view of a state in which the operation part and the top cover are coupled, seen from the lower portion.
Figure 6:
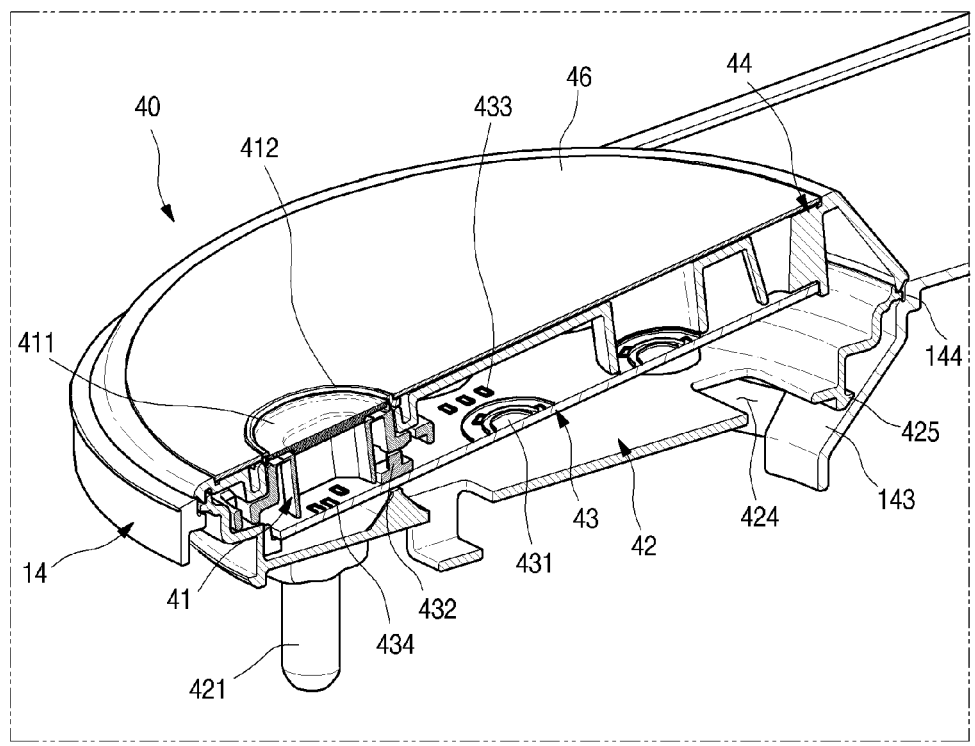
FIG. 6 is a cross-sectional view taken along line 6-6' of FIG. 3.
Figure 7:
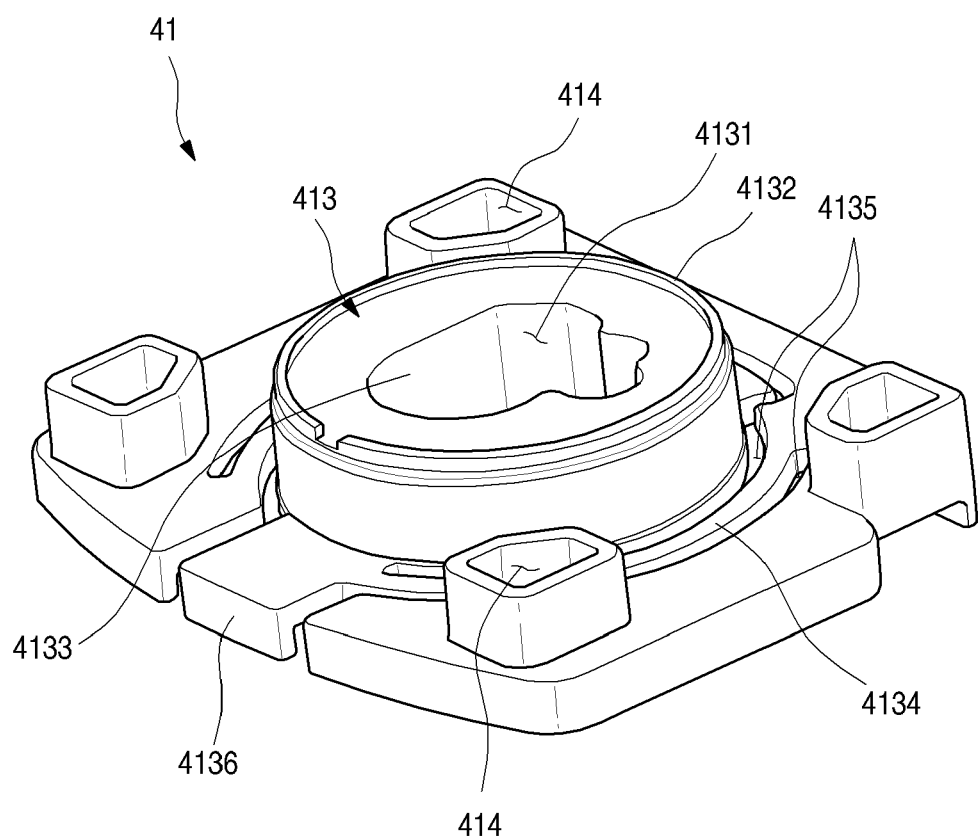
FIG. 7 is a perspective view of a take-out button of the water purifier seen from the upper portion.
Figure 8:
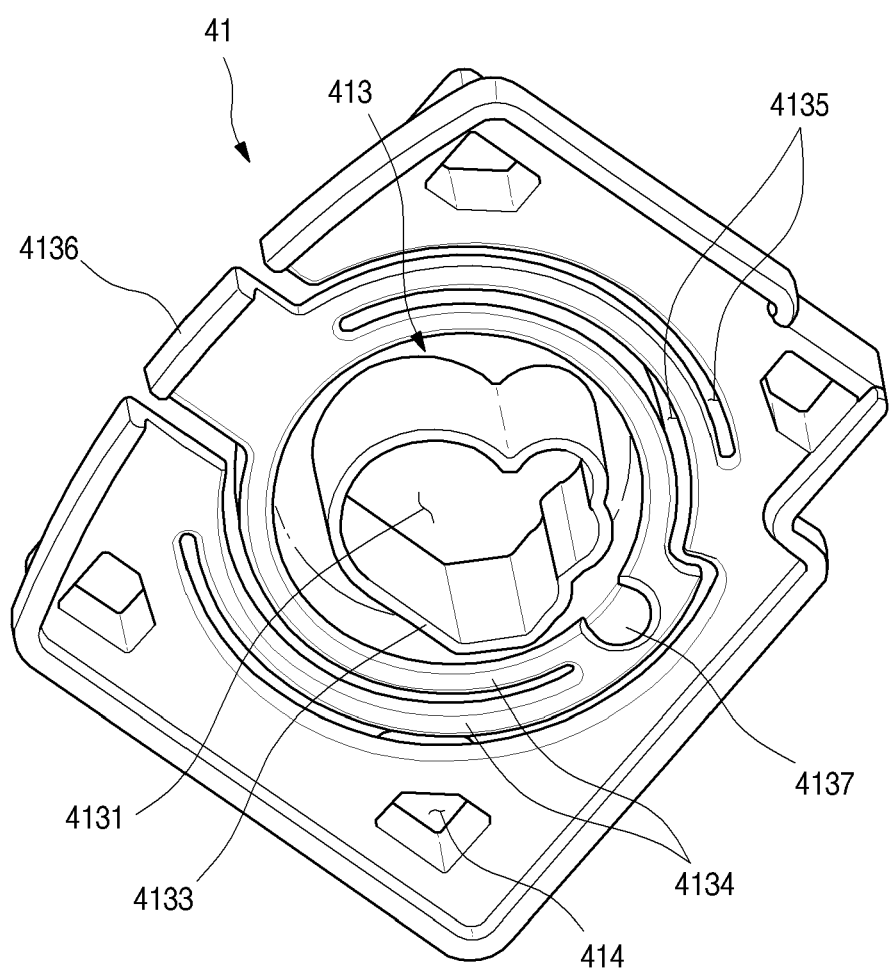
FIG. 8 is a perspective view of the take-out button seen from the lower portion.
Figure 9:
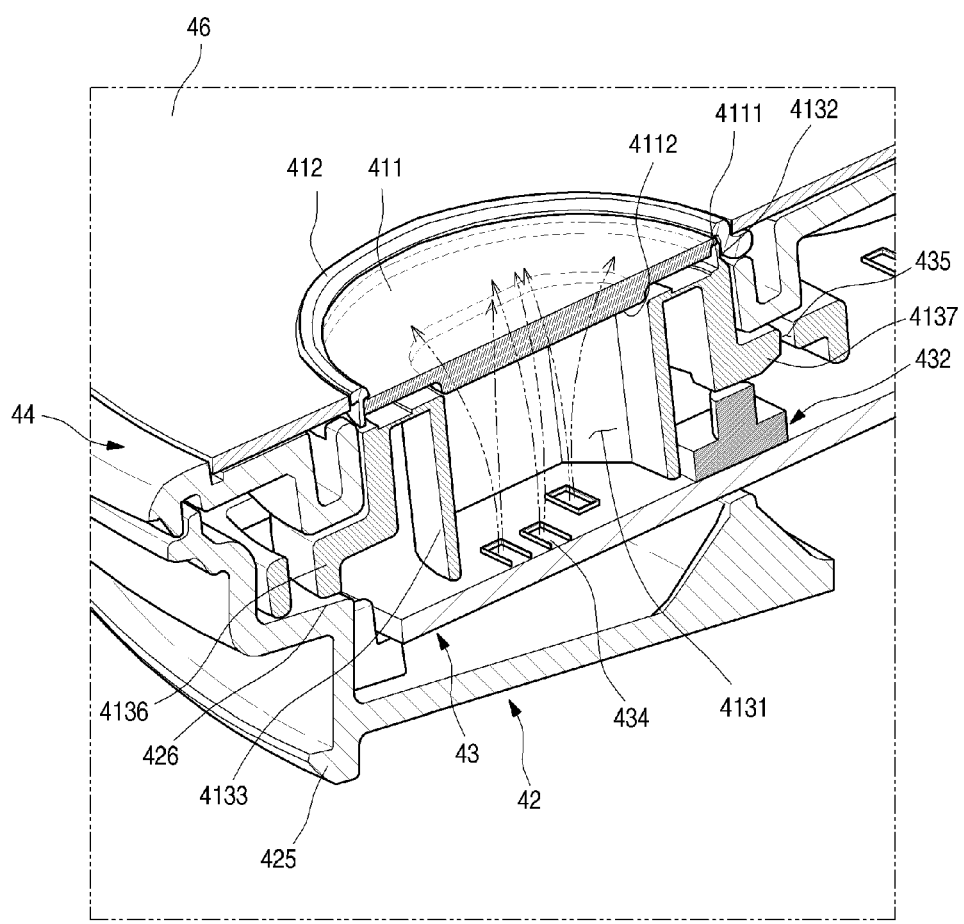
FIG. 9 illustrates a lighting state of a switch LED of the water purifier.
Figure 10:
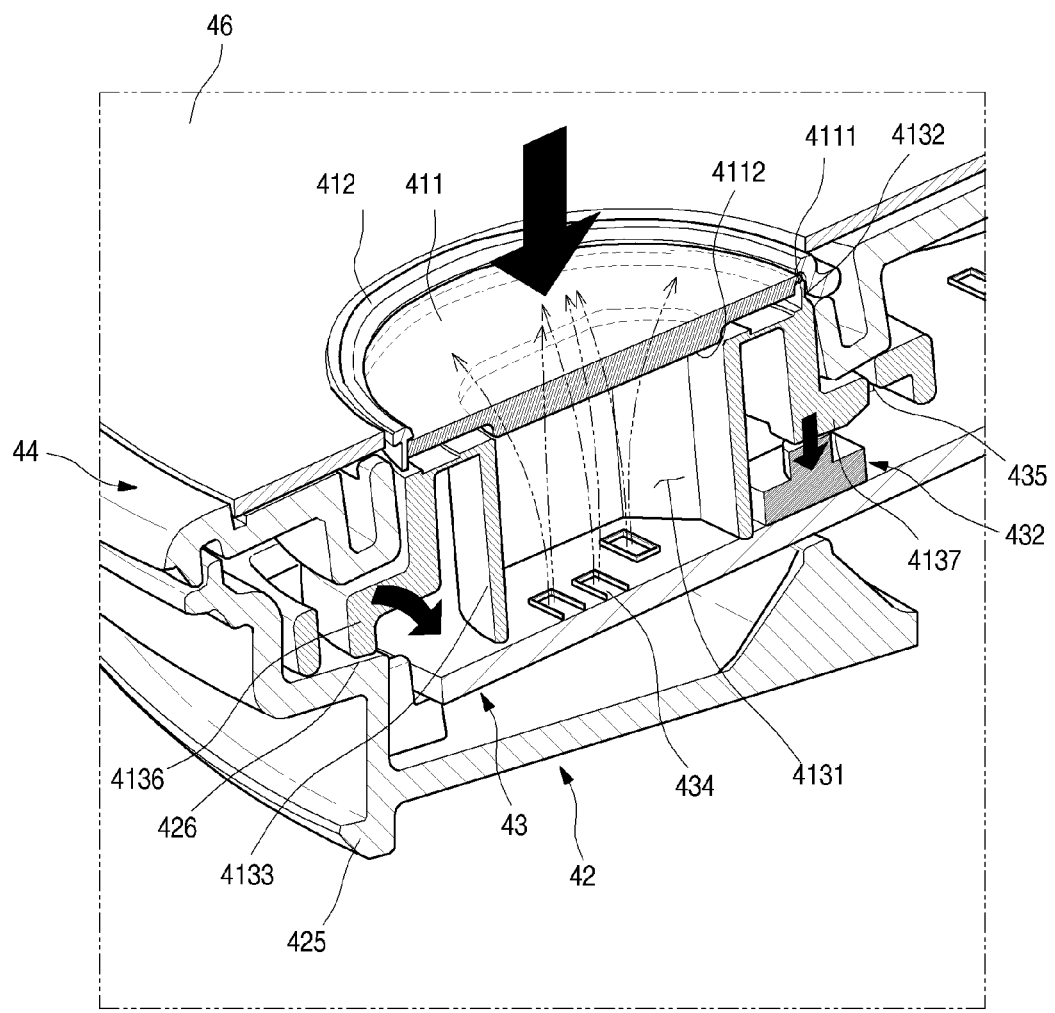
FIG. 10 illustrates an operating state of the take-out button.
Figure 11:
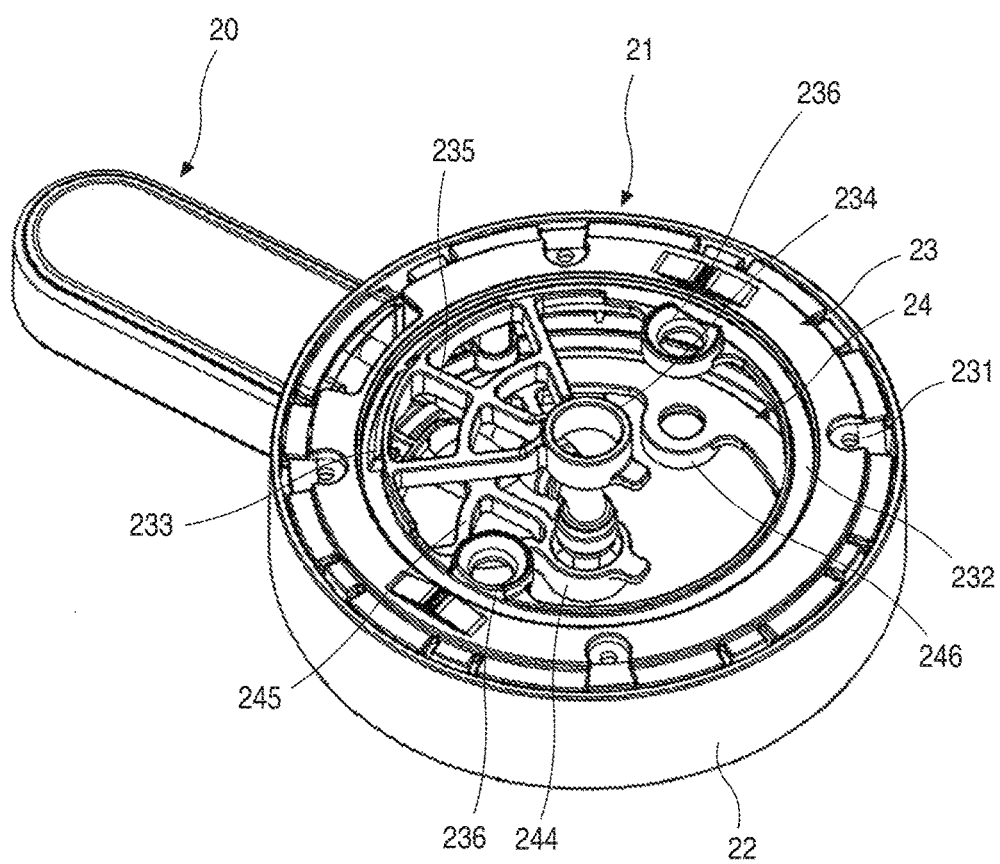
FIG. 11 is a perspective view of a rotator of the water purifier seen from the upper portion.
Figure 12:
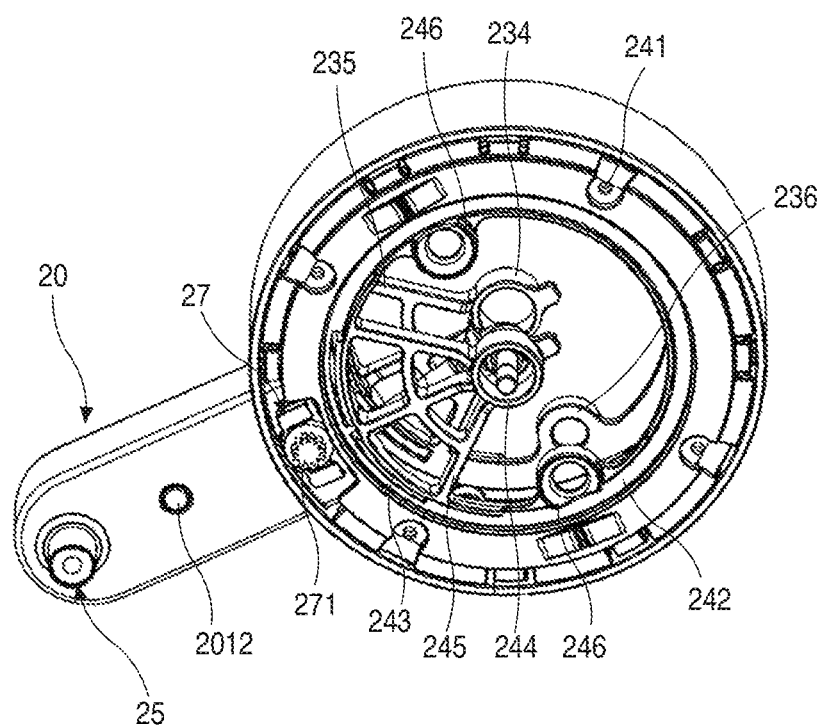
FIG. 12 is a perspective view of the rotator seen from the lower portion.
Figure 13:
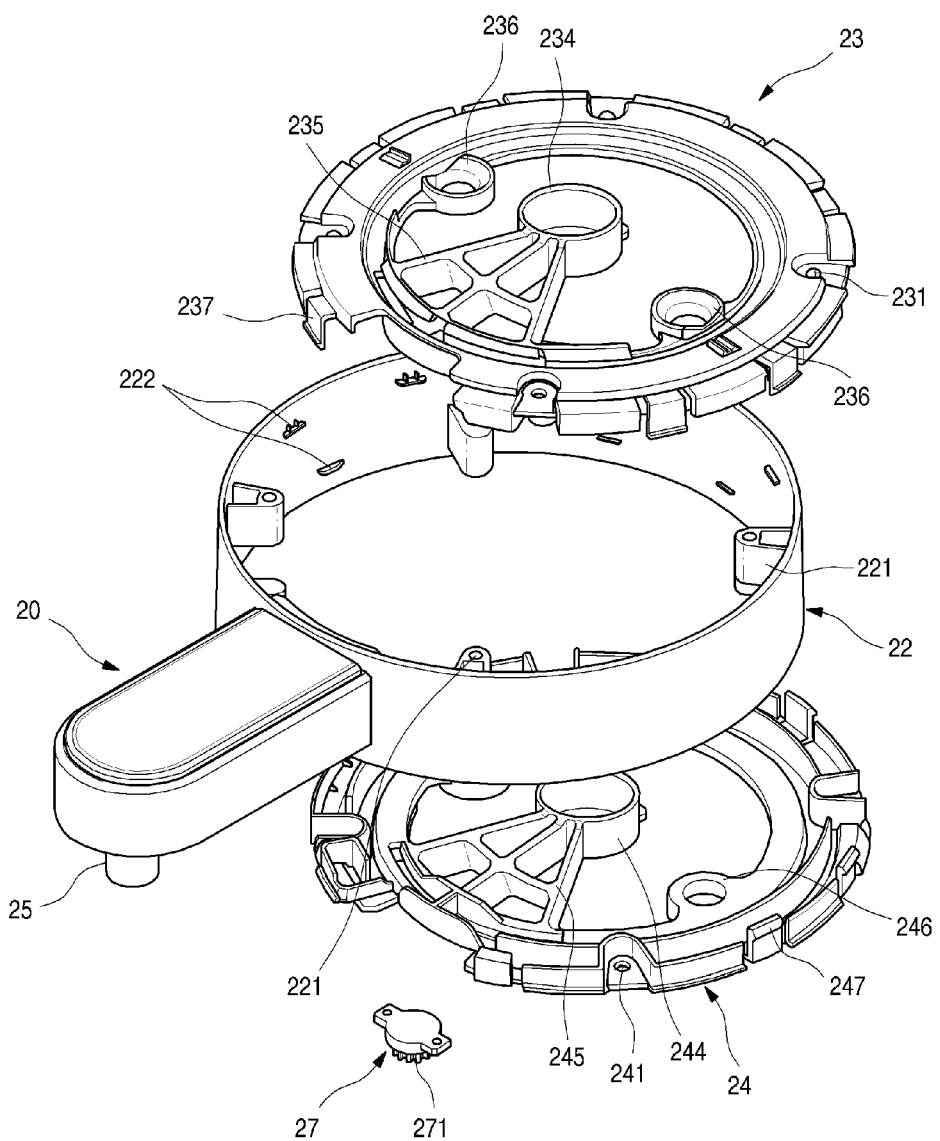
FIG. 13 is an exploded perspective view of the rotator of the water purifier.
Figure 14:
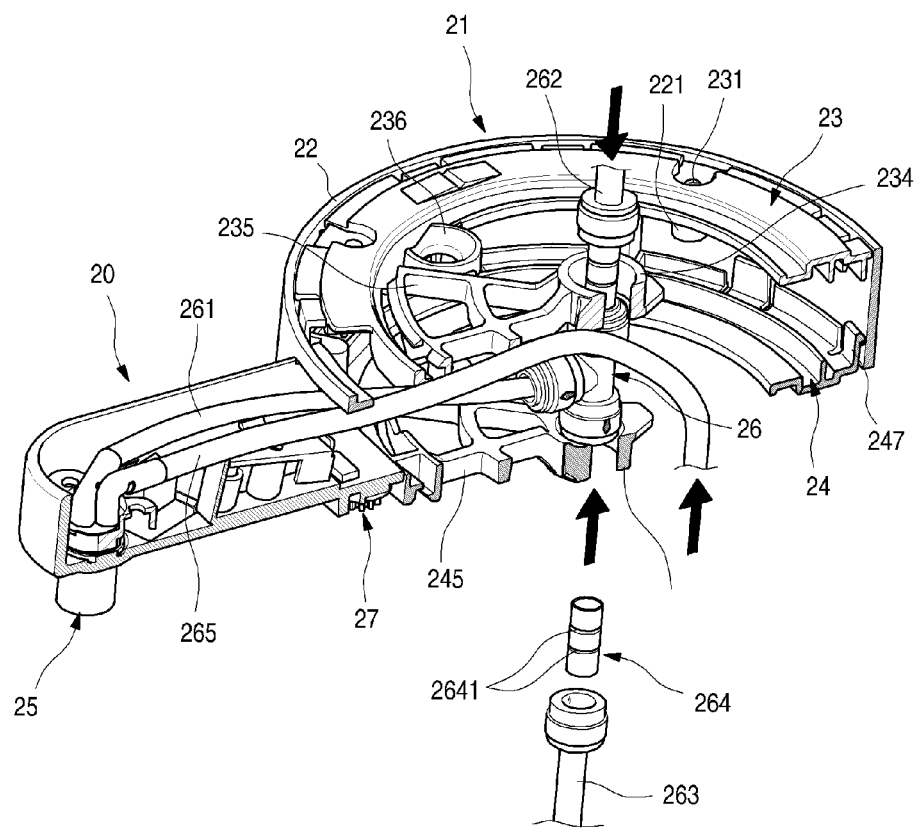
FIG. 14 illustrates a flow path structure of the rotator and an interior of a water discharge part.

As shown in FIGS. 4-6, the top cover 14 may form the upper surface of the water purifier 1. Front and rear ends of the top cover 14 may be round, and coupled with the front cover 11 and the rear cover 12, and formed to have a curvature corresponding to an upper end of each of the front cover 11 and the rear cover 12.

A cover hole 141 may be formed on the top cover 14. The cover hole 141 may be opened in a size and shape corresponding to the operation part 40 so that the operation part 40 may be rotatably mounted.

A base mounting part (or base mount) 142 and a base supporting part (or base support) 143 to fix an operation part base 42 forming a lower portion of the operation part 40 may be formed inside the cover hole 141. The base mounting part 142 may be extended from the cover hole 141 toward a central side of the cover hole 141, and provided in plural to be spaced at equal intervals. The base mounting part 142 may be formed in a shape in which an end part is bent inward, and may press and circumferential surface of the operation part base 42.

The base supporting part 143 may extend from a rear portion to an inner side of the cover hole 141. The base supporting part 143 may have a downward slope toward the center of the cover hole 141, and may support the operation part base 42 from the lower portion. A projection 425 protruding to have an inclined surface corresponding to the base supporting part 143 may be formed on the circumferential surface of the operation part base 42. Therefore, the base supporting part 143 and the projection 425 may maintain a state of contact with each other and a stable supporting state may be maintained even when the operation part 40 is rotated.

A step part 144 may be formed on the periphery of the cover hole 141 and the circumference of the operation part 40 may be seated on the step part 144. Therefore, the operation part 40 may be supported additionally, and the rotation of the operation part 40 may be made stably.

The operation part 40 may include the operation part base 42, an operation part PCB 43 and an operation part cover 44. The operation part base 42 may form lower portion exterior of the operation part 40 and may be mounted on the cover hole 141 and support so that the operation part 40 is rotatable at the top cover 14.

The operation part base 42 may have a same diameter as that of the cover hole 141. The circumference of the operation part base 42 may be extended upward and coupled with the operation part cover 44 to form a space therein.

A rotation connecting part 421 extended downward may be further formed at both sides of a lower surface of the operation part base 42. The rotation connecting part 421 may be coupled with the rotator 21 and may be connected to each other so that the rotator 21 may be rotated with the operation part 40.

Mounting bosses 422 and 423 for screw-fastening to fix and mount the operation part PCB 43 may protrude from the inner side of the operation part base 42. A wire hole 424 in which a wire connected with the operation part PCB 43 is accessed may be further formed on a bottom surface of the operation part base 42.

In the mounting bosses 422 and 423 supporting the operation part PCB 43, a mounting boss 422 positioned at a rear portion may be higher than a mounting boss 423 position at a front portion. Therefore, the operation part PCB 43 may be slanted that the rear end is higher than the front end. The slope of the operation part PCB 43 may correspond to a slope of an upper surface 441 of the operation part cover 44. Also, an upper surface of each of the mounting bosses 422 and 423 in which the operation part PCB 43 is seated may be slanted.

A plurality of operation members to operate the water purifier 1 may be mounted on the operation part PCB 43. The operation member may be a switch or sensor, and various types of input devices enabling a signal input by the user's operation may be used.

For example, a plurality of touch sensors 431 may be provided on the operation part PCB 43. The touch sensor 431 may detect a touch of the user, and a variety of touch sensors such as a touch resistive method, capacitive method, ultrasonic method, or infrared method may be used. The plurality of touch sensors 431 may be configured so that the user may select and operate a variety of functions such as a function of selecting purified water, cold water or hot water, a function of controlling a temperature control of hot water, a function of controlling the amount of taken out water, and the like through the user's touch input.

A switch 432 may be provided on one side of the operation part PCB 43. The switch 432 may be a general switch operated by a pressing operation, and may be pressed by an operation of the take-out button 41. The valves 366, 367, and 369 for the water discharge may be selectively driven by on and off of the switch 432, and selected water of the purified water, cold water, and hot water may be taken out.

A plurality of LEDs 433 and 434 may be provided on the operation part PCB 43. The plurality of LEDs 433 and 434 may display information and may display locations of the plurality of touch sensors 431 and the switch 432 or an operation state.

The plurality of LEDs 433 and 434 may be configured with a sensor LED 433 provided on a location adjacent to the touch sensor 431 in order to display the location of the touch sensor 431 or display the operating state of the water purifier 1, and a switch LED 434 provided at a location adjacent to the switch 432 to display the operating information of the water purifier 1. A separate display device may be further provided on the operation part PCB 43, and the operating state of the water purifier 1 may be output to the outside by the display device.

A buzzer 435 may be installed on the operation part PCB 43. The buzzer 435 may output the operating state of the water purifier 1 in sound. For example, when the water purifier 1 is operated abnormally, the buzzer 435 may output a sound and at this time, the output sound may be a sound or beep sound having a certain pattern and may transmit information to the user. Also, in typical operating conditions, not a malfunction situation, an operating state may be transmitted through the buzzer 435.

The operation part base 42 may be coupled to the operation part cover 44. The operation part cover 44 may form an upper portion shape of the operation part 40, and form an exterior appearance of the operation part 40 exposed to the outside while the operation part 40 is mounted on the top cover 14.

The lower surface of the operation part cover 44 may have a circular shape corresponding to the upper surface of the operation part base 42, and the upper surface of the operation part cover 44 may be formed obliquely. That is, the operation part cover 44 may be shaped such that a front end is low and a rear end is high, and it may be formed so that the upper surface 441 has a slope. The slope of the upper surface 441 of the operation part cover 44 may correspond to the slope of the operation part PCB 43 and improve the operability of the touch sensor 431 and the switch 432, while the user's usability and readability may be improved.

A plurality of sensor holes 442 may be formed on the upper surface of the operation part cover 44. The sensor holes 442 may be opened at a location corresponding to the touch sensors 431. Therefore, the user is able to operate the touch sensor 431 by touching an operation part plate 46 at a location corresponding to the sensor holes 442.

A button hole 443 may be formed on the operation part cover 44. The button hole 443 may be opened so that a part of the take-out button 41 may be accessed, and it may be positioned above the switch 432. A button hook part 444 in which the take-out button 41 is fixed and mounted may be formed on the outer side of the button hole 443. The button hook part 444 may have a hook shape which may be inserted into a hook hole 414 of the take-out button 41. The button hook part 444 may penetrate the hook hole 414, and an end of the button hook part 444 may have a hook shape so as to be held and restricted. Therefore, the take-out button 41 may be mounted at an exact position on the operation part cover 44 and the mounting position thereof may be maintained to be fixed.

The take-out button 41 may be provided on the lower surface of the button hole 443. A button plate 411 shielding the opening of the take-out button 41 and exposed to the outside may be provided on an upper surface of the take-out button 41. The button plate 411 may be transparent or semi-transparent, and it may be formed so that light emitted from the switch LED 434 provided on the operation part PCB 43 at the location corresponding to the button hole 443 may be transmitted. A button ring 412 may be provided on the periphery of the button plate 411. The button ring 412 may shield a space between the button plate 411 and the button hole 443.

An adhesive sheet 45 may be provided on the upper surface 441 of the operation part cover 44, and the operation part plate 46 may be provided on the upper surface of the adhesive sheet 45 and form the upper surface of the operation part 40. Both surfaces of the adhesive sheet 45 may have adhesive strength and attach the operation part plate 46 to the upper surface 441 of the operation part cover 44. A protrusion hole which corresponds to the sensor hole 442 and the button hole 443 may be formed on the adhesive sheet 45.

Since the operation part plate 46 forms an exterior appearance, it may be formed of glass, a high-gloss plastic material or a metal material. The operation part plate 46 may be formed of a transparent or semi-transparent material, and may allow light emitted from the sensor LED 433 which is adjacent to the touch sensor 431 to be transmitted, and thus the user may easily identify the operation location. A position of the touch sensor 431 or touch operation position of the user may be displayed on the operation part plate 46 by surface processing or printing as needed.

A hole 461 corresponding to the button plate 411 may be formed on the operation part plate 46, and the button plate 411 may be positioned on the hole 461 and may be possible to move independently. The operation part plate 46 and the button plate 411 may be formed of the same material and thus may have a uniform appearance.

As shown in FIGS. 7-10, the take-out button 41 may be mounted on the lower surface of the operation part cover 44, and the hook hole 414 may be formed on each of four edges. An edge of the hook hole 414 may be formed upward, and the button hook part 444 may be inserted into the hook hole 414 such that the button hook part 444 and the hook hole 414 may be coupled each other.

A pressing part 413 moved by a pressing operation of the user may be formed at the center of the take-out button 41. The pressing part 413 may have a size corresponding to a size of the button hole 443 so as to be positioned in the inner side of the button hole 443. The pressing part 413 may protrude upward and at least a part thereof may be positioned in the button hole 443 so that the user may perform a pressing operation.

A light transmitting part 4131 may be formed in the center of the pressing part 413, and the light transmitting part 4131 may be shielded by the button plate 411. A plate rib 4132 which allows the button plate 411 to be indented may protrude and formed on the outer side of the light transmitting part 4131.

A step part 4111 seated on the plate rib 4132 may protrude from the circumference of the button plate 411. Also, an insert part 4112 may protrude from the button plate 411, and the insert part 4112 may have a shape corresponding to the light transmitting part 4131 and may be inserted into the inner side of the light transmitting part 4131.

A light guide 4133 extended downward along the circumference of the light transmitting part 1431 may be further formed on the lower surface of the pressing part 413. The light guide 4133 may extend toward the operation part PCB 43 and form the light transmitting part 4131. The light guide 4133 may be spaced apart from the operation part PCB 43 at a predetermined distance so as not to interfere with the operation part PCB 43 when the pressing part 413 is moved.

The switch LED 434 may be positioned on the operation part PCB 43 corresponding to an inner side area of the light guide 4133. A plurality of switch LEDs 434 may be mounted, and one switch LED 434 may emit various colors of light.

The light emitted from the switch LED 434 may move along the light guide 4133 and pass by the light transmitting part 4131 and pass through the button plate 411. Therefore, the user may see the light emitted by passing through the take-out button 41, and also may confirm a life of the filter 34 or a selection state of hot water, cold water, and purified water through a color of light appearing through the take-out button 41.

For example, when a life of the filter 34 remains, the take-out button 41 may emit a blue color light, and when the life of filter 34 is expired and replacement is needed, orange color light may be omitted. Thus, the state of the filter 34 may be immediately delivered to the user, and a replacement period of the filter 34 may be notified.

An elastic part 4134 cut and formed along a circumference of the pressing part 413 may be formed on the circumference of the pressing part 413. The elastic part 4134 may be configured by a plurality of incision parts 4135, and it may be moved by being elastically deformed downwardly from the upper surface of the take-out button 41 when the pressing part 413 is pressed, and when a hand is released therefrom, the pressing part 413 may be returned to its original position by an elastic restoring force.

A rotation supporting part 4136 may protrude from a front end (left side in FIG. 10) of the pressing part 413, and a contact part 4137 may be formed at a rear end of the pressing part 413. The contact part 4137 may be position at an upper side of the switch 432. The rotation supporting part 4136 may protrude downward, but may maintain a contacted state with a base supporting part 426 of the operation part base 42 when the take-out button 41 is mounted.

Therefore, when the pressing part 413 is pressed, since the rotation supporting part 4136 is in contact with the base supporting part 426, the pressing part 413 may rotate in a clockwise direction (viewed in FIG. 9) an axis defined laterally by around the rotation supporting part 4136 even if the pressing part 413 is pressed at any position thereof. That is, the contact part 4137 may be moved downward. Especially, when the pressing part 413 pivots, a movement distance of the contact part 4137 positioned opposite to the rotation supporting part 4136 may be enough to press the switch 432.

The contact part 4137 may be positioned above the switch 432, and may maintain a separated state from the switch 432 before a pressing operation of the pressing part 413. When the pressing part 413 is pressed, the pressing part 413 may rotate around the rotation supporting part 4136, and the contact part 4137 may press the switch 432.

Due to this structure, the contact part 4137 may precisely press the switch 432 when the user presses any position of the pressing part 413. Also, as the switch 432 is positioned outside of the light transmitting part 4131, the switch LED 434 may be positioned on the opening location of the take-out button 41, and the light emitted from the switch LED 434 may be transmitted through the take-out button 41.

As shown in FIGS. 11-14, the rotator 21 may have a rotator housing 22. The rotator housing 22 may have a hollow part therein and may be formed in a cylindrical shape having a height shorter than the diameter.

The rotator 21 may have an upper portion guide bracket 23 and a lower portion guide bracket 24 spaced apart from each other on an inner upper portion and an inner lower portion of the rotator housing 22. A fastening part 221 may protrude from an inner side surface of the rotator housing 22, and fastening holes 231 and 241 may be formed at intervals in a circumferential direction on the upper portion guide bracket 23 and the lower portion guide bracket 24. A bolt may be inserted into the fastening part 221 through the fastening holes 231 and 241, and the upper portion and lower portion guide brackets 23 and 24 may be spaced apart each other from the inner side surface of the rotator housing 22.

A plurality of fastening hooks 237 and 247 may be formed along the circumference of the upper portion guide bracket 23 and the lower portion guide bracket 24, and a fastening projection 222 may be formed on the inner side surface of the rotator housing 22. The fastening hooks 237 and 247 and the fastening projection 222 may restrict each other and perform a provisional fix when the upper portion guide bracket 23 and the lower portion guide bracket 24 are coupled with each other.

The rotator 21 may further include rail accommodating grooves 232 and 242 concavely formed along a circumferential direction on the upper portion guide bracket 23 or the lower portion guide bracket 24. The rail accommodating grooves 232 and 242 may include a lower portion rail accommodating groove 242 accommodating a first rotation guide rail 332 formed on the upper cover 111 and an upper portion rail accommodating groove 232 accommodating a second rotation guide rail 1111. Rotation guide projections 233 and 243 protruding from one side surface of the upper portion rail accommodating groove 232 or the lower portion rail accommodating groove 242 in an upward direction or downward direction, or protruding from one side surface of the upper portion rail accommodating groove 232 and the lower portion rail accommodating groove 242 in the upward direction and downward direction may be formed.

The rotator 21 may include a circular shaped upper portion center ring 234 and a lower portion center ring 244 respectively arranged at central portions of the upper portion guide bracket 23 and the lower portion guide bracket 24. An upper connecting part 235 and a lower connecting part 245 may horizontally extend respectively from the inner side surfaces of the upper portion guide bracket 23 and the lower portion guide bracket 24 to the upper portion center ring 234 and the lower portion center ring 244, and the upper portion center ring 234 and the lower portion center ring 244 may be connected to and supported by the upper portion guide bracket 23 and the lower portion guide bracket 24 by the upper connecting part 235 and the lower connecting part 245. The upper and lower connecting parts 235 and 245 may each be formed in a sector shape and include a plurality of through-holes therein.

The upper portion center ring 234 and the lower portion center ring 244 may dictate an installation position of the water discharge pipe through which water is flowed to the user. The upper portion center ring 234 and the lower portion center ring 244 may be formed on the center of the rotator 21 and become a center of the rotation when the rotator 21 is rotated.

A T connector 26 may be provided on the upper portion center ring 234 and the lower portion center ring 244. One side of the T connector 26 may extend to the water discharge part 20 side and may be connected to a water discharge pipe 261 connected to the water discharge nozzle 25, and the other two sides thereof may be respectively connected to a cold water pipe 262 at an upper portion and a purified water pipe 263 at a lower portion. The purified water pipe 263 and the cold water pipe 262 may be connected to the T connector 26 by a rotation pipe 264.

The cold water pipe 262 and the purified water pipe 263 may respectively penetrate the upper portion center ring 234 and the lower portion center ring 244, and the T connector 26 may be positioned in a space between the upper portion center ring 234 and the lower portion center ring 244. Therefore, the T connector 26 may always maintain a constant location without being changed.

The rotation pipe 264 may be formed of a stainless material. A fitting groove 2641 may be formed along a circumference of the upper portion and the lower portion of the rotation pipe 264. A metal collet may be inserted in the fitting groove 2641 when an upper end and a lower end of the rotation pipe 264 are coupled to the T connector 26.

When the rotator 21 is rotated, the T connector 26 may be rotated around the rotation pipe 264, and twisting of a pipe forming a flow path for the water discharge may be prevented. Especially, the rotation pipe 264 may be a stainless material, so even in the combination of repetitive rotation by the rotation of the rotator 21 and the metal collet, the rotation pipe 264 may not be damaged or deformed, and thus a leakage may be prevented.

A hot water pipe 265 connected with a hot water tank 71 and supplying hot water may be directly connected to the water discharge nozzle 25 without going through the water discharge part 20. When hot water is taken out, water of the hot water tank 71 may be taken out directly, and the quality of water may be improved. In the case when using a common flow path for cold water or purified water, hot water which is first taken out may not satisfy the temperature by cold water or purified water that remains on the flow path when the hot water is taken out. In the case in which the separate hot water pipe 265 is connected to a take-out nozzle, the hot water of the hot water tank 71 may be supplied to the water discharge nozzle 25 without loss of temperature.

Two coupling rings 236 and 246 may be formed in the inner side of the upper and lower portion guide brackets 23 and 24. A circular coupling hole may be formed in each of the coupling rings 236 and 246, and one pair may be provided on both right and left sides. One pair of coupling rings 236 and 246 provided on both sides may be arranged symmetrically to each other relative to the center line crossing the rotation axis of the rotator 21 in a radial direction. The coupling rings 236 and 246 may be formed on both of the upper portion guide bracket 23 and the lower portion guide bracket 24 or only on the upper portion guide bracket 23.

The coupling rings 236 and 246 may be coupled to the rotation connecting part 421 at a bottom surface of the operation part 40. A pair of rotation connecting parts 421 may be inserted through the coupling rings 236 and 246, and therefore, when the rotator 21 is rotated, the operation part 40 may be rotated together.

When the operation part 40 and the rotator 21 are rotated together by the coupling of the operation part 40 and the rotator 21, the take-out button 41 and the water discharge part 20 may be rotated together. Thereby, as the take-out button 41 and the water discharge nozzle 25 are positioned on the same line and rotated, since the positions of the take-out button 41 and the water discharge nozzle 25 do not need to be adjusted separately, the user's operability may be improved.

An oil damper 27 may be provided on the bottom surface of the rotator 21, specifically on the lower portion guide bracket 24. The oil damper 27 may allow the rotator 21 to be rotated smoothly without a hanging feeling when the water discharge part 20 is rotated, and allow the rotator 21 to be rotated at a certain speed by simply applying a force of a predetermined size.

The oil damper 27 may have a general structure used for making a rotation speed constantly, and detailed description is omitted. The pinion gear 271 may be coupled to a rotation shaft of the oil damper 27, and the pinion gear 271 may move along the internal gear 331 formed on the upper end of the filter bracket 30.

The pinion gear 271 may be a circular shape having a curvature radius which is much smaller than the curvature radius of the internal gear 331, and the number of teeth thereof may also be small. When the rotator 21 is mounted on the upper end part of the filter bracket 30, the pinion gear 271 may be positioned on the inner side surface of the internal gear 331, and may be combined to be engaged with the internal gear 331.

Figure 15:
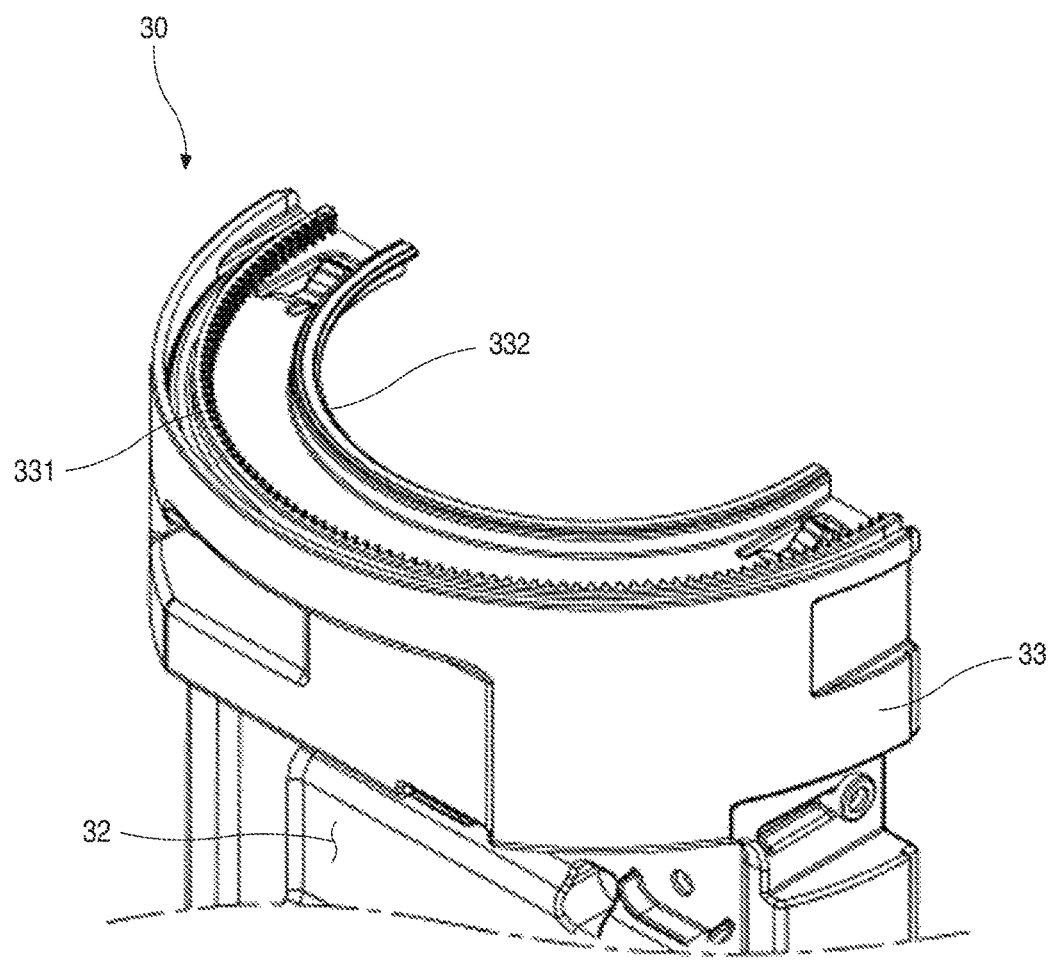
FIG. 15 is a partial perspective view of a filter bracket of the water purifier.
Figure 16:
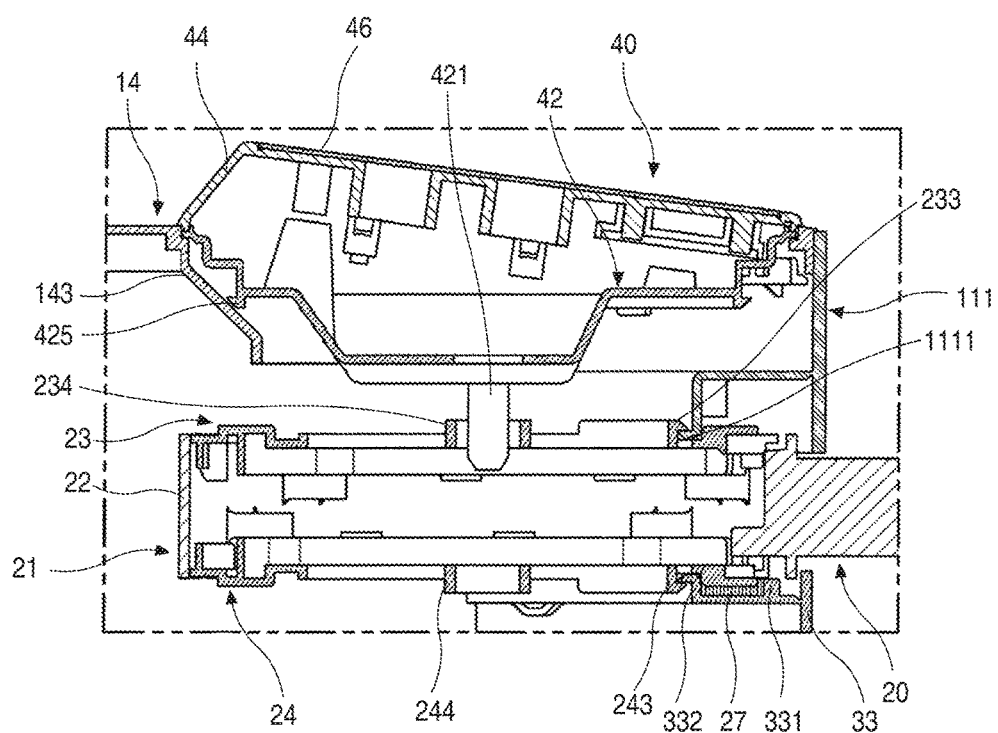
FIG. 16 is a cross-sectional view illustrating a coupling structure of the rotator.

As shown in FIGS. 15 and 16, the internal gear 331 may be formed on the upper end of the filter bracket 30. The internal gear 331 may have a constant curvature on the upper end part of the rotator mounting part 33. The internal gear 331 may be spaced apart from the first rotation guide rail 332 in a radial direction. The internal gear 331 may be positioned adjacent to an outer edge of the upper end portion of the filter bracket 30, and may be disposed concentrically with the first rotation guide rail 332. Therefore, when the rotator 21 is mounted, the internal gear 331 may be engaged with the pinion gear 271.

The rear surface of the filter bracket 30 may be opened rearward, and the rear end part of the filter bracket 30 may be coupled to the front end part of the side panel 15. The first rotation guide rail 332 may be provided on the upper end of the filter bracket 30 so that the rotator 21 is rotatably mounted in a left-right side direction.

The first rotation guide rail 332 may be formed of a semicircular curvature to guide a rotation of the rotator 21. The first rotation guide rail 332 may be fixed to an inside of the upper end part of the filter bracket 30.

The second rotation guide rail 1111 protruding from an inner surface of the upper cover 111 may be further provided. The second rotation guide rail 1111 may be formed on an upper portion facing the first rotation guide rail 332 in the same shape and guides the rotation of the rotator 21.

The first rotation guide rail 332 and the second rotation guide rail 1111 may be spaced apart from each other having the rotator 21 interposed therebetween. Therefore, by the mounting of the rotator 21, the upper end and lower end of the rotator 21 may be coupled with the first rotation guide rail 332 and the second rotation guide rail 1111 and guide the rotation of the rotator 21.

The rotator 21 may horizontally rotate the water discharge part 20 to the left or right side. The rotator 21 may have the rotation guide projections 233 and 243 formed at a constant curvature from the center part without having a rotation axis, and may be slidably coupled along the rotation guide rails 332 and 1111 by using the rotation guide projections 233 and 243.

Although there is a difference that the rotation guide projections 233 and 243 are provided on the rotator 21, and the rotation guide rails 332 and 1111 are provided on the filter bracket 30 and the upper cover 111, the rotation guide projections 233 and 243 and the rotation guide rails 332 and 1111 may be made of the same curvature and coupled to be engaged with each other, thereby guiding the rotation of the rotator 21. For example, the rotation guide projections 233 and 243 may be configured with a lower portion rotation guide projection 243 formed to protrude from the lower portion rail accommodating groove 242 of the lower portion guide bracket 24 in a downward direction and an upper portion rotation guide projection 233 formed to protrude from the upper portion rail accommodating groove 232 of the upper portion guide bracket 23 in an upward direction.

End parts of the rotation guide projections 233 and 243 may be formed in a hook shape. When the rotation guide projections 233 and 243 and the rotation guide rails 332 and 1111 are coupled, the inner surfaces of the end parts of the rotation guide projections 233 and 243 may be overlapped with and face a part of the rotation guide rails 332 and 1111 in the thickness direction, and they may be contacted.

The rotation guide projections 233 and 243 may have a same curvature as the rotation guide rails 332 and 1111, and slidably coupled to the rotation guide rails 332 and 1111 in the rotation direction. When the rotation guide projections 233 and 243 and the rotation guide rails 332 and 1111 are coupled, the rotation guide rails 332 and 1111 may be accommodated in the rail accommodating grooves 232 and 243 formed inwardly from the rotation guide projections 233 and 243, and one surface of the rail accommodating grooves 232 and 242 and the rotation guide rails 332 and 1111 may be overlapped in the thickness direction, and the end parts of the rotation guide projections 233 and 243 may be composed of the hook shape and coupled to be overlapped with the rotation guide rails 332 and 111 in the thickness direction.

According to this coupling structure, the water discharge part 20 may be rotated stably, and the location of the water discharge nozzle 25 may be changed freely without separating the water discharge part 20. In this case, a separate rotation shaft does not need to be formed on the center of the rotator 21.

In a structure in which the water discharge part 20 is formed to protrude from the one side surface of the rotator 21, even if the rotator 21 is rotated while holding the water discharge part 20, the water discharge part 20 may be lifted up or down by the eccentric load of the water discharge part 20, and thus a problem that the rotation of the water discharge part 20 and the rotator 21 becomes unstable may be eliminated. Also, the rotator 21 may be prevented from being detached by the hook shape of the rotation guide projections 233 and 243. When the rotator 21 is rotated, since a contact surface between the rotation guide projections 233 and 243 and the rotation guide rails 332 and 1111 is wide, in the case of rotating with holding the water discharge part 20, the eccentric load may be distributed, and thus damage such as wear and scratches due to friction may be reduced.

The rotation guide projections 233 and 243 respectively formed on the upper portion guide bracket 23 and the lower portion guide bracket 24 may be preferably made of a different material from that of the rotation guide rails 332 and 1111. The rotation guide projections 233 and 243 may be formed of engineering plastic (POM) which has excellent fatigue resistance, toughness, and wear resistance. Therefore, when the rotation guide projections 233 and 243 are rotated along the rotation guide rails 332 and 1111, the wear and noise due to a mutual friction between the rotation guide projections 233 and 243 and the rotation guide rails 332 and 1111 may be reduced.

Figure 17:
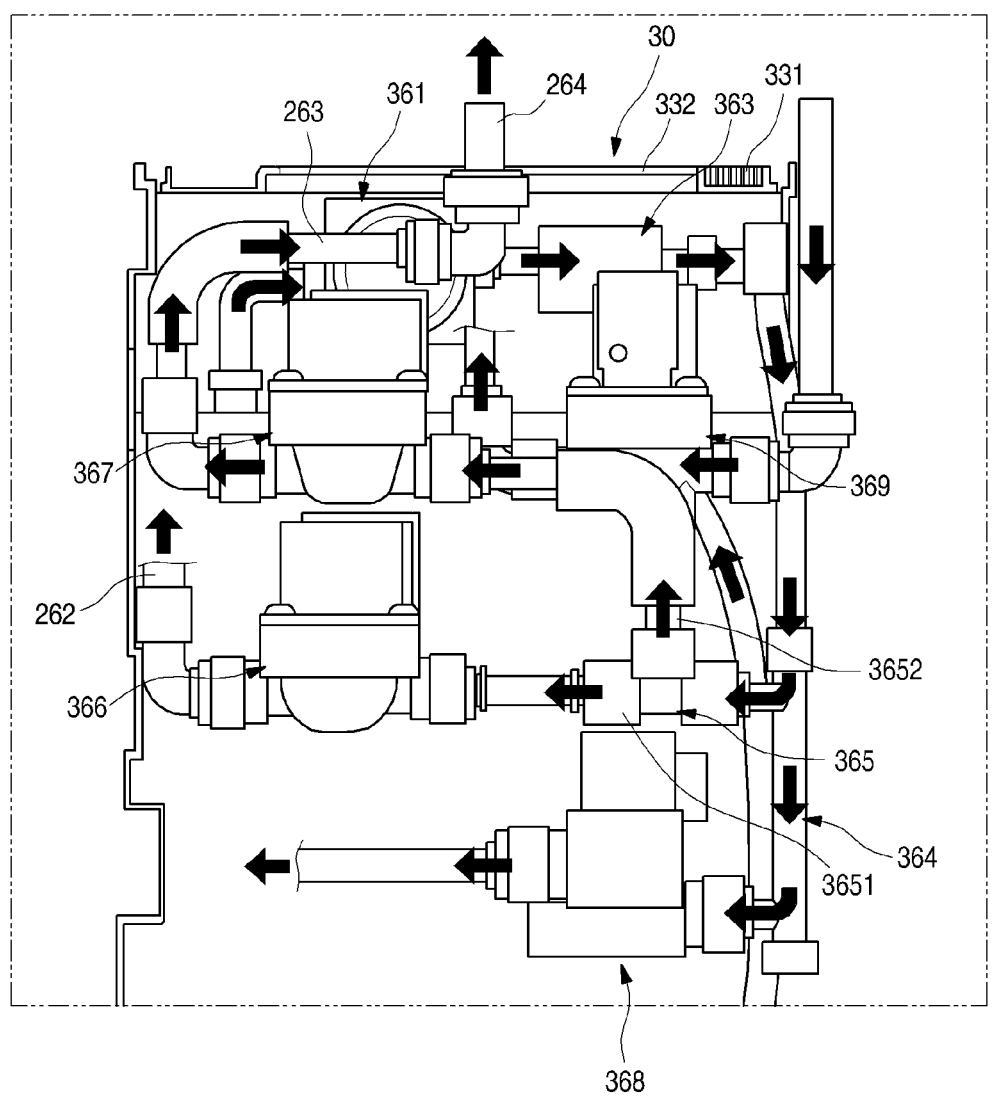
FIG. 17 is a view of an arrangement of a valve mounted on the filter bracket seen from the rear.

As shown in FIG. 17, a temperature sensor bracket 74, a water supply valve 361, a flow sensor 363, a purified water discharge valve 367, a cold water discharge valve 366, and a flow control valve 368 may be provided on the rear surface of the filter bracket 30. These valves may be provided on the rear surface of the filter bracket 30 on an upper portion area of the support plate 35 and may use the internal space of the water purifier 1 efficiently.

The water supply valve 361 may be connected to a pipe connected to the outlet side of the filter 34, and determine the flow of water supplied from the filter 34. The flow sensor 363 may be provided on the outlet side of the water supply valve 361 and detect a flow rate of water passing through the water supply valve 361.

A branch pipe 364 may be connected to a pipe connected to the outlet of the flow sensor 363. The outlet of the branch pipe 364 may be respectively branched to a cold purified water side 3641 and a hot water side 3642. A pipe connected to the cold purified water side 3641 of the branch pipe 364 may be branched again by a T connector 365, and branched to a cold water side 3651 and a purified water side 3652. The cold water side 3651 and the purified water side 3652 may be respectively connected to the cold water discharge valve 366 and the purified water discharge valve 367, and therefore, the supply of the purified water and cold water may be decided.

The purified water discharge valve 367 may be connected to the purified water pipe 263, and the purified water pipe 263 may be extended and connected to one side of the T connector 26 by the rotation pipe 264. The cold water discharge valve 366 may be connected to the cooling tank 60 and allow purified water to be supplied to the cooling tank 60 and cooled. The cold water pipe 262 may be connected to the outlet of the cooling tank 60, and the cold water pipe 262 may be extended and connected to another side of the T connector 26 by the rotation pipe 264.

A pipe connected to the hot water side 3642 of the branch pipe 364 may be connected to the flow control valve 368. The flow control valve 368 may control the flow rate of the water supplied to the hot water tank 71, and may heat water passing through the hot water tank 71 at a certain temperature or higher by controlling the flow rate.

In the case in which the amount of water passing through the hot water tank 71 is too much, the water rapidly passing through the hot water tank 71 may not be heated effectively, and in this situation, the temperature condition of hot water may not be satisfied. Therefore, in the case of taking out high temperature hot water, the water may be heated by controlling the amount of water supplied to the hot water tank 71. In the case in which the temperature of the supplied water is too low, the heating performance at the hot water tank 71 may be improved by reducing the amount of introduced water.

A water inflow temperature sensor may be provided on the flow control valve 368 or any one side of inlet and outlet of the flow control valve 368, and the opening degree of the flow control valve 368 may be controlled by the water inflow temperature sensor.

A pipe connected with the outlet of the flow control valve 368 may be connected to the inlet of the hot water tank 71, and the outlet of the hot water tank 71 may be connected to the hot water discharge valve 369, and hot water extraction may be determined by the opening and closing of the hot water discharge valve 369. The hot water discharge valve 369 may be connected to the hot water pipe 265, and the hot water pipe 265 may be connected to the water discharge nozzle 25 of the water discharge part 20 to take out water to the outside.

Figure 18:
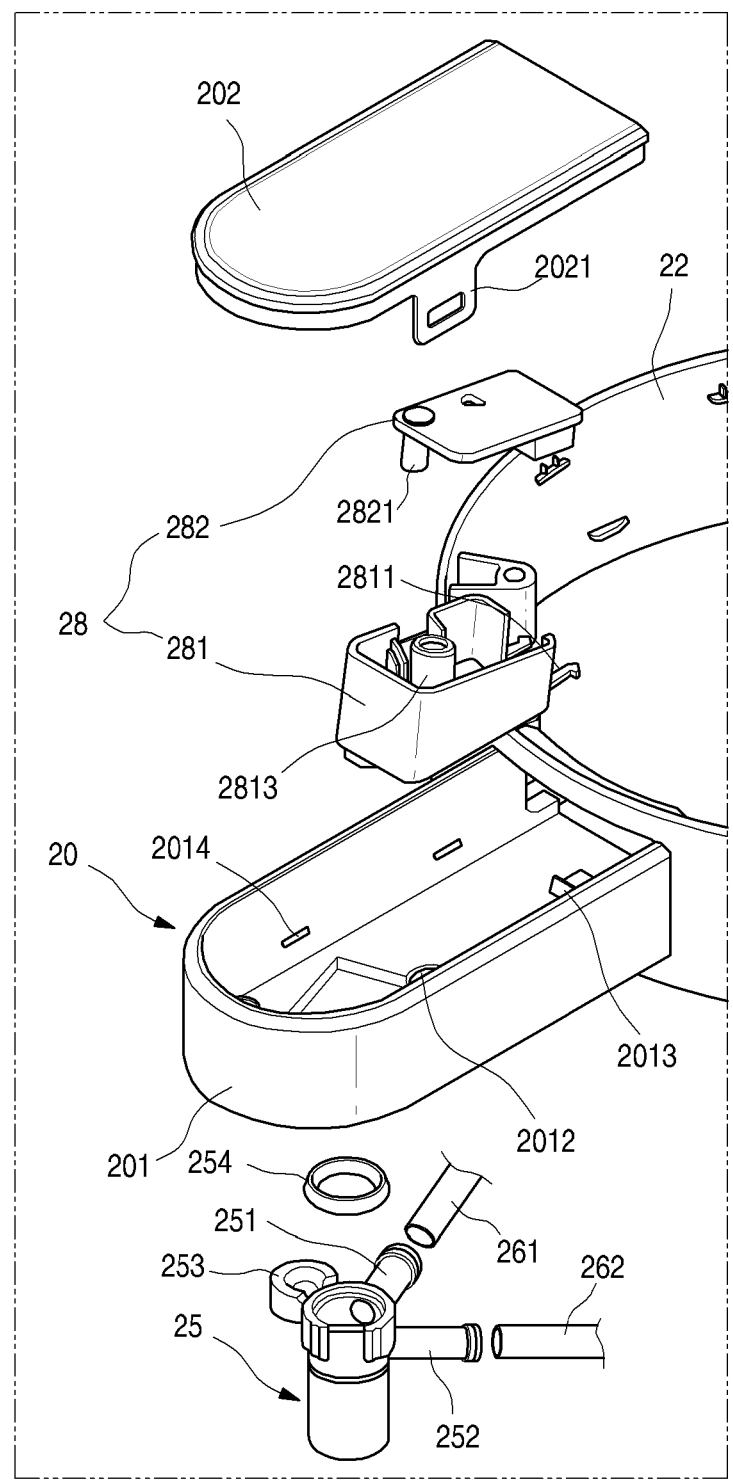
FIG. 18 is an exploded perspective view of the water discharge part of the water purifier.
Figure 19:
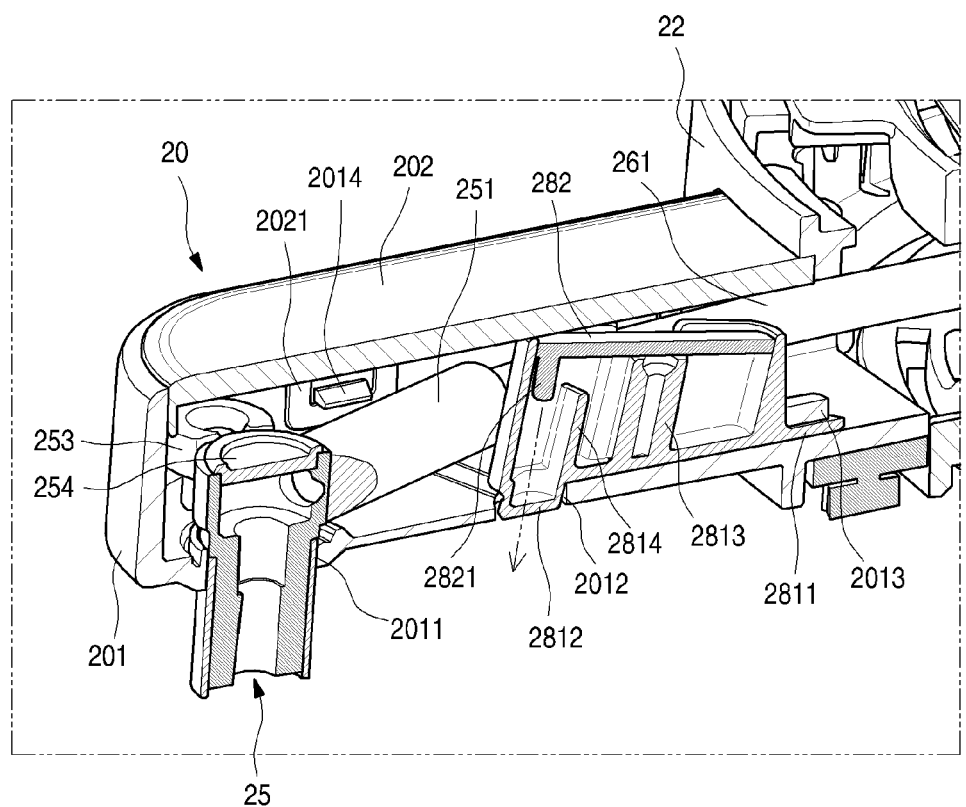
FIG. 19 is a cut-away perspective view of the water discharge part.

As shown in FIGS. 18 and 19, the water discharge part 20 may extend from the rotator housing 22, and communicate with the inner side of the rotator housing 22 so that the water discharge pipe 261 and the hot water pipe 265 may be introduced. The water discharge part 20 may include a water discharge part housing 201 and a water discharge part cover 202. An upper surface of the water discharge part housing 201 may be opened, and the water discharge part housing 201 may form a space in which the water discharge pipe 261 and the hot water pipe 265 may be disposed. The water discharge part cover 202 may shield the opened upper surface of the water discharge part housing 201.

A water discharge hole 2011 may be formed on a bottom surface of the water discharge part housing 201, and the water discharge nozzle 25 may be mounted on the water discharge hole 2011. The water discharge pipe 261 and the hot water pipe 265 connected to the water discharge nozzle 25 may be guided to the inner side of the rotator housing 22 through the inner side of the water discharge part housing 201.

The water discharge nozzle 25 may include a cold purified water connecting part 251 and a hot water connecting part 252 so as to be independently connected to the water discharge pipe 261 and the hot water pipe 265. The cold purified water connecting part 251 may extend so as to penetrate one side of a side surface of the water discharge nozzle 25 and may be connected to the water discharge pipe 261. The hot water connecting part 252 may extend so as to penetrate the other side of the side surface of the water discharge nozzle 25 and may be connected to the hot water pipe 265. Therefore, cold water, purified water and hot water may be taken out independently through one water discharge nozzle 25.

A nozzle fixing part 253 which may fix and mount the water discharge nozzle 25 to the water discharge part housing 201 by a screw may be further formed on the other side of the water discharge nozzle 25. The water discharge nozzle 25 may open vertically so as to be molded easily, and a nozzle cap 254 may be mounted on the opened upper surface of the water discharge nozzle 25.

A lighting hole 2012 may be further formed on the bottom surface of the water discharge part housing 201. The lighting hole 2012 may allow light emitted from a lighting unit or lighting module 28 provided in the inner side of the water discharge part housing 201 to be transmitted toward a lower portion. A fixing projection 2013 in which the lighting unit 28 is fixed and mounted may be further formed on the bottom of the water discharge part housing 201 adjacent to the lighting hole 2012.

The lighting unit 28 may emit light toward the lower portion of the water discharge part 20 to see the water extraction state or check the amount of water filled in a cup when operating the take-out button 41, and it may include a light housing 281 and a light PCB 282. An upper surface of the light housing 281 may be opened, and the light housing 281 may be formed so that the light PCB 282 may be mounted in the inside. A housing coupling part 2811 extended to the outer side may be formed on the rear end of the light housing 281, and the housing coupling part 2811 may engage with the fixing projection 2013 and allow the light housing 281 to be fixed and mounted at an accurate position.

A transmitting part 2812 which is able to transmit light on a location corresponding to the lighting hole 2012 may be formed on the light housing 281. The transmitting part 2812 may be configured such that a part of the light housing 281 is opened and then a transparent member is mounted on the opened position, and the light housing 281 may be formed transparently by itself. The transmitting part 2812 may protrude from the light housing 281 and may be inserted into the lighting hole 2012. Therefore, the transmitting part 2812 may allow the light housing 281 to be mounted on the accurate position with the housing coupling part 2811.

A light guide 2814 may extend along a circumference of the transmitting part 2812, and the light guide 2814 guides the light of an LED 2821 mounted on the light PCB 282 to be emitted outside through the lighting hole 2012. A PCB supporting part 2813 for supporting the light PCB 282 may extend on the center of the light housing 281. The light PCB 282 may be seated on the PCB supporting part 2813 and a screw may penetrate the light PCB 282 and be fastened to the PCB supporting part 2813, and thus the light PCB 282 may be fixed.

The light PCB 282 may shield the opened upper surface of the light housing 281, and may be mounted on the PCB supporting part 2813. The LED 2821 may be mounted on the light PCB 282, and when the light PCB 282 is mounted, the LED 2821 may be positioned on the location corresponding to the light guide 2814.

The water discharge part cover 202 may be seated on the upper end of the water discharge part housing 201 and form the upper surface of the water discharge part 20. A cover coupling part 2021 extending downward may be formed on both side ends of the water discharge part cover 202. The cover coupling part 2021 may be coupled with a coupling projection 2014 protruding from an inner side wall surface of the light housing 281, and it may maintain a state in which the water discharge part cover 202 is coupled to the water discharge part housing 201.

As shown in FIG. 20, the heating and control module 50 may be configured by coupling of the induction heating assembly 70 and the control assembly 80. The induction heating assembly 70 and the control assembly 80 may be coupled in one module state, and as shown in FIG. 2, they may be fixed and mounted on the support plate 35. The heating and control module 50 may be provided in a space between the filter bracket 30 and the cooling tank 60, and positioned between the top cover 14 and the support plate 35.

The induction heating assembly 70 may allow purified water to be heated by an induction heating method. An exterior appearance of the induction heating assembly 70 may be formed by a heating bracket 73 coupled to the control assembly 80, and each configuration of the induction heating assembly 70 including the hot water tank 71 and a working coil 72 may be accommodated in the inner side of the heating bracket 73.

The control assembly 80 may control the overall operation of the water purifier 1, and may be configured so that a main PCB 82 for controlling the compressor 51 and various valves, an induction heating PCB 84 for controlling the induction heating assembly 70, and a power supply PCB 86 for supplying power and an NFC PCB 88 are mounted respectively. An exterior appearance of the control assembly 80 may be formed by a first control cover 83 shielding a control base 81 and a front surface of the control base 81, a second control cover 85 shielding a rear surface, and a third control cover 87 shielding side surfaces.

Figure 23:
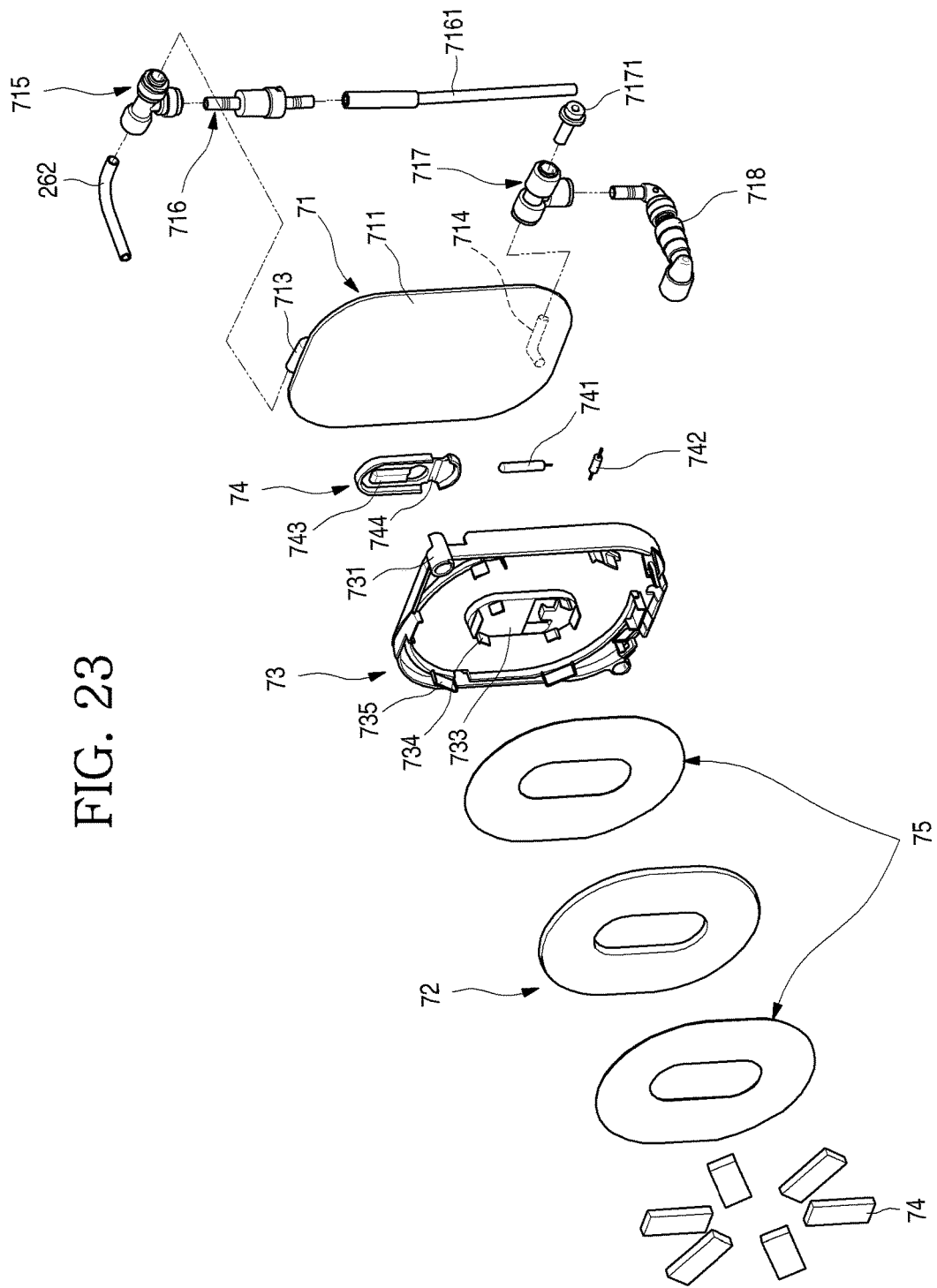
FIG. 23 is an exploded perspective view of the induction heating assembly.

As shown in FIGS. 21-23, the induction heating assembly 70 may receive purified water passing through the filter 34 and heat it into hot water, and may be configured to heat in the induction heating method. The induction heating assembly 70 may include the hot water tank 71 in which the purified water passes through, the working coil 72 for heating the water passing through the hot water tank 71 and the heating bracket 73 in which the working coil 72 and the hot water tank 71 are mounted.

The heating bracket 73 may provide a mounting space of the hot water tank 71, the working coil 72 and a ferrite core 74. The heating bracket 73 may be formed of a resin material which is not deformed or damaged in hot temperature.

A bracket coupling part 731 which is for coupling with the control assembly 80 may be formed on the edge of the heating bracket 73. A plurality of bracket coupling parts 731 may be formed, and an extended end part of the bracket coupling part 731 may be formed in a different shape and it may formed to have a directionality. Therefore, the induction heating assembly 70 may have a structure that is respectively combined with the control assembly 80, and thus the induction heating assembly 70 may be mounted on the accurate position. An edge 732 having a predetermined width along the periphery of the heating bracket 73 may be formed, and may form a space in which the hot water tank 71 and the working coil 72 may be respectively accommodated on both surfaces of the heating bracket 73.

A bracket depression part 733 for mounting the temperature sensor bracket 74 may be further formed on the center of one surface of the heating bracket 73 in which the hot water tank 71 is mounted. The bracket depression part 733 may be depressed in a corresponding shape so that the temperature sensor bracket 74 may be pressed. An opening 7331 in which a wire connected to a tank temperature sensor 741 and a fuse 742 is accessed may be formed on the center of the bracket depression part 733.

The tank temperature sensor 741 measuring the temperature of the hot water tank 71 may be mounted on the temperature sensor bracket 74. As the tank temperature sensor 741 measures the temperature of a center of hot water tank 71, temperature judgment of the hot water may be possible without directly measuring the hot water temperature inside the hot water tank 71. Therefore, the temperature of hot water taken out may be maintained in a proper range by the tank temperature sensor 741. The tank temperature sensor 741 may determine whether to additionally heat or stop heating by the temperature detected from the tank temperature sensor 741.

The fuse 742 may be mounted on the temperature sensor bracket 74. The fuse 742 may block the power of the induction heating assembly 70 when the water in the hot water tank 71 is heated too much.

A sensor mounting groove 743 in which the tank temperature sensor 741 is mounted may be formed on a rear surface of the temperature sensor bracket 74 (right side surface in FIG. 23) in contact with the hot water tank 71. Therefore, the tank temperature sensor 741 may be in contact with the hot water tank 71 and may effectively measure the surface temperature of the hot water tank 71. A fuse mounting groove 744 in which the fuse 742 is mounted may be formed on a front surface of the temperature sensor bracket 74. A fuse mounting projection 7332 may be formed on the bracket depression part 733 corresponding to the fuse mounting groove 744, and thus the fuse 742 may be fixed by the mounting of the temperature sensor bracket 74.

The working coil 72 may be provided on a front surface of the heating bracket 73. The working coil 72 may form a magnetic field line causing the heating of the hot water tank 71. When an electric current is supplied to the working coil 72, the magnetic field line may be formed on the working coil 72, and the magnetic field line may affect the hot water tank 71, and thus the hot water tank 71 may be heated by being influenced by the magnetic field line.

The working coil 72 may be provided on the front surface of the heating bracket 73, and face a side surface formed in a planar shape of both surfaces of the hot water tank 71. The working coil 72 may include several strands of copper or other conductor wire and the strands may be isolated. The working coil 72 may form a magnetic field or magnetic field line by a current applied to the working coil 72.

Therefore, a front surface of the hot water tank 71 facing the working coil 72 may generate the heat influenced by the magnetic field line formed by the working coil 72. In FIG. 23, the stands of the working coil 72 are not described in detail, and thus only the overall outline of the working coil 72 formed by each strand being wound to the outer side of the bracket depression part 733 is described.

A mica sheet 75 may be provided on the front surface and rear surface of the working coil 72. The mica sheet 75 may correspond to the front surface and rear surface shape of the working coil 72, and shield the overall front surface and rear surface of the working coil 72.

The mica sheet 75 may have a predetermined thickness. Therefore, the hot water tank 71 and the ferrite core 74 and working coil 72 may maintain a certain distance and thus the hot water tank 71 may be effectively heated by the magnetic field line formed by the working coil 72. The mica sheet 75 may be only provided on any one side surface of the front surface and the rear surface of the working coil 72 as needed.

The ferrite core 74 may be provided on the front surface of the mica sheet 75. The ferrite core 74 may inhibit loss of a current, and perform the shield of the magnetic field line. The working coil 72 may include a plurality of ferrite cores 74 and the plurality of ferrite cores 74 may be disposed in a radial shape based on the central part of the working coil 72.

In order to fix the ferrite core 74, core fixing parts 734 and 735 may be formed on the heating bracket 73. The core fixing parts 734 and 735 may include an inner side fixing part 734 and an outer side fixing part 735, and may be formed to protrude from a position corresponding to a position in which the ferrite core 74 is disposed. The inner side fixing part 734 may support a surface close to the rotation center of the working coil 72 of the circumferential surface of the ferrite core 74, and the outer side fixing part 735 may be positioned on the surface facing the inner side fixing part 734 and support one side of the circumferential surface of the ferrite core 74. The core fixing parts 734 and 735 may be radially formed in plural like an arrangement of the ferrite core 74.

The hot water tank 71 may be mounted on the rear surface of the heating bracket 73. The hot water tank 71 may generate heat by being influenced by the magnetic field line formed by the working coil 72. Therefore, the purified water may be heated while passing through the internal space of the hot water tank 71 and become hot water.

The overall shape of the hot water tank 71 may be a flat and compact shape. The hot water tank 71 may correspond to the overall shape of the induction heating assembly 70, and thus the induction heating assembly 70 may be accommodated in a space between the filter bracket 30 and the cooling tank 60 in the water purifier 1. The hot water tank 71 may have a wide area, and it may sufficiently secure the heating area, and thus instant heating may be possible.

The hot water tank 71 may be formed such that a circumference of a flat-shaped first cover 711 and a circumference of a second cover 712 having an irregular shape contact each other. An output pipe 713 in which the heated water is discharged may be formed on the upper end of the hot water tank 71, and an input pipe 714 in which water for heating is supplied may be formed on a lower end of the hot water tank 71. The output pipe 713 may extend toward a side portion to have an upward slope, and the input pipe 714 may extend toward the side portion to have a downward slope. Therefore, a connection space of the pipe connected to the hot water tank 71 may be secured and the flow of water may be facilitated.

A T connector 715 may be connected to the output pipe 713. The hot water pipe 265 connected to the hot water discharge valve 369 may be connected to one side of the T connector 715 facing the output pipe 713. A safety valve 716 may be provided on the other side of the T connector 715, in other words in a cross direction with the output pipe 713, that is a direction facing toward the bottom surface of the water purifier 1.

The safety valve 716 may discharge steam generated when the hot water is heated in the hot water tank 71, and prevent the pressure in the hot water tank 71 from being extremely increased due to the steam. The safety valve 716 may be opened at a set pressure, and it may have various structures so as to smoothly discharge the steam of the inside of the hot water tank 71.

An outlet of the safety valve 716 may be directed toward the bottom surface of the water purifier 1, and a silicone hose and an additional steam pipe 7161 may be connected to the outlet of the safety valve 716. The steam pipe 7161 connected to the safety valve 716 may extend to the outside of the water purifier 1 along the base 13. Therefore, when the water purifier 1 is installed, the steam pipe 7161 may allow the steam or water generated by the steam to be discharged by taking out to a separate barrel which is able to sink or drain.

A T connector 717 may also be connected to the input pipe 714, and an end cap 7171 may be provided on one side of the T connector 717, and shield the opening of one side of the T connector 717. A check valve 718 may be provided on one side opened toward a lower portion of the T connector 717. The check valve 718 may supply purified water to the input pipe 714, and may be opened in a supply direction. Therefore, in the case in which the end cap 7171 is removed when the check valve 718 is closed, the water of the inside of the hot water tank 71 may be discharged through the input pipe 714.

The water purifier 1 may fill the water in the hot water tank 71 and check the heating performance before shipment. After completing this test, the water purifier 1 may be shipped while the water inside the hot water tank 71 is completely drained.

Therefore, the end cap 7171 is opened to completely remove the water inside the hot water tank 71 at the time of shipment after the test of the hot water tank 71. The check valve 718 may be closed and the end cap 7171 may have a structure shielding an opening of the T connector 717 connected to the input pipe 714 at the lower end of the hot water tank 71. Due to such a structural feature, the water inside the hot water tank 71 may be completely discharged by its own weight when the end cap 7171 is opened. The end cap 7171 may be configured as a valve capable of opening and closing, not as a structure of a simple cap, and it may remove the water inside the hot water tank 71 by the operation of valve.

Figure 24:
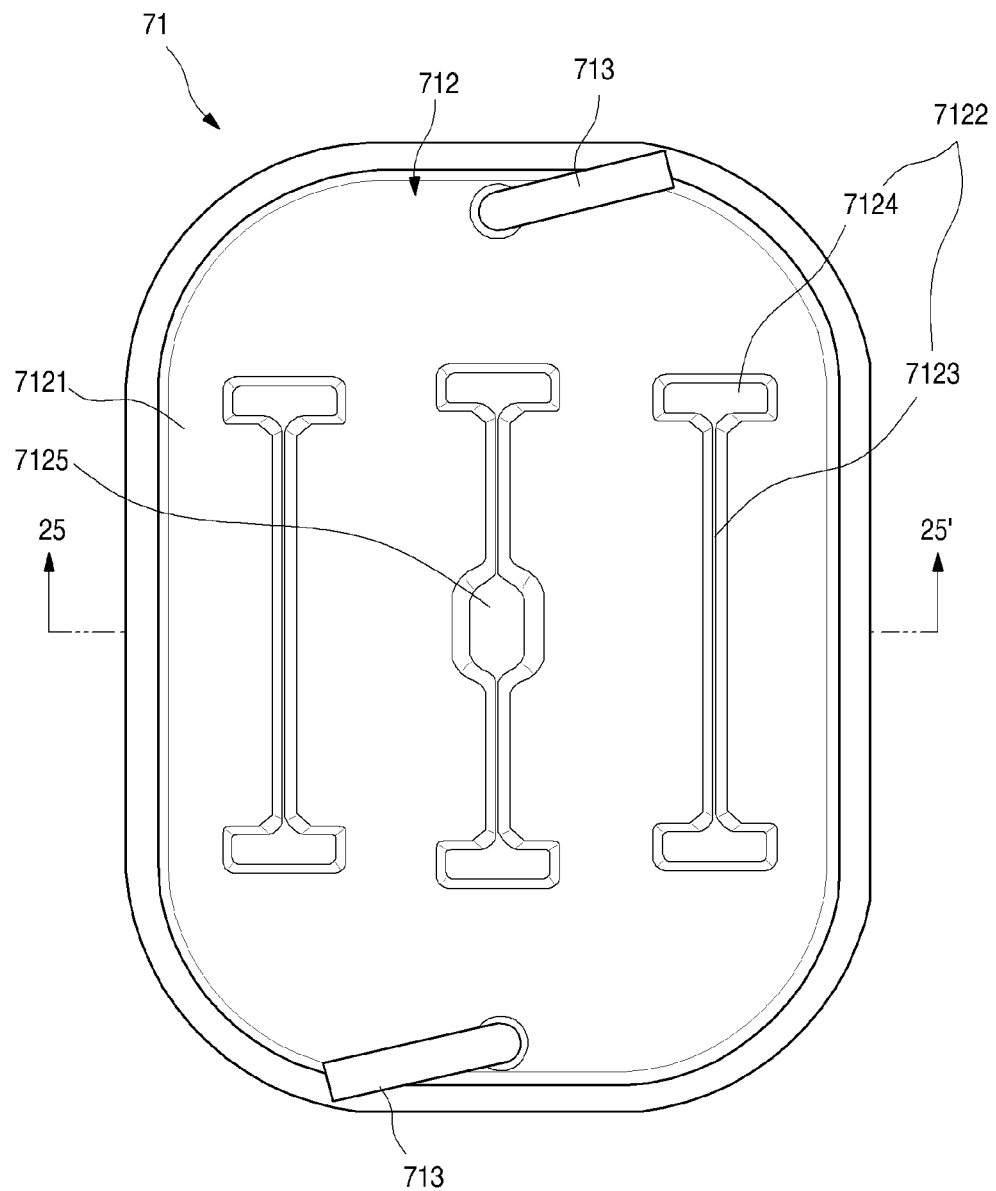
FIG. 24 is a front view of a hot water tank.
Figure 25:
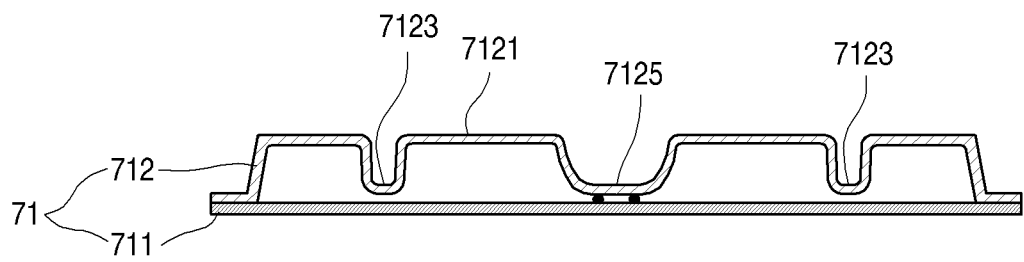
FIG. 25 is a cross-sectional view taken along line 25-25' of FIG. 24.

As shown in FIGS. 24 and 25, the hot water tank 71 may be formed by an edge of the first cover 711 and an edge of the second cover 712 being coupled each other. The edge of the first cover 711 and the edge of the second cover 712 may be coupled to each other to maintain airtightness by welding or the like.

The first cover 711 may have a flat shape so as to generate heat by being influenced by the magnetic field line formed by the working coil 72. The first cover 711 may be formed of an appropriate material for heating. The first cover 711 may be composed of a stainless material, and preferably, it may be composed of a 4 series stainless material. More preferably, the first cover 711 may be made of STS (stainless steel) 439 materials.

The second cover 712 may be provided on the opposite side of the working coil 72 based on the first cover 711, and since the second cover 712 is less influenced by the magnetic field line, the relevance with the heat generation is smaller than the first cover 711. Therefore, the second cover 712 may be preferably made of a material having corrosion resistance properties rather than the heating feature. The output pipe 713 and the input pipe 714 may be provided on the center of the upper end and lower end of the second cover 712. The output pipe 713 and the input pipe 714 may extend toward the opposite direction to each other.

The second cover 712 may include a base surface 7121 and a projection part 7122. The base surface 7121 and the projection part 7122 may be formed integrally by press processing. When partially press processing the second cover 712 having the base surface 7121, the projection part 7122 may be molded on the second cover 712.

The base surface 7121 may face the first cover 711 at a position spaced apart from the first cover 711, and may be spaced apart from the first cover 711 so as to form an internal space of the hot water tank 71. The projection part 7122 may protrude toward the first cover 711 from the base surface 7121, and when the first cover 711 and the second cover 712 are joined, the projection part 7122 may in contact with the first cover 711 or positioned at a position adjacent to the first cover 711. The circumference of the projection part 7122 may be obliquely formed.

The projection part 7122 may be positioned between the input pipe 714 and the output pipe 713, and may be formed in plurality and introduced into the input pipe 714 and disperse the flow of water discharged to the output pipe 713, thereby making duration of staying inside the hot water tank 71 longer. The projection part 7122 may include a horizontal projection 7124 and a vertical projection 7123. The vertical projection 7123 may extend in a same direction with the up and down length direction of the hot water tank 71. The horizontal projection 7124 may be formed on both end parts of the vertical projection 7123 and extended to have a predetermined length.

A plurality of projection parts 7122 may be provided at predetermined intervals, preferably one is formed on a center and the same number of multiple projection parts may be formed on both sides. In the embodiment of the present disclosure, although described as an example that threes are formed, but there is no restriction on the number.

Water introduced into the input pipe 714 may be dispersed by colliding with the lower horizontal projection 7124, dispersed again by colliding with the upper horizontal projection 7124 after being flowed along the vertical projection 7123, and then discharged to the output pipe 713. This operation may occur at the plurality of projection parts 7122 at the same time.

Water flowing in the hot water tank 71 may be dispersed and remain longer in the hot water tank 71 and thus it may be further heated. The water may be evenly spread in the overall inside of the hot water tank 71 and thus, effective heating of water is possible.

A welding part 7125 may be formed on at least one of the plurality of projection parts 7122. The welding part 7125 may protrude toward the first cover 711 like the projection part 7122. A position of the welding part 7125 may be formed on the central part of the hot water tank 71. The welding part 7125 and the first cover 711 may be connected to each other by welding.

Other projection parts 7122 except the welding part 7125 may not be coupled with the first cover 711 by welding, but simply contacted or adjacent to the first cover 711, whereas the welding part 7125 may be coupled with the first cover 711. Therefore, the hot water tank 71 may not be deformed or damaged even if the pressure of the inside of the hot water tank 71 generated when the hot water is heated is increased, and the first cover 711 and the second cover 712 maintain their shape and a stable coupling state may be maintained.

Figure 26:
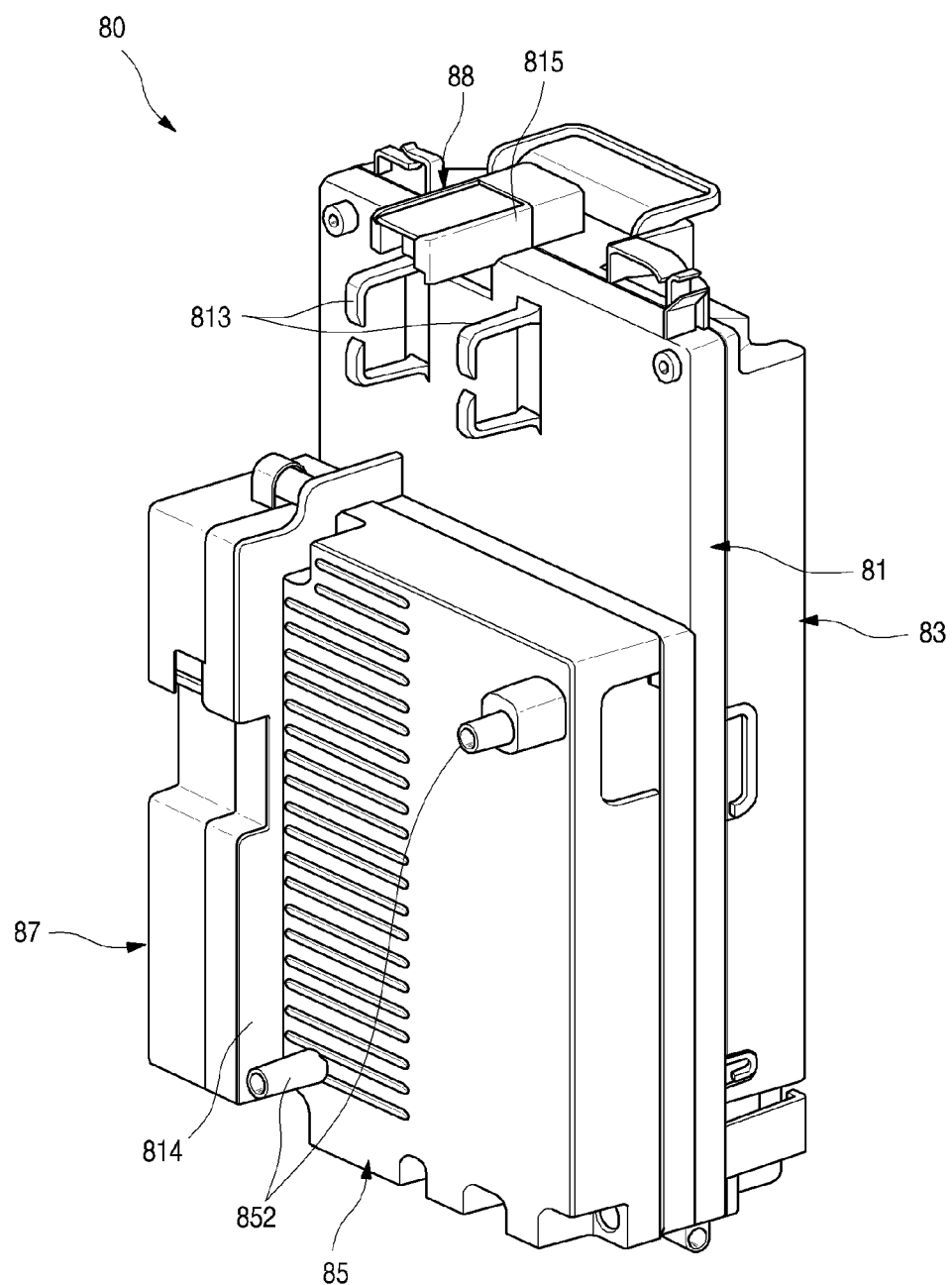
FIG. 26 is a perspective view of a control assembly of the water purifier.
Figure 27:
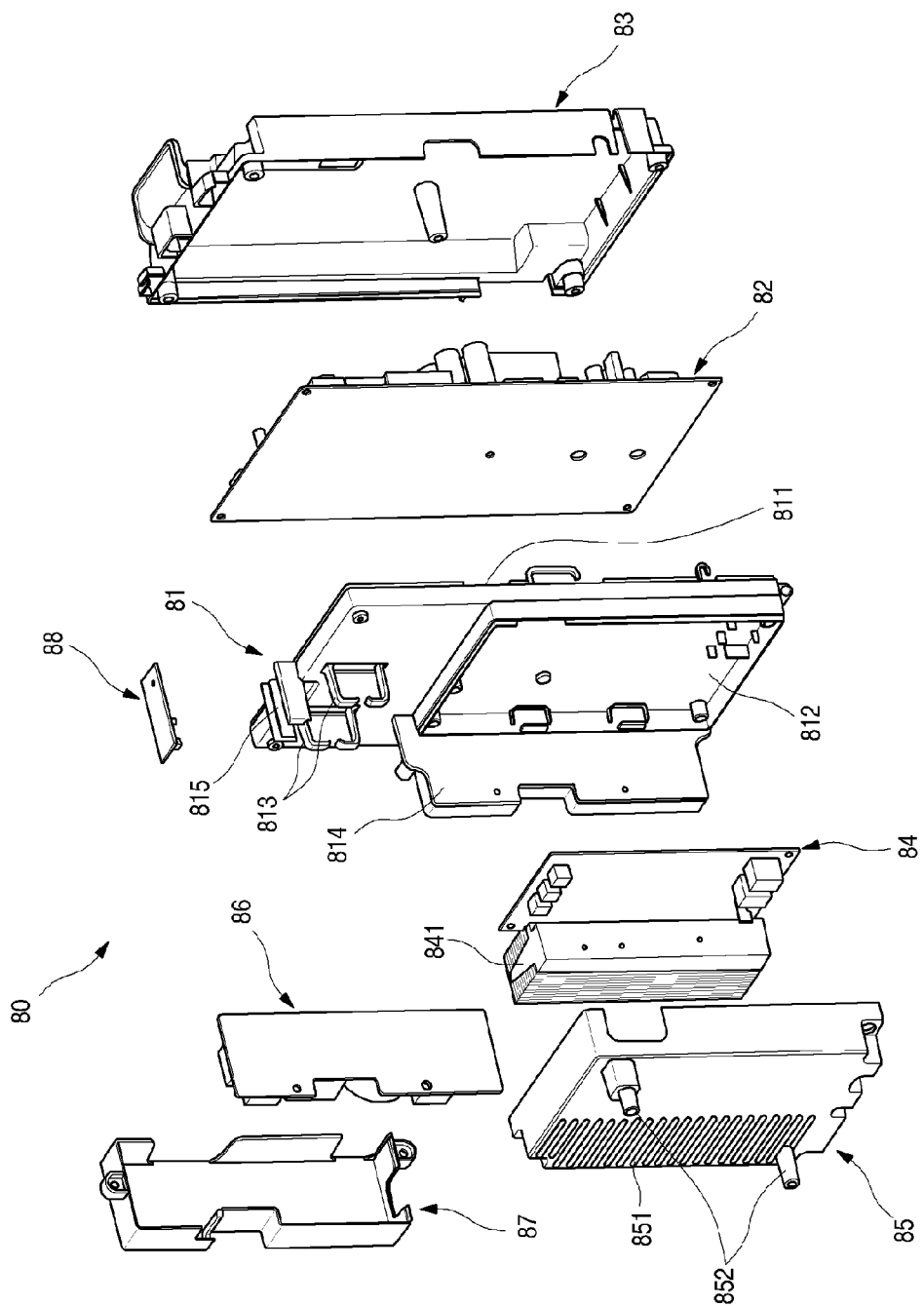
FIG. 27 is an exploded perspective view of the control assembly.

As shown in FIGS. 26 and 27, the exterior appearance of the control assembly 80 may be formed by the first control cover 83 shielding the control base 81 and the front surface of the control base 81, the second control cover 85 shielding the rear surface, and the third control cover 87 shielding the side surface. The control base 81 may provide a space in which the main PCB 82 constituting the control assembly 80, the induction heating PCB 84, the power supply PCB 86 and the NFC PCB 88 may be mounted.

A first mounting surface 811 in which the main PCB 82 is mounted may be formed on the rear surface of the control base 81 (right side surface in FIG. 27). The main PCB 82 may control the overall operation of the water supply device like the water purifier 1. For example, the main PCB 82 may control the drive of the plurality of valves including the compressor 51 and the cooling fan 53.

The first control cover 83 may be provided on the first mounting surface 811 of the control base 81 in which the main PCB 82 is mounted. The main PCB 82 may be provided in a space formed by coupling of the first mounting surface 811 and the first control cover 83.

A second mounting surface 812 in which the induction heating PCB 84 is mounted may be formed on the front surface of the control base 81 (left side surface in FIG. 27). The induction heating PCB 84 may control the induction heating operation of the working coil 72. For example, the induction heating PCB 84 may control a current to flow to the working coil 72, and the hot water tank 71 may be heated by the current supplied to the working coil 72 and thus the hot water may be heated.

The second control cover 85 may be provided on the second mounting surface 812 of the control base 81 in which the induction heating PCB 84 is mounted. The induction heating PCB 84 may be provided in a space formed by the coupling of the second mounting surface 812 and the second control cover 85.

The induction heating PCB 84 consumes a lot of power and accordingly, high temperature heating may be generated. In order to cool the induction heating PCB 84, a heat radiating member 841 may be provided in the induction heating PCB 84. An heat radiating port 851 may be formed at a position corresponding to the heat radiating member 841 in the second control cover 85.

A coupling boss 852 coupling with the bracket coupling part 731 of the induction heating assembly 70 may be further formed in the second control cover 85. The coupling boss 852 may be formed and extended in a predetermined length from a position corresponding to the bracket coupling part 731 and coupled with the bracket coupling part 731. The coupling boss 852 may extend to a predetermined length and maintain a state in which the induction heating assembly 70 and the second control cover 85 are spaced a part at a certain distance. Therefore, the control assembly 80 may be prevented from being malfunctioned or damaged by the high temperature hot water tank 71 or the induction heating assembly 70.

The second mounting surface 812 may form some area of the overall front surface of the control base 81. A cable fixing part 813 may be further formed on the upper portion of the second mounting surface 812 of the front surface of the control base 81. The cable fixing part 813 may be formed by a pair of projections in a ring shape protruding frontward, and wires connected to the plurality of PCBs may pass between the pair of projections so that the cable fixing part 813 can be fixed.

A third mounting surface 814 may be formed on a side portion of the second mounting surface 812. The third mounting surface 814 may provide a space in which the power supply PCB 86 is mounted, and it may be extended and formed to vertically cross the front surface of the control base 81.

The power supply PCB 86 may supply power to the induction heating PCB 84. Since an output voltage for induction heating is very high, a sufficient voltage should be supplied. Therefore, a separate power supply PCB 86 may be further provided so as to satisfy the output voltage for the induction heating by supplying the separate power to the induction heating PCB 84. The power supply PCB 86 may supply power not only to the induction heating PCB 84, but also to the main PCB 82 and it may provide an auxiliary power to other configurations.

The third control cover 87 may be provided on the third mounting surface 814 of the control base 81 in which the power supply PCB 86 is mounted. The power supply PCB 86 may be provide in the space formed by the coupling of the third mounting surface 814 and the third control cover 87.

A fourth mounting surface 815 may be formed on the upper end of the control base 81. The fourth mounting surface 815 may extend in a front-rear direction and form a space in which the NFC PCB 88 may be mounted.

The NFC PCB 88 may send and receive data with devices such as a mobile phone. Usage information, operation or status information of the water purifier 1 may be transmitted to the user's mobile phone through the NFC PCB 88, and setting of the water purifier 1 may be operated by using the mobile phone.

The usage of purified water, cold and hot water may be transmitted to the mobile phone through the NFC PCB 88, and daily, weekly or monthly usage may be transferred. The replacement period of the filter 34 or the information such as the temperature of cold water and hot water is transferred and the user may check through the mobile phone.

The user may set the temperature of cold water through a mobile phone, and the amount of water taken out at one time may be set. By grouping the settings of the water purifier 1, those may be automatically executed only by an operation bringing the mobile phone to a specific position of the top cover 14 adjacent to the NFC PCB 88. A communication connectable position with the NFC PCB 88 may be displayed on the top cover 14, and the user may communicate with the NFC PCB 88 by putting the mobile phone on the corresponding position.

The control assembly 80 may include various options according to the model of the water purifier 1. The control base 81 and the main PCB 82 may be used as is, but in the case of only using the purified water and cold water functions, the induction heating PCB 84 and the power supply PCB 86 may be omitted. In a model from which the NFC function is omitted, the NFC PCB 88 may be omitted.

Like this, the water purifier 1 may have a structure disposing PCBs per module on the one control base 81. Therefore, according to the option of the water purifier 1, a PCB having a corresponding function may be mounted on the set position of the control base 81. Therefore, the space structure inside the water purifier 1 may be shared, and various options may be selected without changing the design of the existing configuration.

As shown in FIGS. 28-30, the cooling tank 60 may be provided on the rear portion of the heating and control module 50, and a lower end may be inserted and mounted in the condenser bracket 54. The exterior appearance of the cooling tank 60 may be formed overall by a tank body 61 and a tank cover 62 covering an opened upper surface of the tank body 61.

The tank body 61 may include an inner case 611 forming a space in which cooling water is filled inside and an insulation body 612 formed on the outer part of the inner case 611. The inner case 611 may be injection molded with a resin material, and the insulation body 612 may be formed by foaming a foaming liquid to the outer side of the inner case 611. The tank cover 62 may shield an opening of the tank body 61 from above, and may be configured of an inner cover 621 formed of an injection material and an insulation cover 622 covering the outer side of the inner cover 621.

The exterior appearance of the tank cover 62 may be formed by insulators 612 and 622 like the exterior appearance of the tank body 61. The evaporator 63 may be inserted through the tank cover 62, and a pipe of the evaporator 63 connected to the outer side of the tank cover 62 may be insulated by covering with an insulation material such as a PE (Polyethylene) foam 631. A part of a capillary pipe 55 used as a expansion device may be fixed to be covered with the pipe of the evaporator 63.

A cold water temperature sensor 601 may be provided in the cooling tank 60. A temperature of cooling water measured by the cold water temperature sensor 601 may become a basis for determining the operation of the refrigerating cycle.

When the temperature of the cooling water measured by the cold water temperature sensor 601 is higher than a first standard temperature, the refrigerating cycle of the water purifier 1 may be operated to lower the temperature of the cooling water. Cooling water stored in the inner case 611 may be cooled by a refrigerant passing through the evaporator 63.

In the case in which the temperature of the cooling water measured by the cold water temperature sensor 601 is lower than a second standard temperature, the refrigerating cycle may be stopped. The second standard temperature may be lower than the first standard temperature. Each of the first standard temperature and the second standard temperature may become a base for operation and suspension of the refrigerating cycle. Therefore, the temperature of the cooling water stored in the inner case 611 may be maintained between the first standard temperature and the second standard temperature by temperature measurement by the cold water temperature sensor 601 and operation of the refrigerating cycle.

A cooling coil 64 may be accommodated in the internal space of the inner case 611. The cooling coil 64 may be a flow path in which purified water is passing through. The cooling coil 64 may be installed in the inner case 611 and submerged in the cooling water. The purified water passing through the cooling coil 64 may be heat exchanged with the cooling water. Therefore, the heat of the purified water passing through the cooling coil 64 may be transmitted to the cooling water, and the purified water may become cold water in a short time by heat exchange with the cooling water. In order to promote the heat exchange, the cooling coil 64 may be formed of a metal material such as stainless steel. An inlet part 641 and an outlet part 642 of the cooling coil 64 may penetrate the tank cover 62 and may be exposed to the outside of the cooling tank 60.

A coil supporting part 6111 supporting the cooling coil 64 may be provided on the bottom surface of the inner case 611. The coil supporting part 6111 may protrude toward the cooling coil 64 from the internal bottom surface of the inner case 611. The coil supporting part 6111 may have a groove 6112 having a size corresponding to an outer circumferential surface of the cooling coil 64. The cooling coil 64 may be mounted on the groove 6112 of the coil supporting part 6111, and may be supported by the coil supporting part 6111. Therefore, the cooling coil 64 may be spaced apart from the bottom surface of the inner case 611, and the cooling water may flow through a space between the lower end of the cooling coil 64 and the bottom of the inner case 611, and thus a circulation of the cooling water is smoothly done, and the cooling efficiency of the purified water of the inside of the cooling coil 64 may be improved.

A mesh member 65 may be provided in the inner case 611. The mesh member 65 may be positioned between the evaporator 63 and the cooling coil 64. The evaporator 63 may be inserted into the inner side of the inner case 611 and it may be wound in a shape like a coil and positioned further upward than the cooling coil 64. The mesh member 65 may be positioned between the evaporator 63 and the cooling coil 64, support the evaporator 63, and may have a structure seated on the upper end of the cooling coil 64.

A gasket 66 for airtightness between the tank body 61 and the tank cover 62 may be provided on the upper end of the inner case 611. A plug mounting part (or plug mount) 6211 in which a plug 623 is mounted and a motor mounting part (or motor mount) 6212 in which a motor 67 for operating an agitator 68 is mounted may be formed on the inner cover 621 forming a lower surface of the tank cover 62.

The plug 623 may form a part in which the pipe and wire of the evaporator 63 are accessed, and may prevent the direct contact of the pipe of the evaporator 63 and the inner cover 621 and maintain the airtightness. The plug 623 may be formed of friable material such as a rubber or silicone so that the bent pipe or wire of the evaporator 63 is not damaged in the process of accessing the tank cover 62.

The motor 67 may be mounted on the motor mounting part 6212 opened on at the center of the inner cover 621. A rotation shaft of the motor 67 may face downward so that the agitator 68 may be coupled to the lower portion of the motor 67.

The agitator 68 may be rotated by the motor 67, extended downward, and configured to sink in the cooling water. The agitator 68 may be extended so that the lower end is positioned further lower than the upper end of the cooling coil 64. Therefore, when the water is forced to be flowed by the agitator 68, the cooling water and the purified water inside the cooling coil 64 may be actively heat exchanged.

A plurality of blades 681 may be formed in the agitator 68, and the plurality of blades 681 may be formed so that the width becomes wider toward the lower portion, and especially, may have a shape protruding toward a side portion from the lower end of each of the blades 681. A lower portion of each of the blades 681 may be inclined in one direction. Therefore, when the agitator 68 is rotated, water of the inner case 611 may be forced to be flowed downward, and a circulation may be actively made in the inner part of the inner case 611. The blades 681 may penetrate the mesh member 65 and when the blades 681 are driven, the cooling water may be circulated through the mesh member 65.

Figure 31:
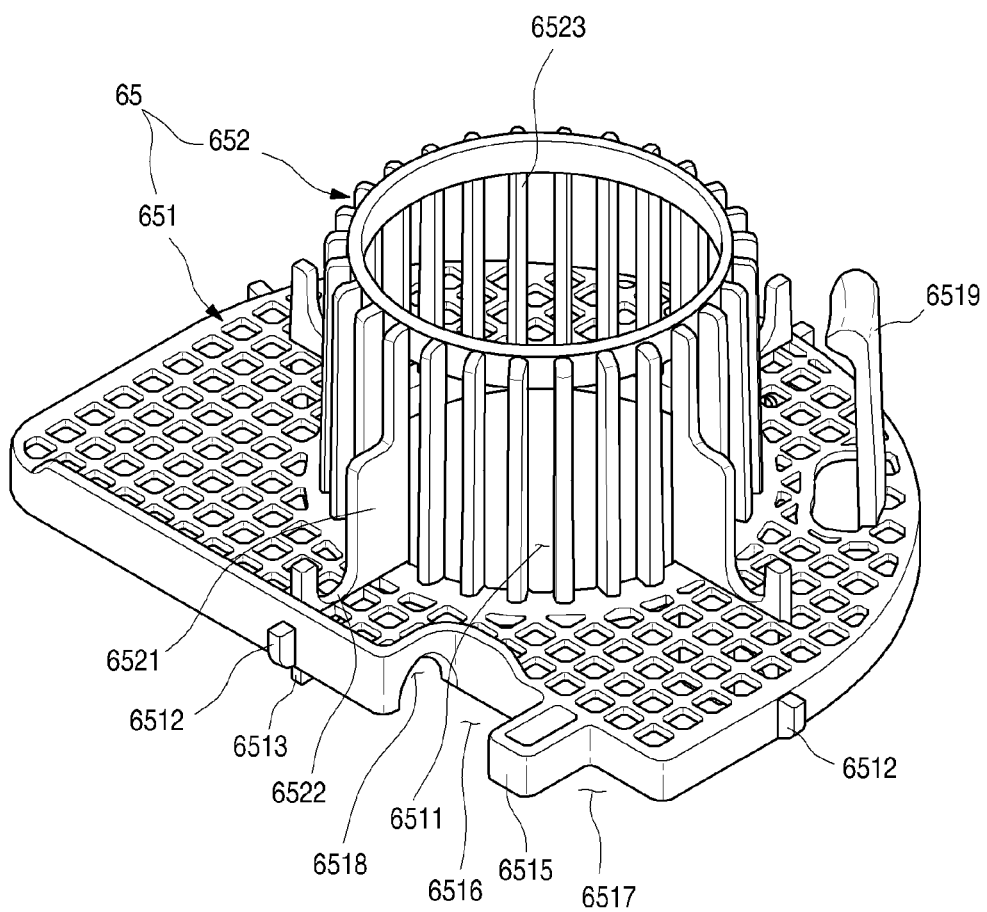
FIG. 31 is a perspective view of a mesh member.
Figure 32:
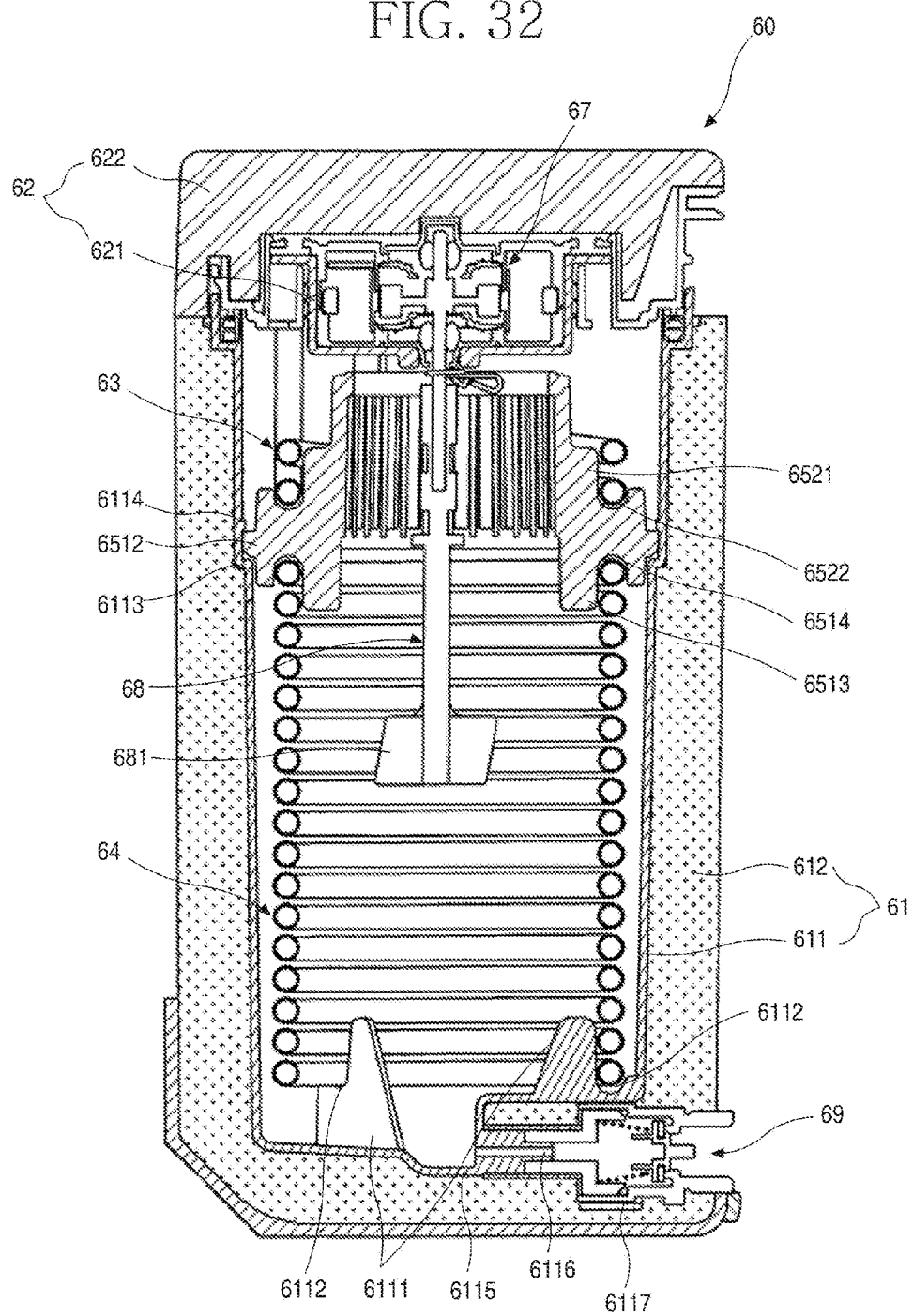
FIG. 32 is a cross-sectional view taken along line 32-32' of FIG. 28.

As shown in FIGS. 31 and 32, a mesh member 65 may be injection molded and formed of a plastic material, and may include a partitioning part 651 crossing the inner part of the inner case 611 and an extending part 652 extended upward along an agitator hole 6511 of a center of the partitioning part 651. All of the partitioning part 651 and the extending part 652 may be formed in a mesh member 65 shape and formed so that the cooling water may smoothly flow through a plurality of holes.

A shape of the partitioning part 651 may correspond to a cross-section shape of the inner case 611 so that the partitioning part 651 may partition the inside of the inner case 611 when the mesh member 65 is mounted. A plurality of partitioning projections 6512 may protrude to the outer side of the circumference of the partitioning part 651.

A step 6113 and a projection 6114 may be formed on the inner side surface of the inner case 611. When the mesh member 65 is mounted, the partitioning part 651 or the partitioning projection 6512 may be mounted between the step 6113 and the projection 6114, and the mesh member 65 may maintain a fixed position on the inner side of the inner case 611.

A lower portion supporting part 6513 may be formed on the lower surface of the partitioning part 651. The lower portion supporting part 6513 may accommodate the upper end of the cooling coil 64, and may extend downward, and a groove 6514 in which the cooling coil 64 may be inserted may be formed in the lower portion supporting part 6513. A plurality of lower portion supporting parts 6513 may be formed, and positioned to face each other or cross each other, so that when the mesh member 65 is mounted, they prevent the movement of an upper portion of the cooling coil 64 while preventing the mesh member 65 from being inclined, at the same time.

An upper portion supporting part 6521 may be formed on the upper surface of the partitioning part 651. The upper portion supporting part 6521 may accommodate a lower end of the evaporator 63 wound in a coil shape, extend upward, and a groove 6522 in which the evaporator 63 may be inserted may be formed on the upper portion supporting part 6521. The upper portion supporting part 6521 may extend in an outer side direction from the extending part 652, and it may extend upward from the same position of the lower portion supporting part 6513. The evaporator 63 may be seated on a correct position by the upper portion supporting part 6521, and may maintain a stable mounting state without moving in the inner side of the inner case 611.

A coil guiding part recessed to an inner side so that an inlet part 6516 and an outlet part 6517 of the cooling coil 64 are to be positioned may be formed on one side of the circumference of the partitioning part 651. A guide projection 6515 protruding to the outer side may be formed on the coil guiding part. Therefore, the inlet part 6516 of the cooling coil 64 may be positioned on one side based on the guide projection 6515, and the outlet part 6517 of the cooling coil 64 may be positioned on the other side. A guiding groove 6518 may be formed on one side of the coil guiding part. The guiding groove 6518 may be formed so that a bent part of the cooling coil 64 connected to the inlet part 6516 of the cooling coil 64 may pass through.

A fixing hook 6519 extending upward may be formed on one side of the upper surface of the partitioning part 651. The fixing hook 6519 may restrict the evaporator 63. The fixing hook 6519 may extend upward from the outer side of the wound part of the evaporator 63, and an upper end of the fixing hook 6519 may press and restrict the uppermost end of the wound part of the evaporator 63. Therefore, the evaporator 63 may be fixed in the inner case 611, and thus a noise or damage caused by the movement may no longer be generated.

The extending part 652 may be formed along the agitator hole 6511 of the center of the partitioning part 651, and formed so that the agitator 68 may penetrate the internal space of the extending part 652. The extending part 652 may be extended from the partitioning part 651 to the motor 67. Since a plurality of ribs 6523 extending up and down may be spaced apart sequentially, the extending part 652 may pass the cooling water but block foreign substances.

Therefore, an internal space of the inner case 611 may be partitioned into a part in which the evaporator 63 is positioned and a lower portion area of the evaporator 63, in other words, an area in which the cooling coil 64 is positioned by the extending part 652. The wound evaporator 63 may be positioned on the outer side of the extending part 652, and the blade 681 may be positioned on the inner side of the extending part 652.

In a process in which the refrigerating cycle is driven to cool the cooling water, frost around the evaporator 63 may be generated by a refrigerant passing through the evaporator 63, and in the process of the circulation of the cooling water by rotation of the agitator 68, some of ice frozen in the evaporator 63 may come off. However, the ice around the evaporator 63 cannot pass through the mesh member 65 and may be blocked by the mesh member 65. The ice around the evaporator 63 may be prevented from colliding with the agitator 68. Therefore, the agitator 68 may be prevented from being damaged, and a noise generated by a crash of the ice may be prevented. The ice may be prevented from flowing and colliding with the cooling coil 64, and it may be prevented from circulating and flowing in the inner case 611 with the cooling water by the mesh member 65.

A drain valve 69 draining the cooling water may be provided on the lower end of the cooling tank 60. The drain valve 69 may replace the cooling water stored in the inner case 611 periodically. A drain part 6115 at least a part of which is formed to be inclined or depressed may be formed on the lower surface of the inner case 611. The drain part 6115 may communicate with the drain valve 69 and allow the cooling water of the inside of the cooling tank 60 to be drained smoothly.

The drain valve 69 may be connected to the inner case 611. The drain valve 69 may protrude from the inner case 611 so as to form a drain flow path of the cooling water filled in the inner case 611.

A drain flow path part 6116 may be formed to protrude on the lower portion of the inner case 611, and the drain flow path part 6116 may be connected to the drain valve 69. Since the drain valve 69 is configured to discharge the cooling water to the outside of the water purifier 1, when the drain flow path part 6116 is inserted into the drain valve 69, a flow path in which the cooling water stored in the inner case 611 may be drained may be formed. The drain valve 69 may be fixed by a valve fixing part 6117. Detailed description of the drain valve 69 and the valve fixing part 6117 will be described below.

The drain valve 69 may be buried by the insulation body 612 to be fixed, and the end part of the drain valve 69 may be exposed to the outer side of the insulation body 612, and thus may be connected from the outside. Therefore, the drain valve 69 may be insulated and prevents dew from being formed on the outer circumferential surface of the drain valve 69.

Figure 33:
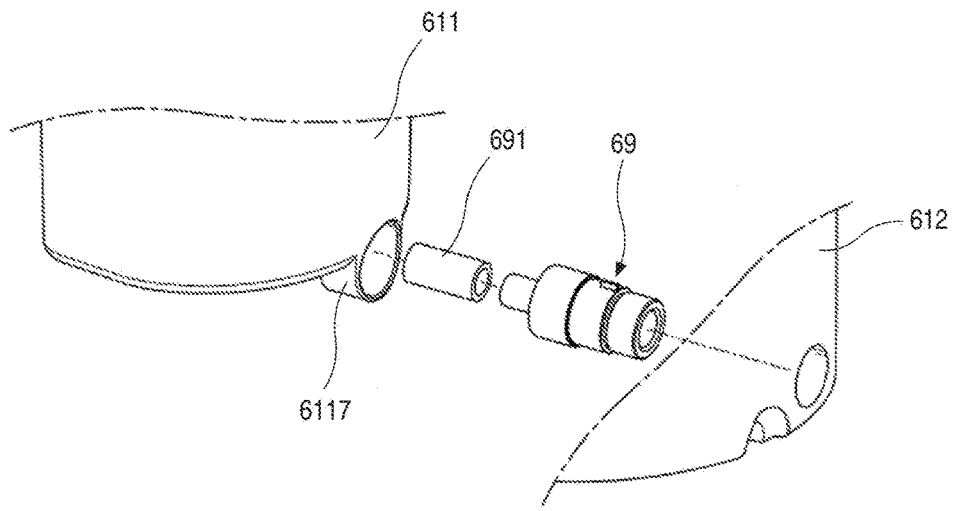
FIG. 33 is an exploded perspective view illustrating a mounting structure of a drain valve of the water purifier.
Figure 34:
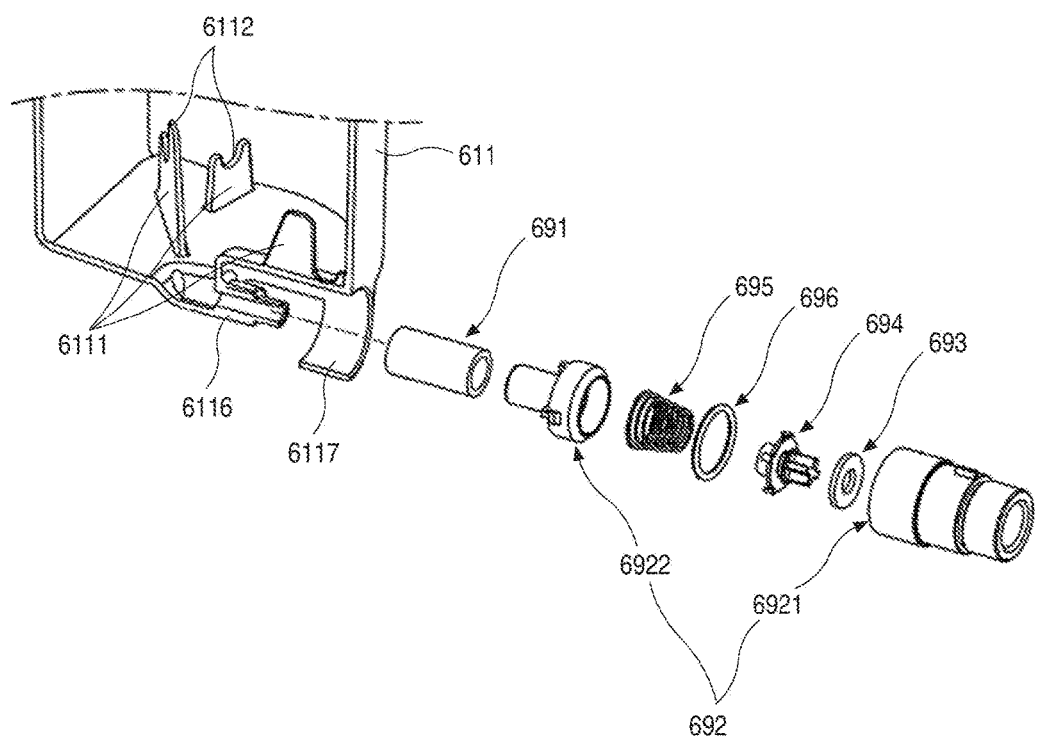
FIG. 34 is an exploded perspective view illustrating a coupling structure of the drain valve.
Figure 35:
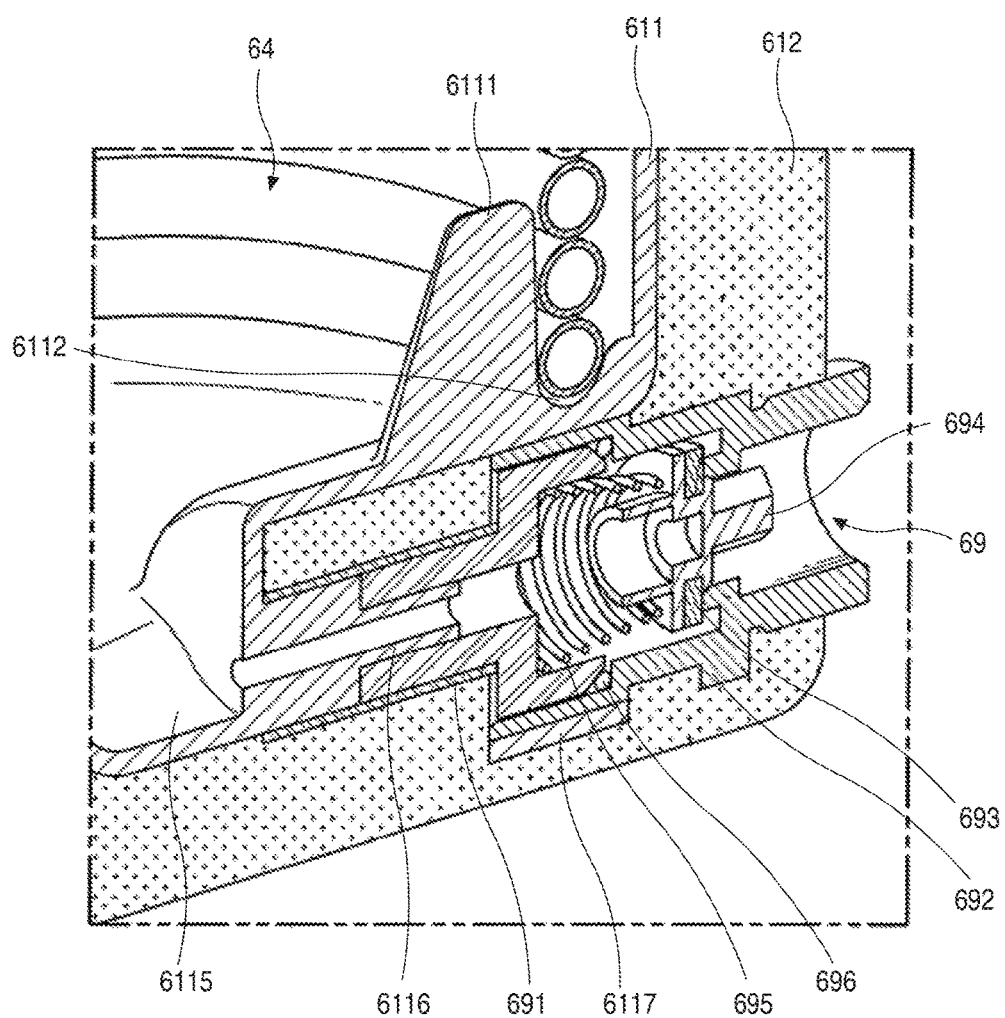
FIG. 35 is a partial cross-sectional view illustrating the coupling structure of the drain valve.

As shown in FIGS. 33-35, the inner case 611 may include the valve fixing part 6117 to fix the position of the drain valve 69. The valve fixing part 6117 may cover at least a part of the drain valve 69. The valve fixing part 6117 may correspond to an exterior appearance of the drain valve 69.

A sealing member 691 may be provided in the inner side of the valve fixing part 6117. The sealing member 691 may cover a connection part of the inner case 611 and the drain valve 69. The sealing member 691 may connect and seal the inner case 611 and the drain valve 69. Therefore, the sealing member 691 may prevent the cooling water from being leaked through a crack formed on the connecting part of the inner case 611 and the drain valve 69.

The drain valve 69 may include a valve housing 692, a valve sheet 694, an elastic member 695, a first O-ring 693, and a second O-ring 696. The valve housing 692 may form an exterior of the drain valve 69. The valve housing 692 may have a hollow part. The hollow part may be a drain flow path draining the cooling water and a space accommodating the valve sheet 694, the elastic member 695, and the like.

The valve housing 692 may be formed by coupling of a first housing 6921 and a second housing 6922. The valve sheet 694 may be disposed in the valve housing 692. The valve sheet 694 may register the pressing operation from the user. The pressing operation of the user may open and close the drain flow path of the drain valve 69. The drain flow path may be opened to drain the cooling water, but it may be opened so as to fill the cooling water while the cooling water is completely drained.

The first O-ring 693 may seal between the valve sheet 694 and the first housing 6921. The first O-ring 693 may be coupled to the valve sheet 694 and in close contact with the housing by an elastic force provided by the elastic member 695. The elastic member 695 may provide an elastic force contacting the valve sheet 694 to the first housing 6921. The elastic member 695 may be supported by the second housing 6922.

The second O-ring 696 may seal the connection part of the first housing 6921 and the second housing 6922. The second O-ring 696 may be made of a material having elasticity.

Figure 36:
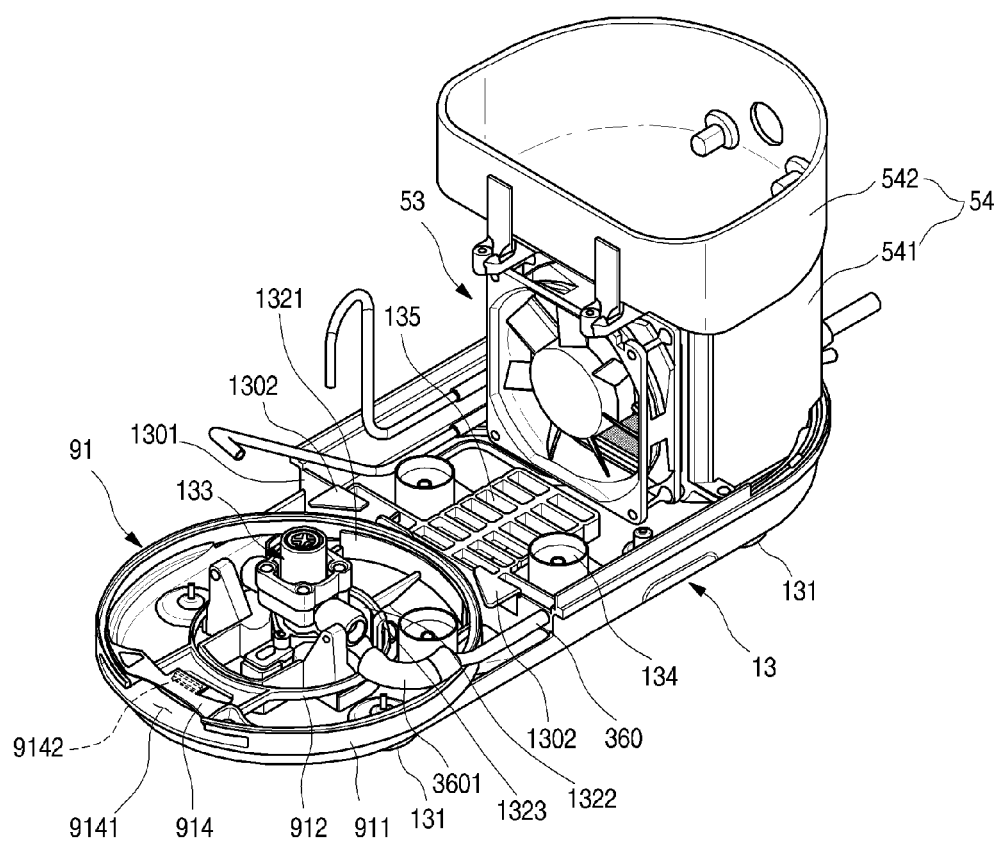
FIG. 36 is a view illustrating an appearance in which a compressor bracket is mounted on the base of the water purifier.
Figure 37:
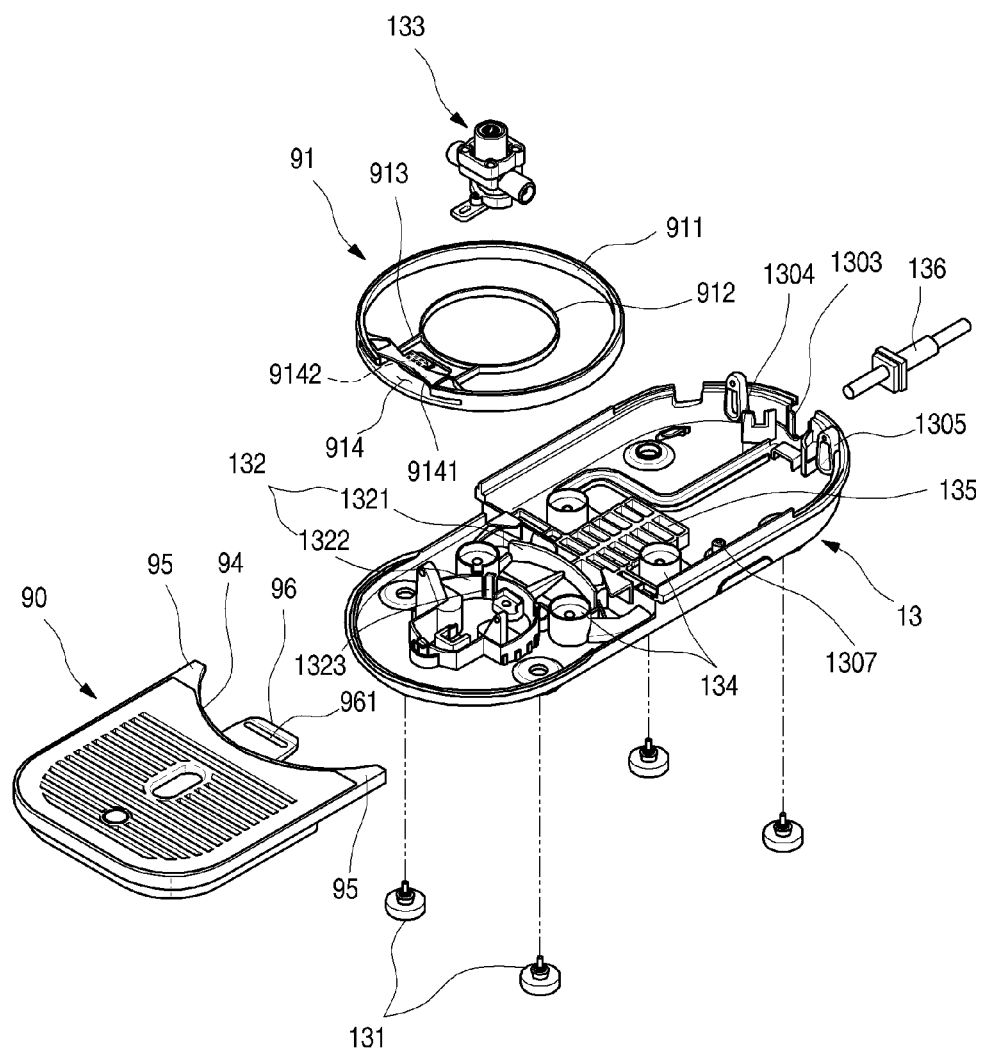
FIG. 37 is an exploded perspective view illustrating a coupling structure of the base and a tray.

As shown in FIGS. 36 and 37, the base 13 may form the bottom surface of the water purifier 1. The base 13 may be formed so that the circumference is extended upward and coupled with the side panel 15, the front cover 11, and the rear cover 12.

A leg 131 protruding downward may be formed on the base 13. A plurality of legs 131 may be formed on the base 13, and they may be formed so that the overall lower surface of the base 13 is spaced apart from the ground. Therefore, the suction of outdoor air through the lower surface of the base 13 may be done easily.

The rotation ring 91 may be rotatably mounted on the front portion of the base 13. The tray 90 may be detachably coupled to one side of the front portion of the rotation ring 91 and connected to the rotation ring 91 and may be rotated in a left-right side direction.

The front portion of the base 13 may be stepped further lower than the rear portion of the base 13. An opening part may be formed between the front portion of the base 13 and the lower end part of the lower cover 112, and a side surface part of the tray 90 may be exposed to the outside through the opening part, and may be rotated in the left-right side direction while being coupled to the rotation ring 91.

The stepped part between the front portion and the rear portion of the base 13 may become a stopper 1301 when the tray 90 is rotated. When the tray 90 is rotated, both side surfaces of the tray 90 may be in contact with the stopper 1301, and the rotation of the tray 90 may be restricted.

A movement preventing part 1302 which prevents the tray 90 from moving up and down may be extended forward on the stopper 1301 of the base 13. The movement preventing part 1302 may restrain both sides of the rear end part of the tray 90 while the tray 90 is rotated.

A rotation guiding part 132 may be provided in the base 13. The rotation guiding part 132 may be configured of a first rotation guiding part 1321 and a second rotation guiding part 1322 provided concentrically on the base 13. The first rotation guiding part 1321 and the second rotation guiding part 1322 may protrude in a upward direction at a constant curvature from the bottom surface of the base 13, and they may guide rotation of the rotation ring 91. The rotation guiding part 132 may be formed in a circular shape or may be formed in an arc shape.

The rotation ring 91 may be guided by the rotation guiding part 132 and rotatably mounted about the base 13 and serve to support the tray 90. The rotation ring 91 may be formed of an outer side ring part 911, an inner side ring part 912 and a ring joint part 913.

The outer side ring part 911 may compose an external skeleton and shape of the rotation ring 91. The outer side ring part 911 may have a circular shape, and a part of the outer side ring part 911 may be in contact with the outer side surface of the first rotation guiding part 1321, and rotatably mounted along the first rotation guiding part 1321.

The inner side ring part 912 may be concentric to the outer side ring part 911. The inner side ring part 912 may have a circular shape and in close contact with the outer side surface of a part or another part of the second rotation guiding part 1322, and thus a movement of the inner side ring part 912 may be restricted in a front-rear direction of the water purifier 1 and the base 13 and guided by the second rotation guiding part 1322 so that the inner side ring part 912 may be rotatably mounted in place.

A tray mounting part (or tray mount) 914 for coupling with the tray 90 may be provided on one side of the outer side ring part 911. The tray mounting part 914 may have an accommodating hole 9141 having a size and shape the same as those of a tray coupling part 96 of the tray 90. The accommodating hole 9141 may be opened in a direction facing the tray coupling part 96, and the tray coupling part 96 may be inserted and coupled to the tray mounting part 914 through the accommodating hole 9141.

When the tray coupling part 96 is coupled to be inserted into the tray mounting part 914, the tray mounting part 914 may cover the tray coupling part 96 and may be in contact with the outer side surface of the tray coupling part 96 and support the tray coupling part 96 so that the tray coupling part 96 is not moved in up-down/left-right directions. However, the tray coupling part 96 may move in the front-rear direction from the inside of the tray mounting part 914 and thus it may be inserted and withdrawn.

A projection 9142 may be formed on the inner side of the tray mounting part 914. A fastening groove 961 may be formed in the tray coupling part 96, and when the tray coupling part 96 is inserted into the inner side of the tray mounting part 914, the projection 9142 may be coupled with the fastening groove 961 so as to maintain a state in which the tray 90 is mounted on the rotation ring 91. When the tray 90 is mounted, the coupling of the projection 9142 and the fastening groove 961 may be recognized easily. As the tray coupling part 96 is coupled to be inserted into the tray mounting part 914, the tray 90 may be coupled to the rotation ring 91 and may be rotated in the left-right side direction about the base 13.

A separation preventing projection 1323 may be formed in the second rotation guiding part 1322, and prevent the rotation ring 91 from being separated from the second rotation guiding part 1322. An upper end part of the separation preventing projection 1323 may be configured in a hook shape so as to be hung on the upper surface of the inner side ring part 912. Therefore, when the tray 90 is rotated, as the rotation ring 91 is lifted in an upward direction, the rotation ring 91 may not be separated from the second rotation guiding part 1322, and the rotation of the tray 90 may be maintained stably.

A pressure reducing valve 133 may be provided on the center of the front portion of the base 13. The pressure reducing valve 133 may adjust the pressure of water supplied from a water pipe and make the purification operation smooth and adjust the pressure when the water is taken out. The pressure reducing valve 133 may be positioned on the inner side area of the inner side ring part 912 when the rotation ring 91 is mounted, and thus an efficient use of space is possible.

A mounting part (or compressor mount) 134 on which the compressor 51 may be mounted is formed on the center part of the base 13. The mounting part 134 may protrude upward so as to support the compressor 51. Four mounting parts 134 may be provided and they may support the four edges of the bottom surface of the compressor 51. A nut may be insert injected into the mounting part 134, and may be configured to fix the compressor 51 by fastening a screw from the lower portion after the compressor 51 is seated.

A suction grille 135 may be further formed on the center part of the base 13. At least a part of the suction grille 135 may be positioned between the mounting parts 134, and it may be positioned below the compressor 51. Therefore, air suctioned into the inner side of the water purifier 1 passes by the compressor 51 and may cool the compressor 51. The suction grille 135 may be formed in a grid shape, and prevent the entry of foreign substances by forming a plurality of suction ports.

The condenser bracket 54 in which the condenser 52 is accommodated may be disposed on the lower portion of the suction grille 135. The condenser bracket 54 may be positioned on the rear portion of the base 13. The condenser bracket 54 may include the condenser mounting part 541 fixed to the base 13 and the tank mounting part 542 positioned above the condenser mounting part 541.

The cooling fan 53 may be provided on the front surface of the condenser mounting part 541. The compressor 51 and the condenser 52 may be cooled by sucking the outdoor air through the suction grille 135 by the cooling fan 53 and the air may be discharged to the discharge port 121. The rear surface of the condenser mounting part 541 may be in contact with the discharge port 121. Therefore, the condenser 52 accommodated in the inner side of the condenser mounting part 541 may be disposed at a position adjacent to the discharge port 121 of the water purifier 1.

A cord mounting part (or cord mount) 1303 in which a power cord 136 is fixed may be formed on the rear end of the base 13. A cord guiding part 1304 may be formed from the cord mounting part 1303 to a middle part of the base 13. Therefore, the power cord 136 may be moved along the cord guiding part 1304, and connected to the control assembly 80.

A water inflow pipe entrance 1305 in which a water inflow pipe 360 is introduced may be formed on the rear end of the base 13, and the water inflow pipe 360 connected with the water pipe may be introduced through the water inflow pipe entrance 1305. An end part of the water inflow pipe 360 may be extended to the pressure reducing valve 133. A tube guide 3601 that prevents a folding of the water inflow pipe 360 may be further formed at a section in which the water inflow pipe 360 is bent. The tube guide 3601 may be a plastic material and may guide the water inflow pipe 360 not to be extremely bent or folded. Such a tube guide 3601 may be further formed on a pipe in which purified water, cold water and hot water are flowed.

Figure 38:
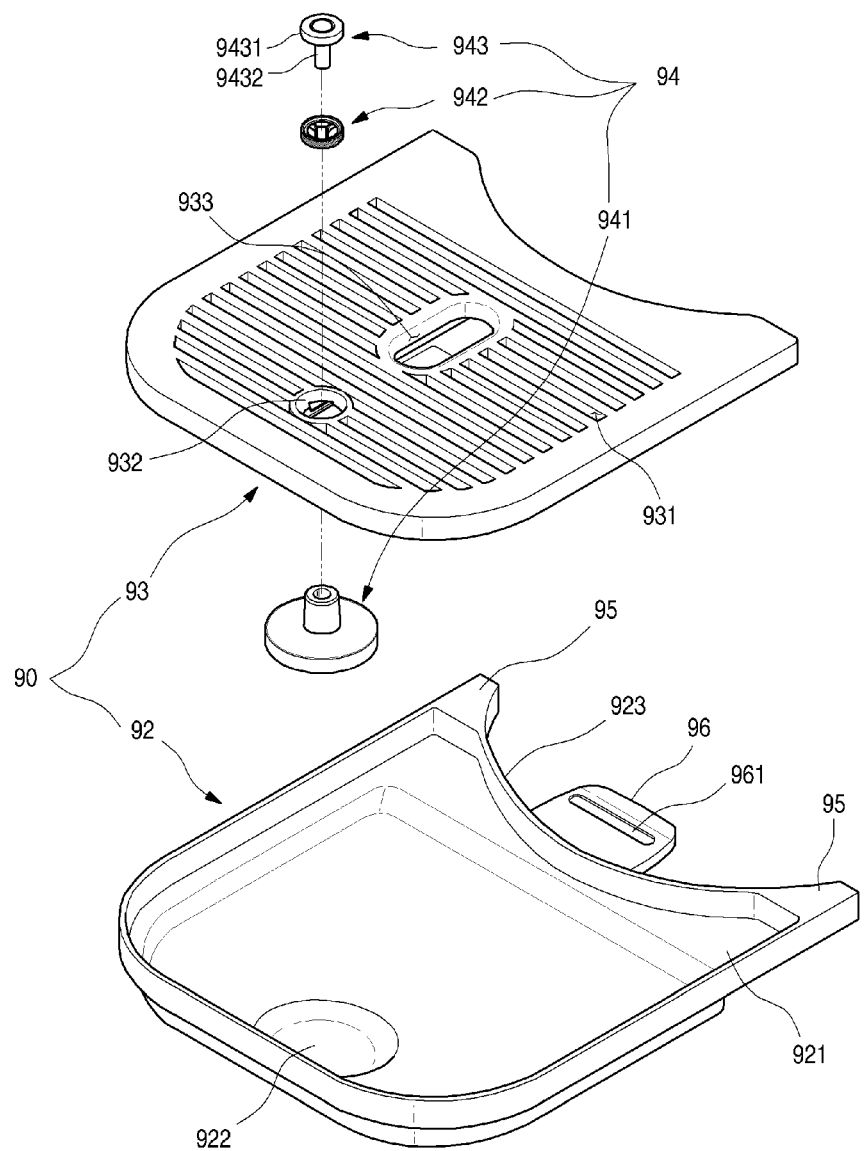
FIG. 38 is an exploded perspective view illustrating a coupling structure of a tray of the water purifier.
Figure 39:
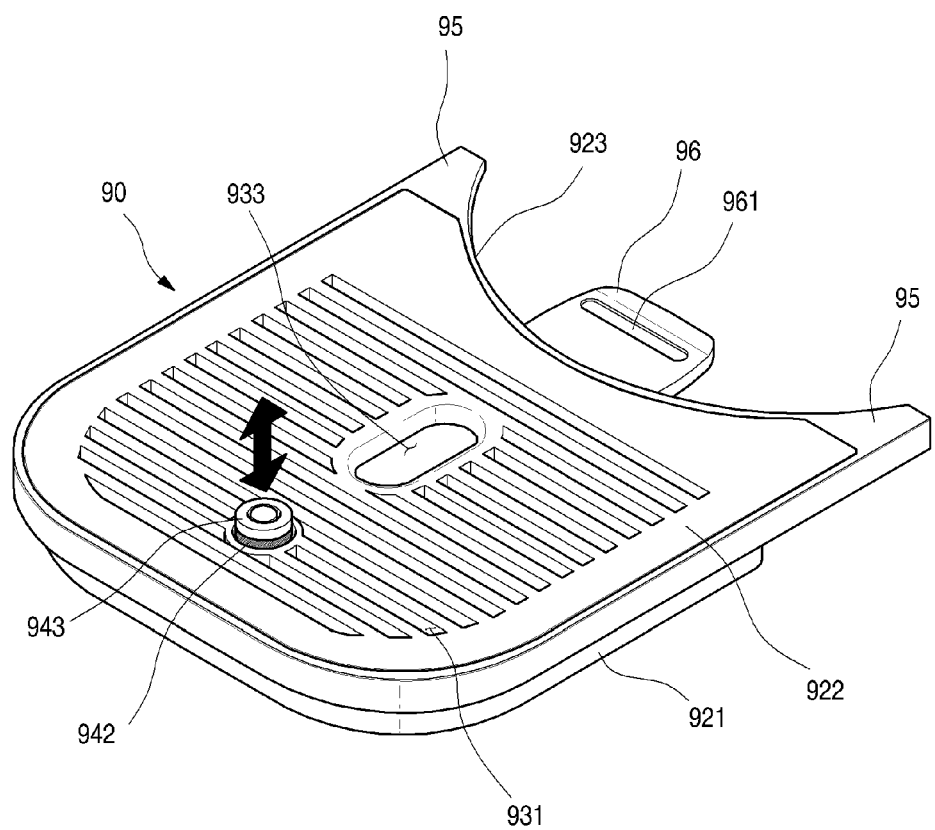
FIG. 39 illustrates a full water level state of the tray.

As shown in FIGS. 38 and 39, the tray 90 may include a tray body 92 having a storage space therein and a tray cover 93 detachably coupled to cover an upper portion of the tray body 92. The storage space may be depressed downward in the tray body 92 and residual water may be stored therein. The edge part of the tray body 92 may cover a side surface of the edge of the tray cover 93. A supporting part 921 supporting a lower surface of the tray cover 93 may be provided in the tray body 92.

A depression part 922 may be formed on a bottom surface of the tray body 92. The depression part 922 may protrude downward from the bottom surface of the tray body 92, and may be in close contact with the ground in which the water purifier 1 is installed and support the bottom surface of the tray 90. Therefore, when the tray 90 is rotated in a left-right direction, it may be supported at a certain height without sagging from the ground in which the water purifier 1 is installed.

The depression part 922 may be formed the same as or larger than the size of a floater 94 so that the floater 94 may be accommodated. Therefore, the floater 94 may be liftable depending on the water level on the inner side of the depression part 922.

The floater 94 may include a floating part 941, an indicator 942 and a cap 943. The floating part 941 may be a size that possible to be accommodated in the inner side of the depression part 922, and it may be formed of a material which may float in the water by buoyancy.

The indicator 942 may be arranged on an upper end of the floating part 941, and it may be fixed on the floating part 941 by the cap 943. The indicator 942 may have a ring shape and it may be formed of a color different from those of the floating part 941, the cap 943 and the tray cover 93.

The cap 943 may form an upper end of the floater 94, and form a part exposed to the tray cover 93. The cap 943 may be formed of an expose part 9431 exposed to the tray cover 93 and a penetrating part 9432 extended downward from the expose part 9431. The expose part 9431 may have the same diameter as the indicator 942. The penetrating part 9432 may be inserted into the upper end of the floater 94 through the indicator 942.

In a state in which a certain amount of water or more is not filled in the tray 90, the upper surface of the cap 943 may be positioned on the same plane with the upper surface of the tray cover 93 or positioned at a lower portion. When a certain amount of water or more is filled in the tray 90 or at a full water level, the floating part 941 may be risen by the buoyancy, and also the cap 943 may protrude further than the upper surface of the tray cover 93.

At this time, like FIG. 31, when the floating part 941 is completely risen, the indicator 942 may protrude further upward than the upper surface of the tray cover 93. Therefore, the user may recognize the full water level when the color of the indicator 942 is distinguished, and the stored water may be removed by separating the tray 90.

A recess part 923 may be concavely formed on the rear portion surface of the tray body 92 and the rear end of the tray cover 93 in an arc shape, and the recess part 923 may cover a part of the rotation ring 91 and allow the rear end of the tray 90 to be in close contact with the rotation ring 91. A protrusion part 95 may protrude rearward from both sides of the rear end of the tray body 92. An outer side surface of the protrusion part 95 is may extend in a same plane from one side surface of the tray body 92, and it covers a connection part of the tray 90 and the rotation ring 91.

Even when the tray 90 is rotated, an exterior may be formed in a shape connected from the front surface exterior of the water purifier 1 which is roundly formed. Therefore, the exterior may be elegant regardless of the rotation of the tray 90.

For the coupling of the tray 90 and the rotation ring 91, the tray coupling part 96 may protrude rearward on the center of the recess part 923 of the tray body 92. The tray coupling part 96 may be coupled by being inserted into the tray mounting part 914 when the tray 90 is mounted. A plurality of slits 931 may be formed on the tray cover 93, and the residual water may be introduced into the storage space of the tray body 92 through the slit 931, and may be prevented from being splashed to the outside from the inside of the tray body 92.

An indicating hole 932 may be formed on the tray cover 93. The indicating hole may correspond to a position of the cap 943 of the floater 94, and it may be the same size as the cap 943. Therefore, when the floater 94 is lifted, the cap 943 is moved up and down through the indicating hole 932. When the tray 90 is completely filled with water, the indicator 942 may be exposed to the outer side of the indicating hole 932 and it may display the full water situation to the user.

A water collection hole 933 may be further formed on the tray cover 93. The water collection hole 933 may be opened vertically below the water discharge nozzle 25. Therefore, in a state in which a container such as a cup is not positioned on the tray 90, when water is taken out, the falling water may be directly collected to the tray 90 through the water collection hole 933.

As shown in FIGS. 40 and 41, the condenser mounting part 541 may be formed on the lower portion of the condenser bracket 54, and the tank mounting part 542 may be formed on the upper portion thereof. A bracket mounting part (or bracket mount) 1307 may be formed on the lower end of the condenser mounting part 541. The bracket mounting part 1307 may be supported on the base 13, and the condenser bracket 54 may be fixed by fastening a screw.

The front surface and the rear surface of the condenser mounting part 541 may be opened and formed so as to accommodate the condenser 52 therein. A condenser supporting part 5412 protruding upward may be formed on the internal bottom surface of the condenser mounting part 541. The condenser 52 may be supported by the condenser supporting part 5412, and may be spaced apart from the bottom of the condenser mounting part 541 and may promote the heat exchange by facilitating the flow of the cooling air.

The condenser 52 may be configured such that a tube (or refrigerant tube) 521 in a plate shape is formed to be bent multiple times, and a heat exchange plate 522 formed to be bent sequentially may be disposed between the tubes 521 in the plate shape. A header 523 communicated with the plurality of tubes 521 may be provided on both ends of the tube 521. A refrigerant pipe connected to the compressor 51 and the evaporator 63 side may be accessed to the header 523, and a refrigerant may be circulated in the refrigerating cycle. Therefore, the condenser 52 may be generally formed in a hexahedron shape and formed in a compact size, and thus may be accommodated in the condenser mounting part 541.

A fixing hole 5411 in which a fixing member (or fastener) 543 for mounting the cooling fan 53 is inserted may be formed on the front surface of the condenser mounting part 541. The fixing hole 5411 may be formed on four edges of the front surface of the condenser mounting part 541, and the fixing member 543 may fix four edges of the cooling fan 53.

The fixing member 543 may be formed of a material having an elasticity like rubber or silicone so as to absorb vibration when the cooling fan 53 is operated. A pair of engaging parts 5431 may be further formed along the circumference of the fixing member 543 so that the fixing member 543 may be fixed to be inserted into the fixing hole 5411. The engaging part 5431 may be formed in a shape that a diameter thereof becomes narrow toward a front portion, so that the insertion and mounting of the fixing member 543 become easy and the cooling fan 53 is not easily stripped. The front end of the fixing member 543 may be inserted into an insertion port 531 so that the cooling fan 53 may be fixed on the front surface of the condenser mounting part 541.

The tank mounting part 542 may be positioned above the condenser mounting part 541, and may have a size and shape corresponding to the cross section of the cooling tank 60 so as to accommodate the lower end of the cooling tank 60. An edge 5421 of the tank mounting part 542 may extend upward along the circumference and the inner side of the edge 5421 may form a predetermined space so that a lower portion of the cooling tank 60 is inserted therein.

A drain hole 5422 through which the drain valve 69 passes may be formed on the edge 5421. The drain hole 5422 may be exposed when the rear cover 12 is removed. Therefore, the drain valve 69 may be exposed to the outside, and thus the drain or charging of the cooling water is possible.

A plate supporting part (or plate support) 5423 supporting one end of the support plate 35 may be formed on the front surface of the condenser mounting part 541, in other words, above the cooling fan 53. Therefore, both ends of the support plate 35 may be fixed on the filter bracket 30 and the condenser bracket 54, thereby providing a mounting space of the heating and control module 50.

Figure 42:
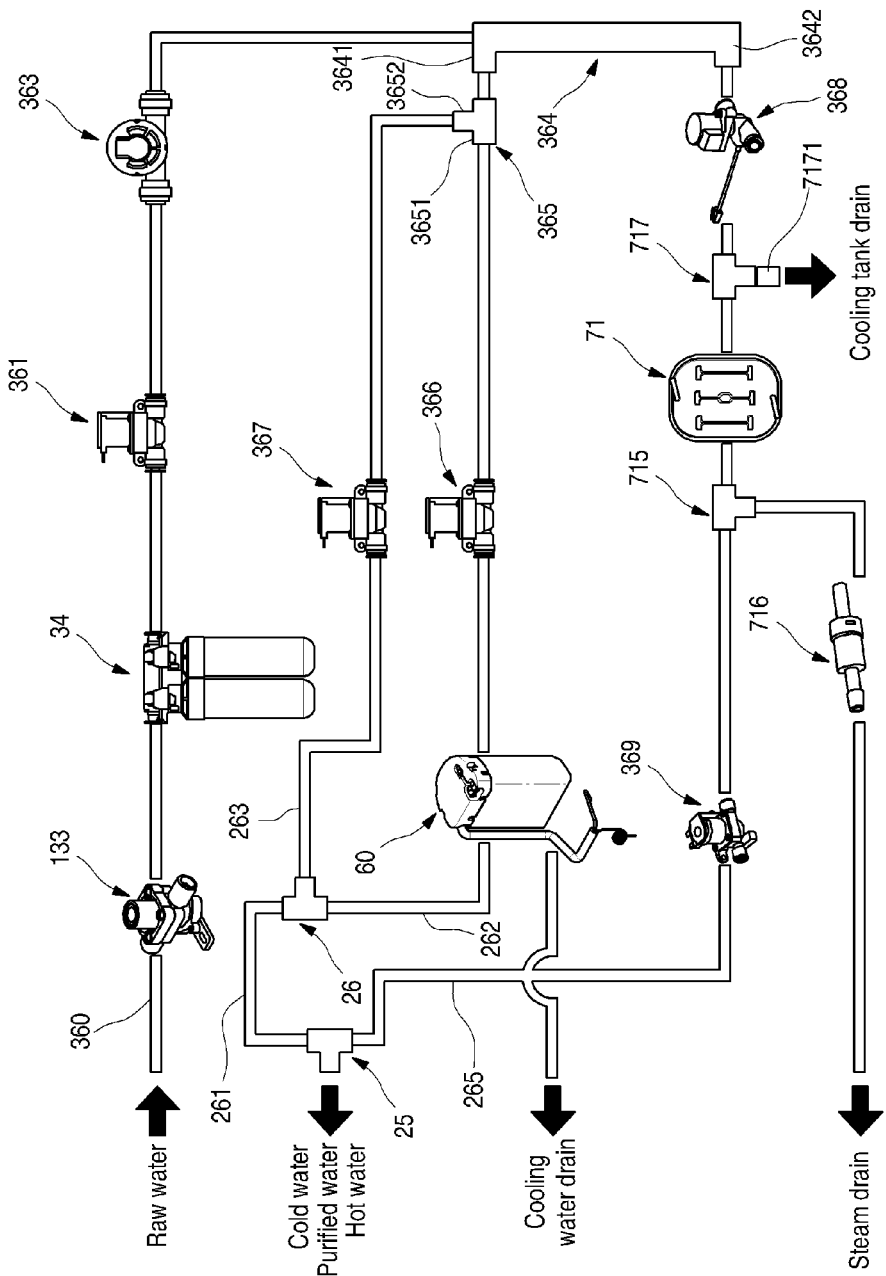
FIG. 42 is a circuit diagram schematically illustrating a water flow path of the water purifier.
Figure 43:
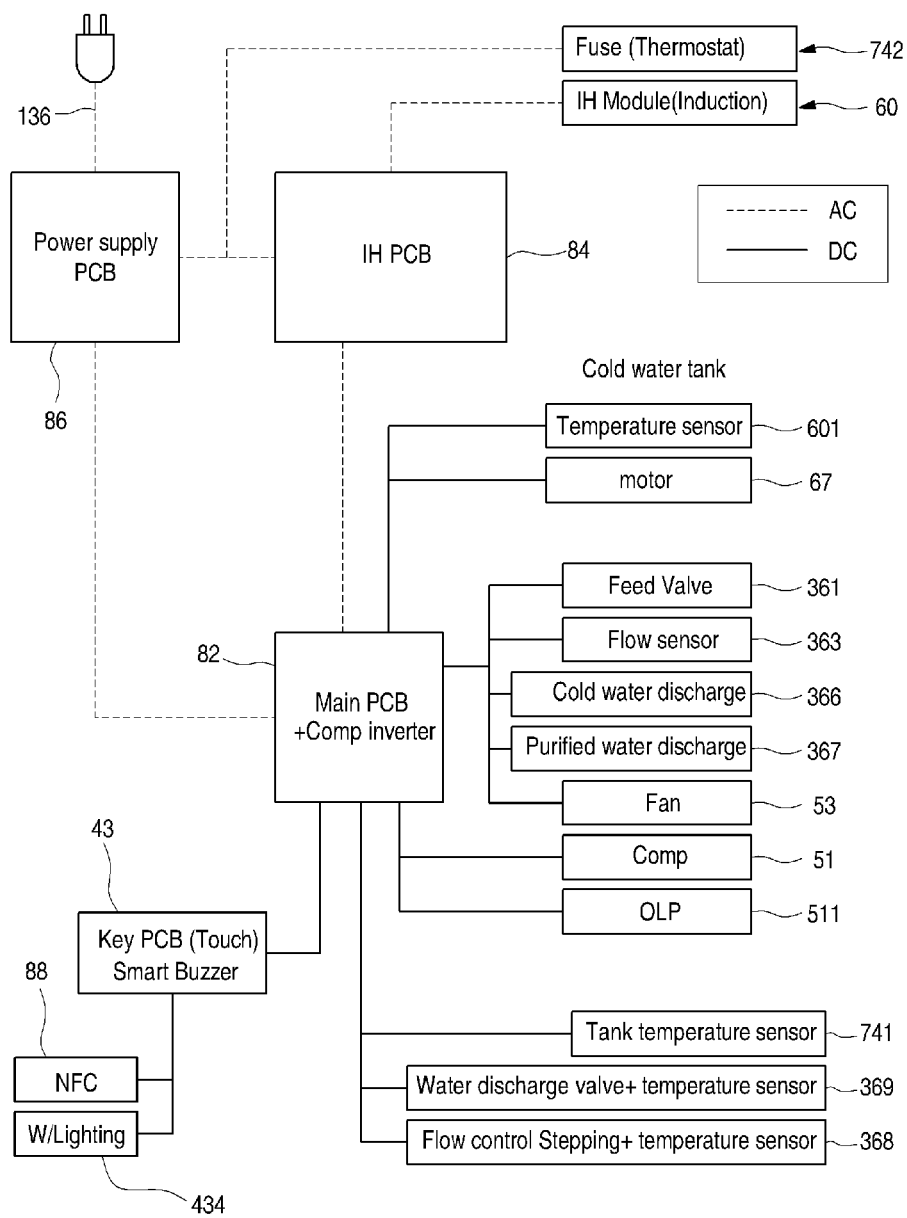
FIG. 43 is a block diagram illustrating a flow of a control signal of the water purifier.

Hereinafter, a water extraction process of the water purifier having the structure as described above according to an embodiment of the present disclosure will be described. As shown in FIGS. 42 and 43, the water inflow pipe 360 of the water purifier 1 may be connected to the water pipe and receive raw water. The water inflow pipe 360 may be connected to the pressure reducing valve 133, and the raw water passing through the pressure reducing valve 133 may be decompressed in a set pressure for the operation of the water purifier 1.

The decompressed raw water may flow to the filter 34 side along a pipe connecting the pressure reducing valve 133 and the filter 34. The raw water passing through the filter 34 may become purified water by removing foreign substances. By the opening of the water supply valve 361, the purified water may pass through the water supply valve 361 and the flow sensor 363 in turn along the pipe.

The water supply valve 361 and the flow sensor 363 may be connected to the main PCB 82, and they may control the opening degree of the water supply valve 361 depending on a signal transmitted from the main PCB 82. A flow rate detected from the flow sensor 363 may be transmitted to the main PCB 82 and it may be used as data required for the control of the water purifier 1.

The purified water passing through the flow sensor 363 may be branched to the cold purified water side 3641 and the hot water side 3642 through the branch pipe 364. The purified water flowed to a pipe of the cold purified water side 3641 may be branched to the cold water side 3651 and the purified water side 3652 again by the T connector 365 and respectively connected to the cold water discharge valve 366 and the purified water discharge valve 367. The purified water discharge valve 367 and the cold water discharge valve 366 may be connected to the main PCB 82 and the opening and closing may be determined. The purified water discharge valve 367 and the cold water discharge valve 366 may be selected by the user's setting. The selected valve may be opened by the operation of the take-out button 41 and the water may be taken out.

The water passing through the cold water discharge valve 366 may pass through the cooling coil 64 inside the cooling tank 60. The water flowed along the cooling coil 64 may be heat exchanged with the cooling water inside the cooling tank 60 and cooled, and, the cooling water may be cooled to maintain a set temperature.

For cooling the cooling water, the compressor 51 connected to the main PCB 82 may be driven. The driving of the compressor 51 may be determined by the cold water temperature sensor 601 provided in the cooling tank 60. Therefore, the cooling water may always maintain a set temperature, and, the driving of the compressor 51 may be adjusted. The compressor 51 may be an inverter compressor in which the frequency may be adjusted corresponding to a required load, and the cooling capacity may be adjusted. That is, the compressor 51 may be driven by the inverter control and it may cool the cooling water with optimum efficiency.

The compressor 51 may set the operation in a forced-off state by the user controlling the operation part 40. When cold water is consumed less in winter or when power saving is needed or when the user does not want to use the cold water, the compressor 51 may be maintained in the off state forcedly.

The main PCB 82 may control the driving of the compressor 51 and also the driving of the cooling fan 53. The main PCB 82 may control the driving of the motor 67. The motor 67 may increase the heat exchange efficiency of the cooling water and cold water passing through the cooling coil 64, and may be controlled by the main PCB 82. The agitator 68 may be rotated by driving of the motor 67, and the cooling water may be forcedly convected in the cooling tank 60 and effectively cool the purified water inside the cooling coil 64.

The cold water passing through the cooling tank 60 may be introduced to the water discharge pipe 261 through the T connector 26, and the cold water passing through the water discharge pipe 261 may be taken out to the outside through the water discharge nozzle 25. In the case in which the purified water discharge valve 367 is opened, the purified water passing through the purified water discharge valve 367 may be introduced to the water discharge pipe 261 through the T connector 26 and pass through the water discharge pipe 261 and may be taken out to the outside through the water discharge nozzle 25.

In the case in which the user selects the extraction of hot water, the purified water may be flowed to the hot water side 3642 of the branch pipe 364. The flow control valve 368 may be opened by the control of the main PCB 82, and the water flowed through the flow control valve 368 may be adjusted to an appropriate flow rate to heat the hot water. That is, the amount of purified water supplied to the hot water tank 71 may be adjusted so that the water may be heated to a set temperature by the induction heating assembly 70.

The purified water passing through the flow control valve 368 may pass through the hot water tank 71. In the process of passing through the hot water tank 71, the purified water may be heated to a set temperature. The hot water tank 71 may be heated in an induction heating method, and, the output of magnetic force of the working coil 72 may be adjusted by the control of the induction heating PCB 84.

For the driving of the induction heating assembly 70, a high voltage is required compared to the main PCB 82, and for the supply of such a high voltage, the induction heating assembly 70 may receive power from the power supply PCB 86 connected to a power supply line. The power supply PCB 86 may supply 8 appropriate power depending on the driving of the induction heating assembly 70 and supply appropriate power to the main PCB 82.

Water in the hot water tank 71 may be heated to a set temperature by the driving of the induction heating assembly 70. A hot water temperature sensor may be provided in the hot water discharge valve 369. The hot water temperature sensor may detect the temperature of the hot water discharged through the hot water tank 71 and transmit the temperature to the main PCB 82. The based on the input hot water temperature data, the output of the working coil 72 may be adjusted at the main PCB 82.

A temperature of the hot water tank 71 itself may be detected from the tank temperature sensor 741 provided on the outer side of the hot water tank 71. In the case in which the temperature of the hot water tank 71 is increased more than a set temperature and there is concern that a fire may occur, the tank temperature sensor 741 may transmit a signal to the main PCB 82 to short-circuit the fuse 742. An OLP (Over Load Protection) 511 may be connected to the main PCB 82 and when overload of the compressor 51 occurs, the OLP 511 may block the power supply and protects the compressor 51.

In the case in which the fuse 742 is short-circuited by a malfunction of the induction heating assembly 70, a power supplied to the induction heating PCB 84 from the power supply PCB 86 may be blocked and the induction heating assembly 70 may be prevented from being overheated and damaged. The heated hot water passing through the hot water tank 71 by the hot water discharge valve 369 may be flowed to the water discharge nozzle 25 through the hot water pipe 265 to be taken out to the outside.

When the water is taken out by the operation of the take-out button, the LED 2821 of the water discharge part 20 may be illuminated by the control of the operation part PCB 43. By the illumination of the LED 2821, the lower portion of the water discharge part 20 may be brightened. The operation part PCB 43 may recognize the state or replacement period of the filter 34 through the illumination color of the switch LED 434 emitted through the take-out button 41 regardless of the operation of the take-out button 41.

The operation state or operation degree of the water purifier 1 may be transferred to and displayed on the user's device such as a mobile phone through the NFC PCB 88. Information and an operation signal may be transferred to the NFC PCB 88 through the mobile phone, and the water purifier 1 may be driven by using the transferred information. For example, the user may confirm the information such as the life span of the filter 34 and usage pattern of the water purifier 1 through an App installed on the mobile phone of the user, and the user may set other operations of the water purifier 1 such as setting a power saving mode turning off a cold water mode of the water purifier 1 through the App.

While using the water purifier 1, the cooling water inside the cooling tank 60 is drained and new cooling water may be filled therein. Hereinafter, a replacement process of the cooling water will be described with reference to the figure.

Figure 44:
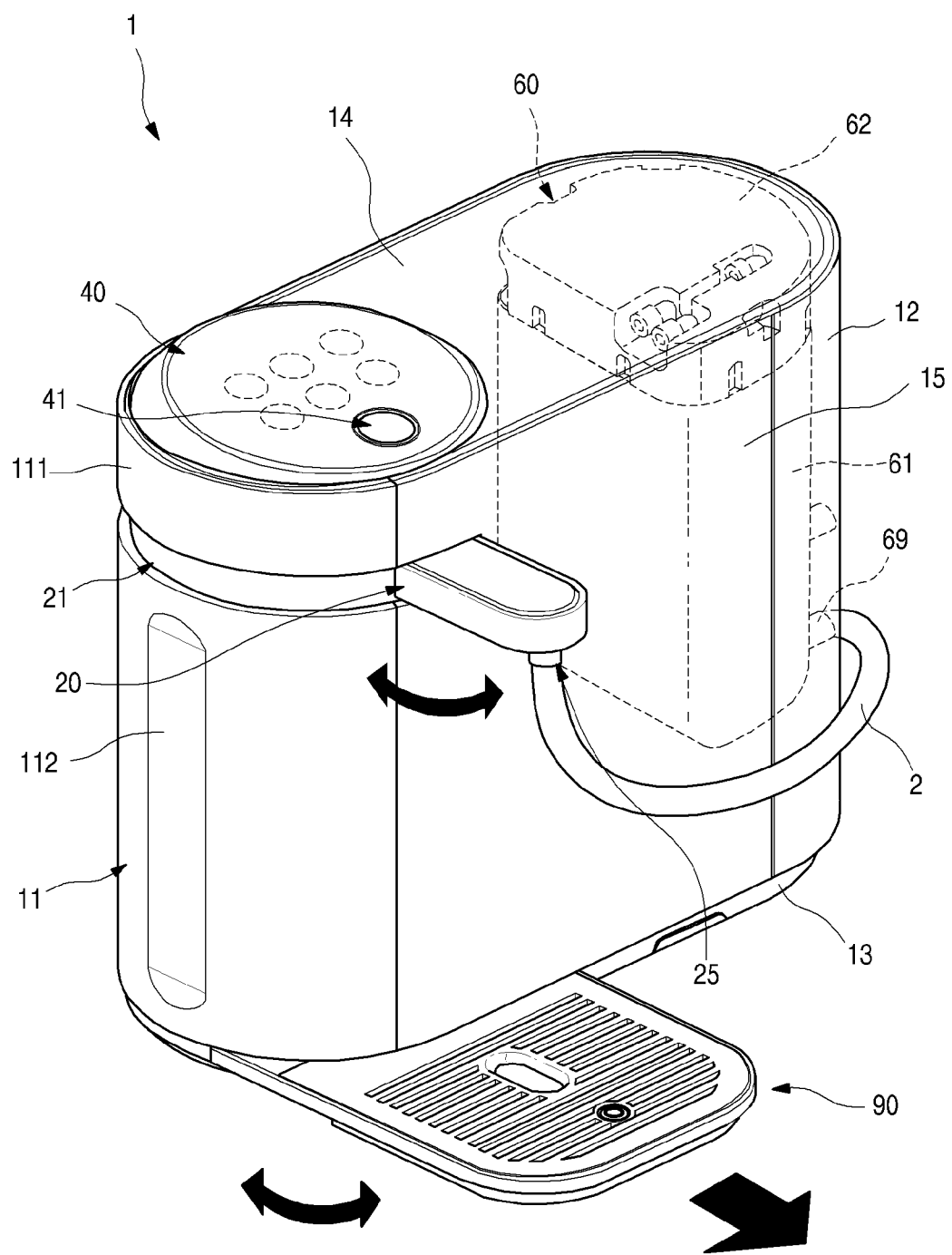
FIG. 44 is a perspective view illustrating a cooling water replacement work status of the water purifier.
Figure 45:
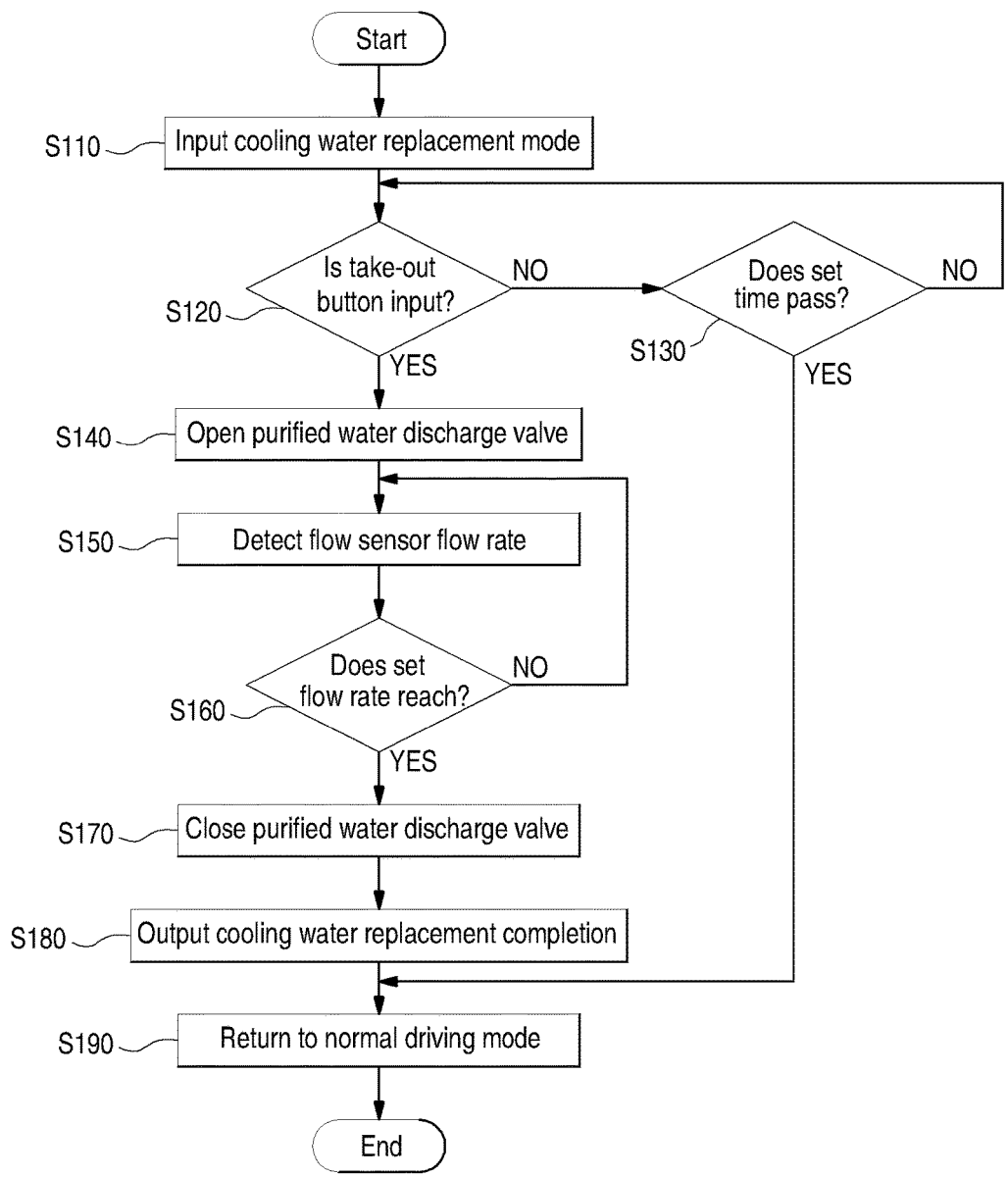
FIG. 45 is a flowchart sequentially illustrating a control method of the water purifier.

As shown in FIGS. 44 and 45, in order to maintain a clean state of the inside of the cooling tank 60, the cooling water inside the cooling tank 60 should be exchanged every predetermined period. For this, the user first opens the drain valve 69 after exposing the drain valve 69 and thus the cooling water inside the cooling tank 60 may be exposed to the outside.

The user may connect to the drain valve 69 by using a service pipe 2 provided separately. An end part of the service pipe 2 may be connected to the drain valve 69 in a coupling method, and the service pipe 2 may be capable of opening the drain valve 69 by the connection. Since this structure is the same as a structure of a general coupling pipe, the detailed description will be omitted.

After the cooling water inside the cooling tank 60 is completely drained, the other end of the service pipe 2 may be connected to the water discharge nozzle 25. The drain valve 69 may be maintained opened by the connection of the service pipe 2, and the water discharge nozzle 25 may communicate with the inside of the cooling tank 60.

In this state, the user may control the operation part 40 and set a mode of the water purifier 1 to a cooling water replacement mode. In the cooling water replacement mode, when the control part (main PCB 82) controls the take-out button 41, it may allow the purified water to be taken out so that the charge of the cooling water is possible, and the cooling water replacement mode may be set so that a predetermined quantity of water may be supplied by a single operation. [S110] In this set state, whether the take-out button 41 is operated may be determined. [S120]

When the user does not operate the take-out button 41 within a set period of time after selecting the entry of the cooling water replacement mode, the operation for replacing the cooling water may not be implemented, and the main PCB 82 may return to the normal driving mode. [S130] When the user presses the take-out button 41, the purified water taken out from the water discharge nozzle 25 may be introduced into the cooling tank 60 through the service pipe 2, and an operation of re-filling the cooling water may be started. [S140] In a state in which the cooling water replacement mode is set, the flow of the purified water supplied by the flow sensor 363 may be sensed, and the purified water discharge valve 367 may be controlled by the main PCB 82 so that the water may be supplied by the set capacity. [S150]

The main PCB 82 may determine a detected value transmitted from the flow sensor 363 and maintains the opening of the purified water discharge valve 367 until the flow rate reaches a set flow rate. The capacity set in the main PCB 82 may be an appropriate capacity that may be filled in the cooling tank 60. For example, in the main PCB 82, when the take-out button 41 is operated in the cooling water replacement mode, the purified water discharge valve 367 may be opened and allow the purified water about 2.4 L to be supplied to the cooling tank 60 so that the cooling coil 64 and the evaporator 63 are submerged. [S160]

When the flow rate detected from the flow sensor 363 reaches the set flow rate, the main PCB 82 may judge that the charge of the cooling water is completed and close the purified water discharge valve 367. [S170] After all water of the set flow rate is completely supplied, the cooling water replacement completion may be displayed through the operation part 40. The replacement completion of the cooling water may be displayed through the color of light passing through the take-out button 41. The cooling water replacement completion may be output by the buzzer 435, and the display of the cooling water replacement completion may use a separate display means. [S180]

When the replacement of the cooling water is completed, the user may separate the service pipe 2 from the drain valve 69 and the water discharge nozzle 25. The control part may cancel the cooling water replacement mode automatically or by the user's setting and switch to the general normal driving mode. The normal driving mode may be a state so as to outflow the hot water, purified water and cold water in a desired amount through the operation of the take-out button 41.

Hereinafter, an assembly process of the water purifier having the structure as described above according to an embodiment of the present disclosure will be described with reference to the figure. As shown in FIG. 46, in the assembly process of the water purifier 1 according to an embodiment of the present disclosure, the power cord 136 and the water inflow pipe 360 may be provided on the base 13.

The condenser 52 may be provided on the condenser mounting part 541 of the condenser bracket 54. The cooling fan 53 may be coupled to the front surface of the condenser mounting part 541. Thus, the assembled condenser bracket 54 may be mounted on the molded base 13. The rotation ring 91 and the pressure reducing valve 133 may be mounted on the base 13. [Step 1]

Next, the condenser 52 may be mounted on the base 13. The compressor 51 may be positioned above the suction grille 135 formed on the base 13. The compressor 51, the pipe of the condenser 52 and a dryer pipe may be welded to be connected each other. [Step 2]

After the mounting of the condenser 52 is completed, the cooling tank 60 may be mounted on the tank mounting part 542 of the condenser bracket 54. The arrangement of the cooling coil 64, evaporator 63, motor 67, agitator 68, and mesh member 65 may be completed in the cooling tank 60, and the cooling tank 60 may be mounted in a state in which the foaming of the insulation body 612 and the insulation cover 622 is completed.

After mounting the cooling tank 60, the pipes such as the dryer and capillary pipe 55 may be welded and the wire may be connected. After evacuating the pipes and the inside of the compressor 51 and the condenser 52, the refrigerant may be injected therein to be sealed for the driving of the refrigerating cycle. [STEP 3]

The filter bracket 30 may then be mounted on the base 13. Flow path pipes in which the water is supplied may be connected each other with the mounting of the filter bracket 30 while a plurality of valves are completely mounted on the filter bracket 30.

The support plate 35 may be mounted between the filter bracket 30 and the condenser bracket 54. A mounting space of the heating and control module 50 may be secured by the support plate. [STEP 4]

Next, the heating and control module 50 may be mounted on the support plate 35. The heating and control module 50 may be fixed on the support plate 35 while the induction heating assembly 70 and the control assembly 80 are coupled in one module.

The heating and control module 50 may be positioned in a space between the filter bracket 30 and the cooling tank 60 while being mounted. An upper end of the heating and control module 50 may extend to a position of the top cover 14 and may be in close contact therewith. Therefore, the heating and control module 50 may be efficiently disposed in a space provided in the water purifier 1. A connector of the induction heating assembly 70 and a connector of the control assembly 80 may be connected while the mounting of the heating and control module 50 is completed.

If the water purifier 1 is a model only extracting the purified water and the cold water, not a model extracting the hot water, only the control assembly 80 may be mounted on the support plate 35. Depending on the option functions, the control assembly 80 in which a corresponding PCB is assembled may be mounted. [STEP 5]

Next, the rotator 21 may be mounted on the upper end of the filter bracket 30. The water discharge part 20 may be assembled in the rotator 21, and the upper portion guide bracket 23 and the lower portion guide bracket 24 may be assembled in the rotator housing 22 and the water discharge pipe 261 may be provided therein.

The rotator 21 may be seated and rotatably mounted on the rotator mounting part 33 of the filter bracket 30. The pinion gear 271 provided in the rotator 21 may be gear-coupled with the internal gear 331 at the upper end of the filter bracket 30, and when the rotator 21 is rotated, the pinion gear 271 may move along the internal gear 331, and thus the rotation speed of the rotator 21 becomes constant.

After mounting the rotator 21, the water discharge pipe 261 and the T connector 26 in which the cold and purified water pipes are connected may be fitted. The end part of the water discharge pipe 261 may be connected to the water discharge nozzle 25. The hot water pipe 265 may be connected to the water discharge nozzle 25 and thus the connection of pipe is completed.

The upper cover 111 may be coupled to the upper end of the rotator 21. Therefore, since vertical coupling is completed, a stable rotatable structure may be provided in the rotator 21. [STEP 6]

Next, the top cover 14 is assembled. The top cover 14 may be seated on the upper surface of the upper cover 111 and the cooling tank 60 while the operation part 40 is rotatably mounted thereon.

When the top cover 14 is mounted, the rotation connecting part 421 extended from the front surface of the operation part 40 may be inserted into the coupling rings 236 and 246 of the rotator 21, and thus the operation part 40 and the rotator 21 are coupled each other and may be rotated together. Also, the operation part PCB 43 and the main PCB 82 provided on the control assembly 80 may be connected using a connector, and the transmission of the power and signal may be possible.

A filter for test may be mounted on a filter socket of the filter bracket 30, and the test may be implemented after connecting the filter. After the test, the filter for test may be removed and the filter 34 may be assembled to the filter socket after removing the residual water of the flow path.

Hot water heating may be tested by injecting the water to the hot water tank 71 and driving the induction heating assembly 70. After the test, the end cap 7171 may be removed and then the end cap 7171 may be re-mounted after completely draining the residual water of the inside of the hot water tank 71. [STEP 7]

Next, the rear cover 12 may be fixed to be screw-fastened to the base 13, and then the side panel 15 may be fixed to be screw-fastened to both sides of the base 13. At this time, the side panel 15 may be coupled with the top cover 14 by a screw. [STEP 8]

The lower cover 112 may be coupled to the side panel 15 and the rotator 21 and the assembly of the water purifier 1 may be completed. The tray 90 separately assembled with the lower cover 112 may be packed and shipped together, and, during the installation and use, the user may couple the tray 90 to the rotation ring 91 and use. [STEP 9]

According to an embodiment of the present disclosure, the water purifier may have a compact structure while having a structure in which a compressor, an evaporator, and a condenser for making cold water inside the water purifier as well as a cooling tank are provided. Especially, the cooling tank may be provided above the condenser, and a control assembly may be provided in a space between the compressor and the cooling tank, and thus, there is an advantage that a shape of the water purifier is made compact by using an internal space efficiently.

According to an embodiment of the present disclosure, a PCB controlling the operation of the water purifier may be configured in each module, and have a structure mounted on a set position of the control base. Therefore, according to the type of PCB mounted on one control base, implementation of various options is possible and there is an advantage that a variety of models may be manufactured without changing the inner structure.

Also, such a control base may be provided in a space between a filter bracket and a cooling tank to further improve the efficiency of the space, and it may be coupled and mounted with a hot water heating unit to make hot water in a module form, and thus productivity and space efficiency may be improved.

A water purifier according to an embodiment of the present disclosure may implement a cooling cycle by including an inverter compressor, evaporator and condenser, and make cold water. For effective cooling of the inverter compressor and the condenser, the condenser may be provided on a suction port and the condenser may be accommodated in the inner side of a condenser bracket, the air flowed by the cooling fan is evenly cooled while passing through the entire condenser, and thus the compressor and the condenser may be cooled effectively. Also, as the suction port is formed on a base and the base is spaced apart from the ground, the suction port may not be exposed to outside, and thus there is an advantage that the exterior appearance becomes elegant and the suction of outdoor air is facilitated at the same time.

A water purifier according to an embodiment of the present disclosure may have a structure in which a water discharge part in which a water discharge nozzle is provided protrudes, and a structure which may be rotated freely by a rotation of a rotator. Therefore, a position thereof may be freely changed so that a user may easily operate, and thus there is an effect that usability is improved.

Since the user may move the water discharge part to an appropriate position without being constrained to various installation environments by the rotation of the water discharge part, there is an effect that the usability is improved. The operation part may be rotated with the water discharge part when the water discharge part is rotated, so an easy operation is possible at a position in which water is outflowed, and a status check may be made easily, and thus the usability may be further improved.

A light may be provided on the water discharge part, and the water take-out state by the water discharge nozzle may be identified easily, and thus the usability may be further improved. In a water purifier according to an embodiment of the present disclosure, a rotation ring may be provided on a center of rotation of the rotator, and a rotation pipe rotatably fitted to a connecter connected with a water discharge pipe may be provided on the rotation ring. The rotation pipe may be formed of a stainless material, and prevent a pipe or fitting from being twisted or damaged even in the repetitive rotation operation of the water discharge part, and thus durability may be improved.

In a water purifier according to an embodiment of the present disclosure, the water discharge may be possible by a pressing operation of a take-out button, and state information of the water purifier may be displayed by transmitting the light of different colors through a take-out button. Therefore, there is an advantage that the replacement state of a filter, or information such as whether the extracted water is hot, cold or purified water can be displayed without a separate display.

Since the pressing operation of a switch and light transmission of an LED are made at the same time on one take-out button, and the switch and LED are designed to be positioned at a position that does not cause interference with each other, there is an advantage that the operation and display of information are possible through one construction. Since a water purifier according to an embodiment of the present disclosure has a structure in which water passing through a hot water tank of a plate shape is heated in an induction heating method, hot water can be heated while passing through the hot water tank, and thus there is an advantage that the instant extraction of hot water is possible.

Due to the feature of the induction heating method, the heating performance may be adjusted through the output control of a working coil, and therefore, hot water of different temperature set by the user may be taken out. In a water purifier according to an embodiment of the present disclosure, a safety valve may be provided on a branched one side of an output pipe of the hot water tank, and thus steam may be discharged through the safety valve when the pressure rises due to generation of steam while hot water is heated. Therefore, there is an advantage that extreme pressure rise due to the steam may be prevented, and the hot water heating performance as well as the durability of the hot water tank may be improved.

In a water purifier according to an embodiment of the present disclosure, a plurality of projection parts may be provided in the hot water tank, and a flow path of water flowing in the hot water tank may be branched by the projection parts, and thus the water may be evenly flowed in the entire hot water tank, and the flow velocity may be slowed down by collisions with the projection parts. Therefore, the water evenly distributed throughout the entire hot water tank may be evenly heated, and as the residence time in the hot water tank is increased due to the reduction of the flow velocity, there is an advantage that more efficient heating of the hot water is possible.

In a water purifier according to an embodiment of the present disclosure, a cooling coil in which purified water for cooling the inside of a cooling tank flows may be wound, an evaporator may be wound above the cooling coil and fill cooling water therein to cool the water passing through the cooling coil. Therefore, the inside of the cooling tank can be configured compactly and the purified water can be effectively cooled.

An agitator may be disposed in an inner side area in which the cooling coil and the evaporator are wound, a circulation of the cooling water may be further activated, and therefore, the cooling efficiency of the purified water passing through the cooling coil may be further improved.

In a water purifier according to an embodiment of the present disclosure, a mesh member partitioning an area in which an evaporator, cooling coil and agitator are disposed may be provided in a cooling tank. Cooling water may be flowed by the mesh member, but ice frozen at the evaporator may not be flowed to the agitator or the cooling tank side, so that a noise or damage of and internal structure caused by the collision of the ice may be prevented.

A water purifier according to an embodiment of the present disclosure may discharge cooling water by a drain valve provided in a cooling tank. Therefore, the inside of the cooling tank may be maintained clean, and in order to re-supply the cooling water into the cooling tank, a service valve is connected to the drain valve and a take-out nozzle, and the cooling water may be controlled to be supplied by a set amount. Therefore, there is an advantage that the drain and re-supply work of cooling water are made easily.

In a water purifier according to an embodiment of the present disclosure, a tray which may be rotated along the rotation of a take-out part which is rotated may be provided. Therefore, even the take-out part may be rotated at a specific angle, the tray may be disposed vertically downward, a container may be seated, and residual water may be received, thereby improving usability.

The tray cover may have a grille shape or a water collection hole may be formed, so that the water collection is made easily. The tray may have a detachable structure, and thus there is an advantage that the residual water may be easily handled.

A floater may be formed inside the tray and the floater may rise according to the water level, be exposed to the tray cover, and inform the water level of the tray to the user. Especially, in the case in which an indicator of the floater is exposed, it may effectively notify that the residual water should be emptied more than the set water level, and thus the usability may be improved.

In a control method of a water purifier according to an embodiment of the present disclosure, cooling water may be drained through a drain valve while a cooling tank is assembled, and water discharge may be operated after a setting is changed to a cooling water replacement mode after the drain valve and water discharge nozzle are connected to a service pipe. During this operation, the control part may allow a set amount of water flow which may fill the cooling tank to be supplied and returns to a normal driving mode after completion of the supply of set flow rate. Therefore, the user may replace the cooling water in the interior of the cooling tank in a simple way, and there is an advantage that the inside of the cooling tank may be maintained clean.

A water purifier may include a case forming an appearance; a filter bracket provided in the case and on which a filter and a valve are mounted; a condenser bracket provided in the case spaced apart from the filter bracket and accommodating a condenser; a cooling tank seated on an upper end of the condenser bracket and cooling water purified by the filter; a support plate connecting between the filter bracket and the cooling tank, and partitioning a space between the filter bracket and the cooling tank up and down; a compressor provided below the support plate; and a control assembly mounted on an upper surface of the support plate. The filter bracket may include a condenser mounting part fixed and mounted on a bottom of the water purifier and accommodating the condenser; and a tank mounting part formed to be extended from an upper surface of the condenser mounting part and accommodating a lower end of the cooling tank.

Refrigerant tubes bent multiple times may be serially arranged, and thus the condenser may be formed in a hexahedral shape so as to correspond to an internal space of the condenser mounting part. A filter mounting part (or filter mount) in which the filter may be mounted is depressed at a front surface of the filter bracket, and a plurality of valves may be fixed and mounted on a rear surface of the filter bracket.

A front cover detachably provided and opening and closing the filter mounting part, and forming a front surface exterior of the water purifier may be provided in the filter bracket. A plate supporting part supporting the support plate may be extended and formed at the condenser bracket.

An induction heating assembly heating and supplying purified water in an induction heating method may be further provided on the support plate. The induction heating assembly may be coupled to the control assembly and mounted on a heating assembly in a module state.

The control assembly may include a control base; an induction heating PCB mounted on a surface of the control base facing with the induction heating assembly, and controlling the induction heating assembly; a main PCB mounted on an opposite surface of the surface in which the induction heating PCB is mounted and controlling the compressor and the valve; and a power supply PCB mounted on another surface of the control base and supplying power to the induction heating PCB and the main PCB. An near field communication (NFC) PCB through which a short-rage communication is possible may be provided on an upper end of the control base, and the NFC PCB may be in contact with an upper surface of the case.

A plurality of covers respectively shielding the main PCB, induction heating PCB and power supply PCB may be provided in the control base. The compressor may be an inverter compressor.

A water purifier may include a base forming a bottom surface of the water purifier and a suction port therein; a compressor mounted on the base; a condenser bracket mounted on the base so as to be spaced apart from the compressor, and accommodating a condenser; a cooling tank seated on an upper surface of the condenser bracket, and having an evaporator therein to make cold water; a rear cover forming an outer appearance of the water purifier, and having a discharge port formed at a position corresponding to the condenser bracket; and a cooling fan provided between the compressor and the condenser and allowing air flowed to the suction port to be discharged to the discharge port via the condenser. A leg extended downwardly and separating a bottom surface of the base from a ground in which the water purifier is installed may be provided on the base, and the suction port may be formed on the bottom surface of the base.

The compressor may overlap with at least a part of the suction port. A mounting part which protrudes so that the compressor is mounted to be spaced apart from the base may be formed on the base.

A nut in which a screw is fastened for fixing the compressor may be provided on the mounting part by insert injection. A condenser mounting part accommodating the condenser may be formed in the condenser bracket, and an inlet of the condenser mounting part may be opened toward the compressor and an outlet of the condenser mounting part may be opened toward the discharge port and guiding a flow of cooling air.

The discharge port may have a size corresponding to the outlet of the condenser mounting part, and may be in close contact to an opening of the condenser mounting part. The cooling fan may shield the inlet of the condenser mounting part.

A fixing member penetrating a fixing hole formed on the condenser mounting part and fixed on the cooling fan may be further provided, and the fixing member may be formed of an elastic material. An exterior shape of the condenser is formed in a cube shape corresponding to the condenser mounting part.

A water purifier may include a case forming an exterior appearance; a round surface rotator rotatably mounted in the case; a water discharge part protruding from the rotator to an outside of the case and having a water discharge nozzle through which water is taken out therein; and an operation part mounted on an upper surface of the case and having a take-out button for discharging water, and connected with the rotator and rotated together when the rotator is rotated. The case may include a front cover forming a front surface exterior of the water purifier, and the front cover may include an upper cover and a lower cover which are vertically spaced apart and mounted across the rotator.

A filter bracket extended up and down from the inside of the case so that a filter is mounted thereon and supporting the rotator from the lower portion may be provided, and a rotation guide rail maintaining a contact state with one side surface of the rotator and having a curvature so as to guide the rotation of the rotator may be provided on an upper surface of the filter bracket. An oil damper through which a pinion is mounted on a rotating shaft may be provided on the rotator, and an internal gear extended along the curvature may be formed on the filter bracket, and the pinion may be moved along the internal gear when the rotator is rotated.

rotation connecting part extended downward may be provided on a lower surface of the operation part and a coupling ring in which the rotation connecting part is inserted and coupled each other may be provided in the rotator. A center ring may be formed on the center of rotation of the rotator, and a rotation pipe rotatably fitted to a connector connected to a water discharge pipe connected to a take-out nozzle may be disposed on the center ring.

The rotation pipe may be formed of a metallic material, and a fitting grove in which a collet of the connector is inserted may be formed. The operation part may be formed in a circular shape, and an upper surface of the water discharge part may be formed to have a lower inclined surface toward closer to the water discharge part.

A cold purified water connecting part connected with the water discharge pipe in which cold water and purified water are supplied and a hot water connecting part connected with a hot water pipe in which the hot water is provided may be formed in the water discharge nozzle. The water discharge part may include a water discharge part housing an upper surface of which is opened and extended from the rotator and on which the water discharge nozzle is mounted; and a water discharge part cover opening and closing the opened upper surface of the water discharge part housing. A lighting hole may be formed on a bottom surface of the water discharge part housing, and a lighting unit emitting light downward through the lighting hole may be provided in an inner side of the water discharge part housing.

A water purifier may disclosure include a case forming an exterior appearance of the water purifier; a take-out button provided on the case and operated by a user for taking out water; an operation part PCB provided in the case; a switch provided on the operation part PCB, contacted by the operation of the take-out button and turned on and off; and an LED provided on the operation part PCB and emitting light toward the take-out button, and at least a part of the take-out button is formed to enable the transmission of light and the LED emits different colors of light according to the operation state of the water purifier. The operation button may include a pressing part moved by the user's pressing operation; an elastic part cut along a circumference of the pressing part and providing elasticity for returning the pressing part; a contact part protruding from one end of the pressing part and in contact with the switch according to the movement of the pressing part; and a rotation supporting part protruding from the other end of the pressing part facing the contact part, and becoming a rotation center of the pressing part.

A light transmitting part in which the light is transmitted may be formed on the pressing part, and the contact part may be formed further outside than the light transmitting part. A light guide extended to the LED side along the light transmitting part and guiding the light of the LED toward the light transmitting part may be further formed.

A button plate shielding the light transmitting part may be further provided on the pressing part, and the button plate may enable the transmission of light. The LED may be positioned at an inner side of the light transmitting part.

The LED may emit different colors of light according to a replacement period of a filter. A plurality of LED may be provided and emit the different colors of light. A buzzer indicating information according to a state of the water purifier in sound may be provided in the operation part PCB.

A water purifier may include a case forming an exterior appearance; a filter provided in the case; and an induction heating assembly heating purified water passing through the filter, wherein the induction heating assembly includes a hot water tank in which purified water passes through; a working coil wound many times at a position facing the hot water tank and emitting an electromagnetic force for induction-heating the hot water tank; a ferrite core radially disposed around the center of the working coil in plural and preventing a loss of the electromagnetic force generated in the working coil; and a heating bracket mounted on a surface in which the hot water tank and the working coil are opposed to each other.

An input pipe in which the purified water is introduced may be formed on a lower end of the hot water tank, and an output pipe in which hot water s discharged may be formed on an upper end of the hot water tank. A connector may be connected to the input pipe, and a pipe in which a check valve and water are provided may be connected to one side of the connector, and an end cap opened and closed for draining water of the hot water tank may be mounted on the other side of the connector.

A connector may be connected to the output pipe, and a pipe in which the hot water is outflowed may be connected to one side of the connector, and a safety valve opened in the case in which a pressure of the hot water tank is more than a certain pressure and discharging steam of the inside of the hot water tank may be provided on the other side of the connector. A steam pipe discharging steam may be connected to an outlet of the safety valve, and the steam pipe may extend to an outer side of the water purifier so as to drain steam to the outside of the water purifier.

The induction heating assembly may be coupled to a control assembly controlling the driving of the water purifier in module. A coupling boss extended to be coupled with the control assembly while separated from the control assembly may be provided in the heating bracket.

A hot water temperature sensor which is in contact with the hot water tank and measuring the temperature of hot water of the hot water tank, and a fuse blocking power supply to the induction heating assembly in the case in which the temperature is more than a set temperature may be provided on the heating bracket. The hot water tank may form a surface facing the working coil and includes a first cover which is a flat shape; and a second cover jointed with a peripheral surface of the first cover and forming a space in which an irregular shape is formed and water is flowed.

A plurality of projection parts extended from an inlet in which water is introduced to an outlet direction, and protruding toward the first cover side may be formed in the second cover. The projection parts may include a vertical protrusion part extended in a vertical direction, and a horizontal protrusion part extended from both ends of the vertical protrusion part in a horizontal direction.

At least any one of the projection parts may be in contact with the first cover and jointed to each other by welding. A mica sheet for maintaining a distance from the hot water tank or the ferrite core may be provided at at least one surface of both surfaces of the coil.

A water purifier may include a case forming an exterior appearance; a compressor mounted in the case; a condenser bracket mounted in the case and accommodating a condenser; and a cooling tank seated on an upper surface of the condenser bracket and cooling purified water, and the cooling tank includes a tank body in which cooling water is accommodated; a tank cover shielding an opened upper surface of the tank body; a cooling coil wound in a coil shape from the inner side of the tank body, and guiding the purified water to pass through the inner side of the tank body; an evaporator wound in a coil shape from the inner side of the tank body, and cooling the cooling water above the cooling coil; and an agitator rotated in a space of a center at which the cooling coil and the evaporator are wound, and forcing the circulation of the cooling water of the tank body.

A mesh member disposed between the cooling coil and the evaporator, partitioning the inside of the tank body and forming a plurality of holes to allow the access of the cooling water may be provided in the inner side of the tank body. The mesh member may include a partitioning part which partitions the inside of the tank body up and down, and in which an agitator hole through which the agitator penetrates is formed; and an extending part formed to be extended upwardly along a circumference of the agitator hole, and partitioning a space between the agitator and the evaporator.

A lower portion supporting part extended downward and seated on an upper end of the cooling coil may be formed in the mesh member. An upper portion supporting part protruding so that the evaporator may be seated thereon may be formed in the mesh member.

A fixing hook which may fix the evaporator by pressing an upper end thereof may extend from the mesh member. A coil supporting part protruding upward and supporting a lower end of the cooling coil and separating the lower end of the cooling coil from a bottom surface of the tank body may be formed on the bottom surface of the tank body.

The agitator may pass the evaporator and extend to one side of the cooling coil. An outer side surface of the tank body and the tank cover may be surrounded by an insulator. A tank mounting part opened upward so that a lower portion of the cooling tank may be inserted and mounted may be formed on the upper surface of the condenser bracket.

A drain valve opening and closing so as to drain water inside the cooling tank to outside may be provided in the cooling tank. A drain part inclined or depressed may be formed on a bottom surface of the cooling tank, and the drain part may be communicated with the drain valve.

The drain valve may be opened while a pipe for injection of cooling water is connected. The other end of the pipe for injection of the cooling water may be connected to a take-out nozzle of the water purifier, and a control part controlling the operation of the water purifier outflows a set amount of water so as to fill the cooling tank.

A water purifier may include a base forming a bottom surface and forming an exterior appearance; a take-out part having a take-out nozzle and protruding toward an outer side of the case but rotatably provided around an inner side of the case as an axis; a rotation ring rotatably mounted on the base; and a tray detachably mounted on the rotation ring and extended toward the outer side of the case. The tray may include a tray body having an opened upper surface and accommodating water falling from the take-out nozzle; and a tray cover detachably provided on an upper surface of the tray body and at least a part of which is formed in a grille shape so that water may be passed therethrough.

A floater may be accommodated in the tray, and a depression part depressed in a size which may accommodate a lower portion of the floater may be formed in the tray body, and an indicating hole opened so that an upper end of the floater may be exposed is formed in the tray cover. The floater may include a floating part accommodated in the depression part and formed of a material floating on the water; a cap coupled to the floating part and positioned at the inner side of the indicating hole; and an indicator provided below the cab and formed in a different color with the tray cover, and in the case in which the tray is positioned at a set level or higher, the indicator is exposed above the indicating hole by rising of the floating part.

The depression part may be in contact with a ground in which the water purifier is installed. A water collection hole may be opened at the tray cover corresponding to a vertical lower portion of the water discharge nozzle. A tray coupling part may protrude from and be formed on the tray, and a tray mounting part in which the tray coupling part may be inserted formed in the rotation ring, and the tray mounting part is exposed form a lower end to an outer side of the case.

The case may include a front cover forming an exterior appearance of a rounded front surface, and a rear end of the base may be depressed along a curvature corresponding to the front cover. A stopper in contact with a side surface of the base when the tray is rotated and limiting the rotation may be formed to stepped on the base.

A movement preventing part formed to extend forward and in which both sides of a lower end part of the tray is inserted when the tray is rotated may be formed on both sides of the stopper. A rotation guiding part extended to have a curvature corresponding to a curvature of the rotation ring, and in close contact to a lower side surface of the rotation ring and guiding the rotation of the rotation ring may be formed in the base.

A control method of a water purifier may include a step of converting into a cooling water replacement mode by a user's input while a drain valve and a water discharge nozzle are connected by using a service pipe provided separately; a step of sensing an amount of water supplied by an take-out operation of the user by a flow sensor and transferring to a control part, and opening, by the control part, a purified water valve so that purified water is supplied in a set amount; and a step of closing the purified water valve and converting to a normal driving mode when the set amount of purified water is completely supplied to the cooling tank. The drain valve may be opened when the service pipe is connected.

During the cooling water replacement mode and the normal driving mode, the control part may display a mode selected by an operation part. An LED emitting light to a water discharge switch of the operation part may emit different colors of light, and thus the control part may display the cooling water replacement mode and the normal driving mode. The set flow rate may be set to an amount such that the cooling coil and the evaporator inside the cooling tank may sink.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A water purifier comprising:
a case that forms an outer shape of the water purifier;
a base forming a bottom surface of the water purifier and including a suction port;
a compressor mounted on the base;
a condenser bracket mounted on the base to be spaced apart from the compressor and accommodating a condenser;
a cooling tank seated on an upper surface of the condenser bracket and having an evaporator therein to make cold water;
at least one filter provided in the case and configured to purify water that flows through the case;
a discharge port formed in the case and provided at a position corresponding to the condenser bracket;
a condenser mount that is formed in the condenser bracket and configured to accommodate the condenser, the condenser mount comprising an inlet that is open toward the compressor and an outlet that is open toward the discharge port; and
a cooling fan provided between the suction port and the condenser bracket and configured to cycle air from the suction port to the discharge port through the condenser.

2. The water purifier according to claim 1, wherein a leg extended downward and separating a bottom surface of the base from a ground on which the water purifier is installed is provided on the base, and the suction port is formed in the bottom surface of the base.

3. The water purifier according to claim 2, wherein a lower surface of the compressor overlaps with at least a part of the suction port.

4. The water purifier according to claim 3, wherein a compressor mount protrudes from the base so that the compressor is mounted to be spaced apart from the base.

5. The water purifier according to claim 4, wherein a nut in which a screw to fix the compressor is fastened is provided on the compressor mount.

6. The water purifier according to claim 1, wherein the discharge port has a size corresponding to the outlet of the condenser mount and is in close contact with an opening of the condenser mount.

7. The water purifier according to claim 1, wherein the cooling fan shields the inlet of the condenser mount.

8. The water purifier according to claim 1, further including a fastener penetrating a fixing hole formed on the condenser mount and fixed on the cooling fan, wherein the fastener is formed of an elastic material.

9. The water purifier according to claim 1, wherein an exterior shape of the condenser has a cubical shape and an interior shape of the condenser mount is formed to correspond to the cubical shape of the condenser.

10. The water purifier according to claim 1, wherein the cooling fan, the inlet, the outlet, and discharge port are provided in series.

11. The water purifier according to claim 1, wherein a circumferential surface of the condenser is covered by the condenser mount except for the inlet and the outlet.

12. The water purifier according to claim 1, wherein an exterior shape of the condenser corresponds to an interior shape of the condenser mount.

\* \* \* \* \*